US012777305B2

(12) United States Patent
Anagnos

(10) Patent No.: US 12,777,305 B2
(45) Date of Patent: Oct. 27, 2026

(54) SYSTEMS AND METHODS FOR GENERATION OF ACOUSTIC VIRTUAL SOUND SOURCES IN THREE-DIMENSIONAL SPACE AND UTILIZATION OF AI MACHINE LEARNING THEREFOR

(71) Applicant: Daniel P. Anagnos, Annapolis, MD (US)

(72) Inventor: Daniel P. Anagnos, Annapolis, MD (US)

( * ) Notice: Subject to any disclaimer, the term of this patent is extended or adjusted under 35 U.S.C. 154(b) by 203 days.

(21) Appl. No.: 18/889,246

(22) Filed: Sep. 18, 2024

(65) Prior Publication Data

US 2026/0082173 A1 Mar. 19, 2026

(51) Int. Cl.
*H04S 7/00* (2006.01)

(52) U.S. Cl.
CPC .......... *H04S 7/304* (2013.01); *H04S 2400/11* (2013.01); *H04S 2420/01* (2013.01)

(58) Field of Classification Search
CPC .. H04S 7/304; H04S 2400/11; H04S 2420/01; H04S 7/301
See application file for complete search history.

(56) References Cited

U.S. PATENT DOCUMENTS 11,140,509 B2 10/2021 Anagnos
11,653,163 B2 5/2023 Anagnos

FOREIGN PATENT DOCUMENTS

CN 110457646 A * 11/2019 ............ G06N 20/00

OTHER PUBLICATIONS

English machine translation of CN-110457646-A (Qi, Xiaoke; Parameter transfer learning-based low-resource header related transfer function personalized method; published Nov. 2019) (Year: 2019).*

* cited by examiner

*Primary Examiner* — Mark Fischer
(74) *Attorney, Agent, or Firm* — Nieves IP Law Group, LLC; Peter A. Nieves

(57) ABSTRACT

Embodiments of the present disclosure provide systems and/or methods for reproducing three-dimensional sound through the generation of acoustic virtual sound sources located within a three-dimensional space surrounding a designated user (listener) or origin point. The present disclosure provides 3D audio virtualization by generating a spatial Mapping Transfer Function (MTF) from data sets of measured HRTFs, modeled HRTFs or a combination thereof that transforms a known HRTF for a real acoustic transducer or loudspeaker in a system to a new HRTF for a virtual acoustic transducer, loudspeaker or sound object in a system. The MTF may be generated using data analysis algorithms and may be produced with high accuracy using supervised machine learning (AI). Convolving MTFs with audio data, existent HRTFs in the system and subsequently mixing the result into present audio or sound reproduction channels may enable existing acoustic transducers or loudspeakers to reproduce a virtual sound source.

20 Claims, 25 Drawing Sheets

HRTFs IN SPHERICAL SPACE

BASIC SYSTEM DESIGN

FIG. 1 SPHERICAL VOLUME SURROUNDING LISTENER

FIG. 2 THREE-DIMENSIONAL REFERENCE PLANES

Note: $P_R$ denotes REFERENCE position;
$P_T$ denotes TARGET position.

FIG. 3 SOUND SOURCES IN SPHERICAL SPACE

FIG. 4 HRTFs IN SPHERICAL SPACE

Note: $P_R$ and $H_R$ denote REFERENCE position and HRTF; $P_T$ and $H_T$ denote TARGET position and HRTF; (*R*) and (*L*) denote RIGHT and LEFT.

TOP VIEW OF HORIZONTAL PLANE

FRONT VIEW OF LATERAL PLANE

SIDE VIEW OF MEDIAN PLANE

FIG. 8 TYPICAL 7.1 CHANNEL LOUDSPEAKER LAYOUT (BASED ON ITU-R BS.775-1)

FIG. 9 MACHINE LEARNING (AI) ARCHITECTURE

MACHINE LEARNING (AI) PROCESS: TRAINING DATA

MACHINE LEARNING (AI) PROCESS: SUPERVISED ML

| REFERENCE SOUND SOURCE POSITION | | | | TARGET SOUND SOURCE POSITION | | | | MAPPING TRANSFER FUNCTION[3] | |
|---|---|---|---|---|---|---|---|---|---|
| POSITION DESIGNATOR[2] P | RADIAL DISTANCE[1] r | HORIZONTAL AZIMUTH ANGLE $\theta$ | VERTICAL ELEVATION ANGLE $\phi$ | POSITION DESIGNATOR[2] P | RADIAL DISTANCE[1] r | HORIZONTAL AZIMUTH ANGLE $\theta$ | VERTICAL ELEVATION ANGLE $\phi$ | RIGHT EAR $\mathbf{MTF}_{R(P) \Rightarrow T(P)\ [R]}$ | LEFT EAR $\mathbf{MTF}_{R(P) \Rightarrow T(P)\ [L]}$ |
| P1 (L) | 3 | +30° | 0° | P2 (C) | 3 | 0° | 0° | $\mathbf{MTF}_{R(P1) \Rightarrow T(P2)\ [R]}$ | $\mathbf{MTF}_{R(P1) \Rightarrow T(P2)\ [L]}$ |
| P3 (R) | 3 | -30° | 0° | P2 (C) | 3 | 0° | 0° | $\mathbf{MTF}_{R(P3) \Rightarrow T(P2)\ [R]}$ | $\mathbf{MTF}_{R(P3) \Rightarrow T(P2)\ [L]}$ |
| P1 (L) | 3 | +30° | 0° | P4 ($Ls_1$) | 3 | +90° | 0° | $\mathbf{MTF}_{R(P1) \Rightarrow T(P4)\ [R]}$ | $\mathbf{MTF}_{R(P1) \Rightarrow T(P4)\ [L]}$ |
| P5 ($Ls_2$) | 3 | +150° | 0° | P4 ($Ls_1$) | 3 | +90° | 0° | $\mathbf{MTF}_{R(P5) \Rightarrow T(P4)\ [R]}$ | $\mathbf{MTF}_{R(P5) \Rightarrow T(P4)\ [L]}$ |
| P3 (R) | 3 | -30° | 0° | P6 ($Rs_1$) | 3 | -90° | 0° | $\mathbf{MTF}_{R(P3) \Rightarrow T(P6)\ [R]}$ | $\mathbf{MTF}_{R(P3) \Rightarrow T(P6)\ [L]}$ |
| P7 ($Rs_2$) | 3 | -150° | 0° | P6 ($Rs_1$) | 3 | -90° | 0° | $\mathbf{MTF}_{R(P7) \Rightarrow T(P6)\ [R]}$ | $\mathbf{MTF}_{R(P7) \Rightarrow T(P6)\ [L]}$ |
| P5 ($Ls_2$) | 3 | +150° | 0° | P8 | 4 | +180° | +45° | $\mathbf{MTF}_{R(P5) \Rightarrow T(P8)\ [R]}$ | $\mathbf{MTF}_{R(P5) \Rightarrow T(P8)\ [L]}$ |
| P7 ($Rs_2$) | 3 | -150° | 0° | P8 | 4 | -180° | +45° | $\mathbf{MTF}_{R(P7) \Rightarrow T(P8)\ [R]}$ | $\mathbf{MTF}_{R(P7) \Rightarrow T(P8)\ [L]}$ |
| P7 ($Rs_2$) | 3 | -150° | 0° | P10 | 4 | +165° | +30° | $\mathbf{MTF}_{R(P7) \Rightarrow T(P10)\ [R]}$ | $\mathbf{MTF}_{R(P7) \Rightarrow T(P10)\ [L]}$ |

Note:

1. Distance in meters
2. Position designators are arbitrary and refer to loudspeaker locations in ITU-R BS.775-1 7.1 channel loudspeaker layout (see FIG. 8)
3. Mapping Transfer Functions from a Reference sound source position ($P_R$) to a Target sound source position ($P_T$) for right and left ears [*R* / *L*]

FIG. 12

EXCERPT FROM EXAMPLE DATABASE OF MAPPING TRANSFER FUNCTIONS (MTFs)

EXEMPLARY HARDWARE ARCHITECTURE

Note: Only one channel of a stereo or multichannel sound reproduction system and one ear (R or L) is shown. Additional channels can be replicated in the same manner.

FIG. 14 BASIC SYSTEM DESIGN

EXEMPLAR SYSTEM DESIGN

ALTERNATE EXEMPLAR SYSTEM DESIGN

EXEMPLAR DESIGN: RECORDING / CONTENT CREATION

FIG. 18 ALTERNATE EXEMPLAR DESIGN: RECORDING / CONTENT CREATION

SYSTEM FUNCTIONAL IMPLEMENTATION (SW / HW)

EXEMPLAR SYSTEM DESIGN – HEADSET TYPE DEVICE APPLICATION

EXEMPLAR SYSTEM DESIGN – HEADSET TYPE DEVICE HEAD-TRACKING APPLICATION

EXEMPLAR SYSTEM DESIGN – SOUNDBAR OR TV/VIDEO MONITOR APPLICATION

FIG. 23 EXEMPLAR SYSTEM DESIGN – STEREO OR MULTICHANNEL LOUDSPEAKER APPLICATION

EXEMPLAR SYSTEM DESIGN – VEHICLE SOUND APPLICATION

VIRTUAL SOUND APPLICATIONS – AI & TECHNOLOGY DISTRIBUTION

SYSTEMS AND METHODS FOR GENERATION OF ACOUSTIC VIRTUAL SOUND SOURCES IN THREE-DIMENSIONAL SPACE AND UTILIZATION OF AI MACHINE LEARNING THEREFOR

FIELD

The present disclosure is related to high quality audio reproduction, and particularly to the reproduction of three-dimensional (3D) sound through use of signal processing. Some embodiments may further include machine learning (artificial intelligence).

BACKGROUND

The quality of reproduced audio continues to improve. One audio characteristic that is highly desired is the providing of 3D audio, also referred to as 3D sound, immersive audio and spatial audio, where 3D or spatial characteristics are reproduced. Generating a 3D audio experience using headset type devices (headphones, earphones, headsets, helmets, etc.) or external loudspeakers (including built-in systems for TV/video monitors, automotive, marine and aerospace vehicles, home in-wall, etc.) requires the accurate reproduction of multiple sound sources surrounding the listener.

The perception of sound sources in 3D space is dependent on the Head Related Transfer Function or HRTF. The HRTF is an acoustical or electrical response that characterizes how an ear receives a sound from a point in space. As sound strikes the listener, the size and shape of the head, ears (pinnae), ear canal and torso together transform the incoming sound into modified sound, and that affects how the incoming sound is perceived. In typical sound playback systems with external loudspeakers located 0.25 meters or more from the listener, the HRTF occurs acoustically and intrinsically and is uniquely individualized for each listener. As such, the HRTF will vary significantly for different listeners and is dependent on the position of every sound source.

In many applications, discrete acoustic playback transducers or loudspeakers required for one or more audio channels are missing from the listening environment, as in TV/video monitor sound and many soundbar type products. In many, if not most, multichannel home playback systems, some stipulated channels of loudspeakers are missing or incorrectly located with respect to a given format (e.g., Dolby, ITU, etc.). In these cases, the required HRTFs are either not present or are distorted and corrupt. The result is a severe compromise in 3D spatial perception and the listener's overall 3D sound (audio) experience.

In headset type devices, there are usually only two transducers present, one for a right audio channel and another for a left audio channel. These two transducers normally are positioned too close to the ear canal (30 mm or less) to generate suitable HRTFs that correspond to sound sources located in the spherical far-field space (greater than 1 meter) surrounding the listener. Furthermore, the two transducers are rarely oriented on the correct acoustical axes corresponding to right and left channel (external) loudspeakers for standard two-channel (stereo) playback systems, normally ±20-45 degrees from the front center axis of the listener. Moreover, other audio channels such as surround, center and height are seldom implemented. Thus, HRTFs are either missing or severely distorted and corrupt. As a result, conventional headset type devices cannot generate 3D spatial characteristics correctly and fail to generate a believable 3D audio experience for the listener.

Often, sound engineers mix or place sound objects in audio content at positions intended for the far-field spherical space surrounding the listener, where no playback channel transducers or loudspeakers are present or expected. This has become the norm for many applications such as virtual reality (VR), augmented reality (AR), gaming and home theater.

In today's audio world, it is typical that sound sources (intended on) being reproduced are located at listening positions (where loudspeakers should be located) that have no corresponding physical reproduction means, such as a discrete acoustic transducer or loudspeaker at that position; or the acoustic playback transducers or loudspeakers are not located as required for a specific audio format (such as shown in FIG. 8 for 5.1 or 7.1 channel content). For these cases, sound sources must be simulated or generated indirectly to be perceived as being present and correctly oriented in 3D space by the listener. The simulation or indirect generation of sound sources located in the 3D space surrounding a listener is conventionally termed "3D audio virtualization" and is an area of intense research in academia and product development in today's audio industry.

Many attempts of 3D audio virtualization for audio products utilize digital signal processing (DSP) and complex algorithms that typically incorporate some form of HRTF that is convolved with the audio signals in a playback device. These approaches are normally model-based, measurement-based or a combination thereof. Worldwide there are a significant number of HRTF databases produced that quantify HRTFs for sound source positions located in the spherical 3D space surrounding a reference listening position.

Model-based approaches attempt to simulate or emulate a nominal HRTF, based on averaged anthropometric data. The modeled HRTF is usually non-individualized and often lacking in accuracy due to the extraordinary degree of variation in human physiology, especially with pinnae (ears). As a result, most model-based approaches have very limited effectiveness, and are unconvincing to many, if not most, listeners.

Measurement-based approaches attempt to generate an individualized HRTF through in-situ measurements of the end user. These measurements are either acoustical, using in-ear microphones or optical, using scans, video or photos of the user's ears and head. These types of measurements are very complex and difficult to perform properly; they are not convenient or simple enough for most end users to perform. Often the measurement data acquired is error-prone or inaccurate. For example, the acoustic measurements are dependent on acoustical conditions in the measurement environment, as well as the test and measurement system hardware; scans of the pinnae from a smartphone camera often lack adequate 3D (angle-dependent and depth) information or are missing crucial data for the head, torso and shoulders. Furthermore, even if the measurements are performed correctly and accurately, they may not correspond to the optimal or recommended sound source locations of playback loudspeakers (for example, home theater loudspeakers that are located as recommended by international standards such as ITU-R BS.775-1 for 5.1 or 7.1 channel layouts, as shown in FIG. 8), or the intended location of sound objects in the surrounding 3D space.

Hybrid approaches that combine measurement-based and model-based techniques recently have been introduced, but still suffer from similar problems and issues. Hybrid approaches often combine limited user measurements (usually photos) with predictive models to realize a pseudo-individualized HRTF. As expected, their effectiveness usually lies somewhere between model-based and measurement-based approaches. While hybrid approaches can be more convenient than a pure measurement-based approach, they still suffer from inadequate measurement data, modeling inaccuracies and require computationally intense DSP to realize.

Conventional approaches to 3D audio virtualization are generally limited in effectiveness due to one or more of the following compromises:

1. Sound source HRTFs associated with acoustic transducers, loudspeakers, and sound objects are not individualized to the listener.
2. Sound source HRTFs associated with stipulated acoustic playback transducers or loudspeakers, and/or associated with intended sound objects mixed in the audio content are missing.
3. Sound source HRTFs are incorrect or corrupt and do not correlate to stipulated positions of acoustic playback transducers or loudspeakers, and/or for intended sound objects mixed in the audio content.

3D audio virtualization that is limited or ineffective will significantly diminish the listener's perception of spatial information present in all forms of audio content, degrading the 3D audio experience.

3D audio virtualization has become an important factor for most consumer, professional and commercial applications that require the reproduction of audio content, regardless of the number of channels or format, including but not limited to: music playback (including two-channel stereo), virtual reality (VR), augmented reality (AR), extended reality (XR), gaming sound, home theater sound, theater (film) sound, sound reinforcement (concert sound), automotive sound, marine and aircraft sound, military and aerospace simulation and communication.

Therefore, there is a need in the industry to address one or more of these issues.

SUMMARY

The present disclosure is related to high quality audio reproduction, and particularly to the reproduction of three-dimensional (3D) sound through use of signal processing. Some method embodiments may include a method comprising the steps of: determining one or more Head-Related Transfer Function (HRTF) data sets based on one or more other HRTF data sets, wherein the determined one or more HRTF data sets include: a pair of a first initial sound source position and a second initial sound source position in an initial three-dimensional (3D) space surrounding an initial origin point, wherein the first initial sound source position is at or within a proximity range of an initial reference sound source position which has an associated first real sound source, and wherein the second initial sound source position is at or within a proximity range of an initial target sound source position which has an associated second real sound source; and generating a spatial Mapping Transfer Function (MTF) based on the determined one or more HRTF data sets, wherein the spatial MTF is distinct from an HRTF, wherein performing one or more convolving operations involving the generated spatial MTF and audio data for an output target sound source position provides resulting audio data, the spatial MTF transforming one or more input HRTFs for an output reference sound source position to one or more output HRTFs for the output target sound source position, wherein performing one or more operations including mixing the resulting audio data with mixing-input audio data, based on audio data for the output reference sound source position, provides mixed audio data, wherein passing reproduction-input audio data, based on the mixed audio data, to a reference sound source audio reproduction channel to an output real sound source converts the reproduction-input audio data to an output sound, and wherein the output sound comprises: a real or virtual sonic image for the output reference sound source position that corresponds to the first initial sound source position, the output reference sound source position located within an output sound 3D space surrounding a 3D space point that corresponds to the initial origin point, and a virtual sonic image for the output target sound source position that corresponds to the second initial sound source position, the output target sound source position located within the output sound 3D space surrounding the 3D space point that corresponds to the initial origin point.

In some embodiments, the determined one or more HRTF data sets includes HRTF and sound source position data optimized by one or more of a group comprising: data filtering, data format conversion, data scaling, data normalization, and data weighting.

In some embodiments, the generation of the spatial MTF involves one or more data analyses performed, separately or in combination, from a group comprising: linear regression, multivariate regression, nonlinear regression, artificial neural network (ANN), data mining, K-nearest neighbors (KNN), and principal component analysis.

In some embodiments, artificial intelligence machine learning is utilized for one or more from a group comprising: searching data for, gathering data for, optimizing data for, and compiling data sets for producing training data or other inputs into algorithms to generate the spatial MTF.

In some embodiments, artificial intelligence machine learning is utilized to generate the spatial MTF based on HRTF data sets or training data in the determined one or more HRTF data sets, wherein the artificial intelligence machine learning uses one or more learning algorithms, separately or in combination, from a group comprising: linear regression, multivariate regression, nonlinear regression, artificial neural network (ANN), data mining, K-nearest neighbors (KNN), and principal component analysis.

In some embodiments, a feedback process and one or more of: validation data sets that comprise known HRTFs for pairs of sound source positions included in the HRTF data sets or training data in the determined one or more HRTF data sets, and test data sets that comprise known HRTFs for pairs of sound source positions not included in the HRTF data sets or training data in the determined one or more HRTF data sets are utilized to evaluate and adjust accuracy of the generated MTF.

Some system embodiments may include a system comprising: signal processing circuitry configured for: performing one or more convolving operations involving a spatial Mapping Transfer Function (MTF) and audio data for an output target sound source position to provide resulting audio data, the spatial MTF transforming one or more input Head-Related Transfer Functions (HRTFs) for an output reference sound source position to one or more output HRTFs for the output target sound source position, wherein the spatial MTF is distinct from an HRTF, wherein the spatial MTF is generated based on a determined one or more HRTF data sets, which are determined based on one or more other HRTF data sets, wherein the determined one or more HRTF data sets include: a pair of a first initial sound source position and a second initial sound source position in an initial three-dimensional (3D) space surrounding an initial origin point, wherein the first initial sound source position is at or within a proximity range of an initial reference sound source position which has an associated first real sound source, and wherein the second initial sound source position is at or within a proximity range of an initial target sound source position which has an associated second real sound source; and performing one or more operations including mixing the resulting audio data with mixing-input audio data, based on audio data for the output reference sound source position, to provide mixed audio data; wherein passing reproduction-input audio data, based on the mixed audio data, to a reference sound source audio reproduction channel to an output real sound source converts the reproduction-input audio data to an output sound, and wherein the output sound comprises: a real or virtual sonic image for the output reference sound source position that corresponds to the first initial sound source position, the output reference sound source position located within an output sound 3D space surrounding a 3D space point that corresponds to the initial origin point, and a virtual sonic image for the output target sound source position that corresponds to the second initial sound source position, the output target sound source position located within the output sound 3D space surrounding the 3D space point that corresponds to the initial origin point.

In some embodiments, the mixing-input audio data is based on the audio data for the output reference sound source position convolved with a specified HRTF for the output reference sound source position. In some embodiments, wherein the reproduction-input audio data is based on the audio data for the output reference sound source position convolved with a specified HRTF for the output reference sound source position.

In some embodiments, the signal processing circuitry comprises: digital signal processing (DSP), wherein the spatial MTF is fully or partially replicated, emulated or realized in a digital domain via the DSP configured to implement one or more from a group comprising: bilinear transformation, amplitude or magnitude equalization, and phase or delay alteration. In some embodiments, the signal processing circuitry comprises: digital signal processing (DSP), wherein the spatial MTF is fully or partially replicated, emulated or realized in a digital domain via the DSP that comprises one or more from a group comprising: FIR filter topologies and IIR filter topologies. In some embodiments, the signal processing circuitry comprises: digital signal processing (DSP), wherein the one or more convolving operations or the mixing is realized in a digital domain using the DSP that comprises one or more, separately or in combination, from a group comprising: a FIR filter topology, an IIR filter topology, and a digital mixer topology.

In some embodiments, wherein the signal processing circuitry comprises: a single or cascade arrangement of circuitry, wherein the one or more convolving operations or the mixing is realized in an analog domain via the single or cascade arrangement of circuitry having a filtering or mixing functionality of one or more from a group comprising; an amplitude or magnitude equalizer, an all-pass filter, and an analog mixer circuit topology.

In some embodiments, the signal processing circuitry is implemented in both digital and analog domains via one or more digital signal processing topologies from a group comprising FIR filters, IIR filters, and digital mixers in combination with one or more analog circuit topologies from a group comprising an amplitude or magnitude equalizer, an all-pass filter, and an analog mixer.

In some embodiments, the signal processing circuitry is distributed amongst multiple user devices or software, including one or more from a group comprising: application software, mobile phones, tablets, laptop computers, desktop computers, servers, dedicated or general audio processing devices, audio/video receivers, preamplifiers, amplifiers, powered or active loudspeakers, soundbars, headphones, earphones, headsets, helmets, wearable audio devices, simulation devices, automotive, marine or aerospace sound or communication systems, digital signal processors (DSPs), system on chip (SoC) devices, IC chipsets, and ICs.

In some embodiments, the spatial MTF is programmed, revised or changed via application software, firmware or operating system updates performed over the Internet through connected servers, computers, or similar means.

Some method embodiments may include a method comprising the steps of: performing one or more convolving operations involving a spatial Mapping Transfer Function (MTF) and audio data for an output target sound source position to provide resulting audio data, the spatial MTF transforming one or more input Head-Related Transfer Functions (HRTFs) for an output reference sound source position to one or more output HRTFs for the output target sound source position, wherein the spatial MTF is distinct from an HRTF, wherein the spatial MTF is generated based on a determined one or more HRTF data sets, which are determined based on one or more other HRTF data sets, wherein the determined one or more HRTF data sets include: a pair of a first initial sound source position and a second initial sound source position in an initial three-dimensional (3D) space surrounding an initial origin point, wherein the first initial sound source position is at or within a proximity range of an initial reference sound source position which has an associated first real sound source, and wherein the second initial sound source position is at or within a proximity range of an initial target sound source position which has an associated second real sound source; and performing one or more operations including mixing the resulting audio data with mixing-input audio data, based on audio data for the output reference sound source position, to provide mixed audio data; wherein passing reproduction-input audio data, based on the mixed audio data, to a reference sound source audio reproduction channel to an output real sound source converts the reproduction-input audio data to an output sound, and wherein the output sound comprises: a real or virtual sonic image for the output reference sound source position that corresponds to the first initial sound source position, the output reference sound source position located within an output sound 3D space surrounding a 3D space point that corresponds to the initial origin point, and a virtual sonic image for the output target sound source position that corresponds to the second initial sound source position, the output target sound source position located within the output sound 3D space surrounding the 3D space point that corresponds to the initial origin point.

In some embodiments, the step of performing the one or more convolving operations and the step of performing the one or more operations including mixing the resulting audio data with the mixing-input audio data are segregated or distributed amongst multiple user devices or software, including one or more from a group comprising: application software, mobile phones, tablets, laptop computers, desktop computers, servers, dedicated or general audio processing devices, audio/video receivers, preamplifiers, amplifiers, powered or active loudspeakers, soundbars, headphones, earphones, headsets, helmets, wearable audio devices, simulation devices, automotive, marine or aerospace sound or communication systems, digital signal processors (DSPs), system on chip (SoC) devices, IC chipsets, and ICs.

In some embodiments, the spatial Mapping Transfer Function (MTF) has an amplitude or magnitude response that is fully or partially replicated, emulated or realized irrespective of a phase or delay response.

In some embodiments, artificial intelligence machine learning is utilized to generate the spatial MTF based on HRTF data sets or training data in the determined one or more HRTF data sets.

Other systems, methods, apparatuses, and features of the present disclosure will be or become apparent to one having ordinary skill in the art upon examining the following drawings and detailed description. It is intended that all such additional systems, methods, apparatuses, and features be included in this description, be within the scope of the present disclosure.

BRIEF DESCRIPTION OF THE DRAWINGS

The accompanying drawings are included to provide a further understanding of the disclosure, and as noted are incorporated in and constitute a part of this specification. The drawings illustrate embodiments of the disclosure and, together with the description, serve to explain the principles of the disclosure. FIGS. 9-25 are incorporated in and constitute a part of the specification of the present disclosure.

FIG. 1 is an explanatory illustration showing a typical reproduced and perceived sound source located within a spherical volume surrounding a listener.

FIG. 2 is an explanatory illustration showing the cartesian planes and coordinate axes (X, Y, Z) that describe the 3D Euclidean space surrounding the listener, with an origin located at the center of the listener's head and the three reference planes defining the space. The Median plane is defined by the intersection of the Y-axis and the Z-axis. The Lateral plane is defined by the intersection of the X-axis and the Z-axis. The Horizontal plane is defined by the intersection of the X-axis and the Y-axis.

FIG. 3 is an explanatory illustration showing two sound sources, $P_R$ and $P_T$, located in the spherical space surrounding the listener. The position of these sound sources is described using spherical coordinates, r, θ, ϕ; the coordinate axes (X, Y, Z) are shown for reference, as well as the origin (C), located at the center of the listener's head. "r" refers to the radial distance from the center of user's head, C, to the sound source P, θ refers to the azimuthal (rotation) angle subtended from the Y-axis (facing forward) to the orthogonal projection of a ray from the center of the listener's head, C, to the sound source P onto the Horizontal (X-Y) plane. ϕ refers to the elevation angle subtended from the Horizontal plane (at Z=0) to a ray from the center of the listener's head, C, to the sound source P.

FIG. 4 is an explanatory illustration showing two sound sources, $P_R$ and $P_T$, located in the spherical space surrounding the listener and acoustic transfer functions, $H_R$, $H_T$, for the right and left ears of the listener. Together, $H_{R(R)}$, $H_{R(L)}$ and $H_{T(R)}$, $H_{T(L)}$ describe the location of sound sources $P_R$ and $P_T$ respectively, from the perspective of the listener. H is commonly defined as a Head Related Transfer Function, HRTF, that varies with frequency (f) and is unique for each sound source and listener.

FIG. 5 is an explanatory illustration showing a top view of the Horizontal (X-Y) reference plane with two sound sources, $P_R$ and $P_T$, located in the spherical space surrounding the listener and acoustic transfer functions, $H_R$, $H_T$, for the right and left ears of the listener.

FIG. 6 is an explanatory illustration showing a front view of the Lateral (X-Z) reference plane with two sound sources, $P_R$ and $P_T$, located in the spherical space surrounding the listener and acoustic transfer functions, $H_R$, $H_T$, for the right and left ears of the listener.

FIG. 7 is an explanatory illustration showing a side view of the Median (Y-Z) reference plane with two sound sources, $P_R$ and $P_T$, located in the spherical space surrounding the listener and acoustic transfer functions, $H_R$, $H_T$, for the right and left ears of the listener.

FIG. 8 is an explanatory illustration showing a typical 7.1 channel loudspeaker layout, based on the ITU-R BS.775-1 recommendation. This is a common multichannel loudspeaker arrangement used for reproducing sound for video (home theater), gaming and music. Variations of this configuration exist for 5.1, 10.2, 11.1, etc., up to 22.2 channels. At least one acoustic transducer or loudspeaker is typically used to reproduce each channel of audio content.

FIG. 9 illustrates a machine learning (AI) hardware architecture that may be utilized for implementation of the exemplary structure and function of embodiments of the present machine learning (AI) system.

FIG. 10 illustrates an exemplary structure and function of embodiments of the present machine learning (AI) system implementation for acquiring and optimizing training data, in accordance with the present system and/or method. This may be a precursor operation to further AI training shown in FIG. 11.

FIG. 11 illustrates an exemplary structure and function of embodiments of the present machine learning (AI) system implementation for AI training, in accordance with the present system and/or method. This operation is supervised type machine learning that generates spatial Mapping Transfer Functions (MTFs) from supplied training data in accordance with the present system and/or method.

FIG. 12 illustrates an excerpt from an example database of generated spatial Mapping Transfer Functions (MTFs). The database can be generated from the machine learning engine as an output of the AI training shown in FIG. 11.

FIG. 13 illustrates a hardware architecture that may be utilized for electronic implementation of the exemplary structure, function and embodiments of the disclosure, in accordance with the present system and/or method.

FIG. 14 is a general schematic block diagram that illustrates an exemplary structure and function of embodiments of the present electronic implementation, in accordance with the present system and/or method. This is a case for sound reproduction where no acoustic transducer or loudspeaker is located at a designated or desired reference sound source position, or where the corresponding HRTF is incorrect, corrupt or missing. For simplicity, HRTFs and MTFs are shown for one ear (right or left). Two sound sources, respectively at one reference position and at one target position, are shown for a single channel of a stereo or multichannel sound reproduction system. Additional channels may be replicated in the same manner.

FIG. 15 is a schematic block diagram that illustrates an exemplary structure and function of embodiments of the present electronic implementation, in accordance with the present system and/or method. This is a case for sound reproduction where no acoustic transducer or loudspeaker is located at a designated or desired reference sound source position, or where the corresponding HRTF is incorrect, corrupt or missing. For simplicity, HRTFs and MTFs are shown for one ear (right or left). Four sound sources, respectively at one reference position and at three target positions, are shown for a single channel of a stereo or multichannel sound reproduction system. Additional channels may be replicated in the same manner.

FIG. 16 is schematic block diagram that illustrates an alternate exemplary structure and function of embodiments of the present electronic implementation, in accordance with the present system and/or method. This may be a case for sound reproduction where an acoustic transducer or loudspeaker is located at a designated or desired reference sound source position, and where the corresponding HRTF is correct and implemented acoustically at the designated or desired reference sound source position. This may also be a case for sound production where no acoustic transducer or loudspeaker is located at a designated or desired reference sound source position, and where the corresponding HRTF is correct and implemented electronically anywhere in the sound reproduction system. For simplicity, HRTFs and MTFs are shown for one ear (right or left). Four sound sources, respectively at one reference position and at three target positions, are shown for a single channel of a stereo or multichannel sound reproduction system. Additional channels may be replicated in the same manner.

FIG. 17 is a schematic block diagram that illustrates an exemplary structure and function of embodiments of the present electronic implementation, in accordance with the present system and/or method. This is a case for audio recording and content creation where no acoustic transducer or loudspeaker (in a sound reproduction system) is located at a designated or desired reference sound source position, or where the corresponding HRTF is incorrect, corrupt or missing. Several sound sources, including at three reference positions and at least three target positions, are shown for a multichannel audio recording or content creation system. Additional objects and channels may be added in the same manner, prior to audio channel encoding. For simplicity, HRTFs and MTFs are shown for one ear (right or left).

FIG. 18 is a schematic block diagram that illustrates an alternate exemplary structure and function of embodiments of the present electronic implementation, in accordance with the present system and/or method. This is a case for audio recording and content creation where an acoustic transducer or loudspeaker (in a sound reproduction system) is located at a designated or desired reference sound source position, and where the corresponding HRTF is correct and implemented acoustically at the designated or desired reference sound source position. This may also be a case for sound production where no acoustic transducer or loudspeaker is located at a designated or desired reference sound source position, and where the corresponding HRTF is correct and implemented electronically anywhere in the sound reproduction system. Several sound sources, including at three reference positions and at least three target positions, are shown for a multichannel audio recording or content creation system. Additional objects and channels may be added in the same manner, prior to audio channel encoding. For simplicity, HRTFs and MTFs are shown for one ear (right or left).

FIG. 19 illustrates three exemplary structures and functions of embodiments of the present software and/or hardware (circuit) implementation, in accordance with the present system and/or method. FIG. 19(*a*) shows two digital signal processing (DSP) software and/or hardware realizations implemented in the digital domain, in accordance with the present system and/or method. FIG. 19(*b*) shows an analog hardware realization implemented in the analog domain, in accordance with the present system and method. FIG. 19(*c*) shows a hybrid digital/analog software and/or hardware realization implemented in both the digital and analog domains, in accordance with the present system and/or method.

FIG. 20 is a schematic block diagram that illustrates an embodiment of the present disclosure for headset type device applications, showing an exemplary structure and function in accordance with the present system and/or method.

FIG. 21 is a schematic block diagram that illustrates an embodiment of the present disclosure for head tracking applications in headset type devices, showing an exemplary structure and function in accordance with the present system and/or method.

FIG. 22 is a schematic block diagram that illustrates an embodiment of the present disclosure for soundbar or TV/video monitor applications, showing an exemplary structure and function in accordance with the present system and/or method.

FIG. 23 is a schematic block diagram that illustrates an embodiment of the present disclosure for stereo or multichannel (e.g., home theater) external loudspeaker applications, showing an exemplary structure and function in accordance with the present system and/or method.

FIG. 24 is a schematic block diagram that illustrates an embodiment of the present disclosure for vehicle sound applications, showing an exemplary structure and function in accordance with the present system and/or method.

FIG. 25 illustrates a selection of various virtual sound applications that may incorporate and utilize the technology of the present disclosure. Several key attributes of the technology of the present disclosure are highlighted, related to the AI processing and technology distribution via the Internet.

DETAILED DESCRIPTION

The present system and/or method apply to any stereo, multichannel or object-based 3D audio sound reproduction system or equipment, which are designated for applications that involve the reproduction of audio content as sound, including but not limited to headset type device(s) and external transducer(s) or loudspeaker(s). In this disclosure, "headset type device(s)" include, but are not limited to, headsets, headphones, earphones, helmets and wearable sound devices (including AR glasses). In this disclosure, "external transducer(s) or loudspeaker(s)" include, but are not limited to, external acoustic transducers, loudspeakers and built-in loudspeakers comprised of one or more acoustic transducers. The present disclosure enables realistic sonic images (spatial characteristics) to be perceived in the three-dimensional space surrounding a designated user (listener) or origin point through the generation of acoustic virtual sound sources.

Figure 1:
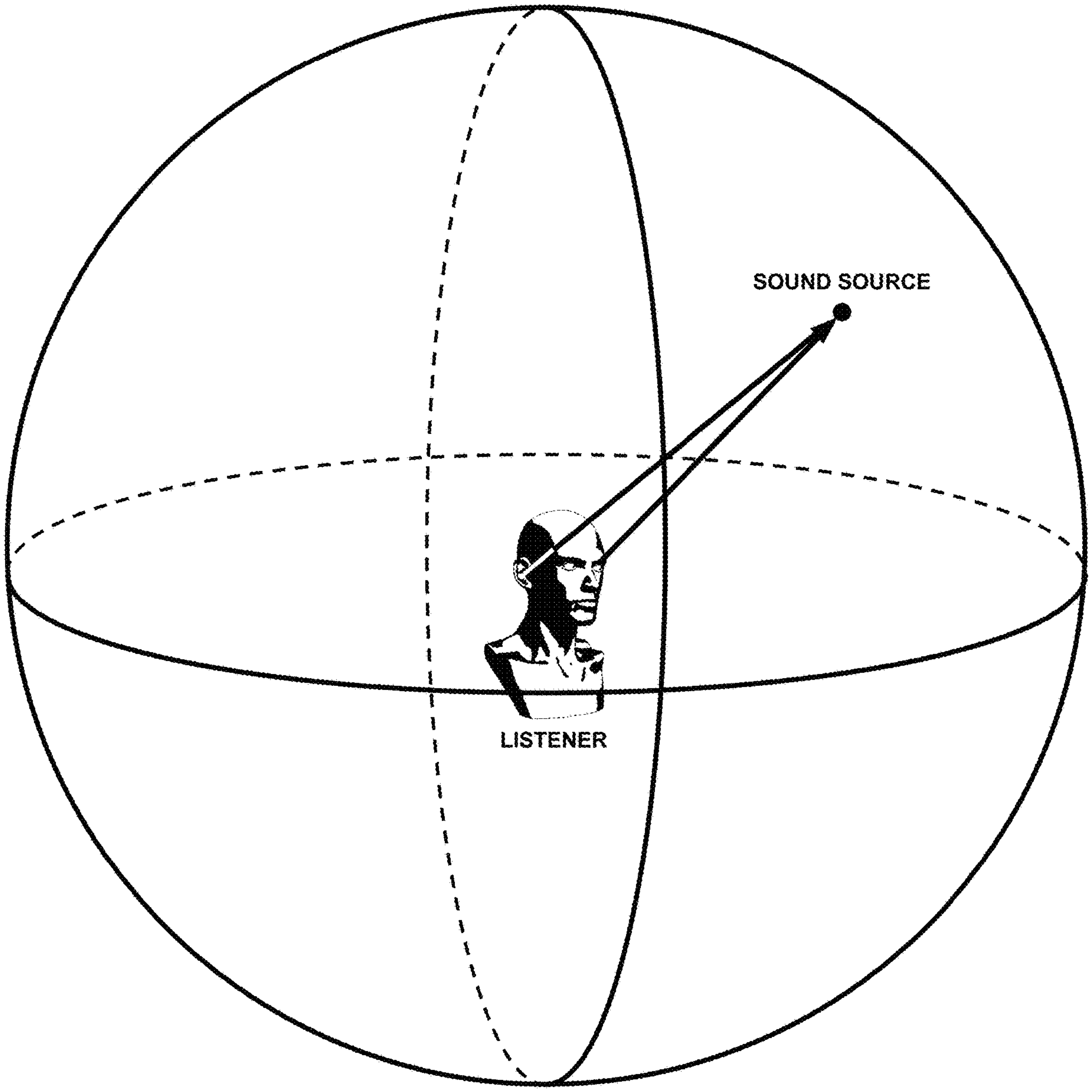
FIGS. 1-8 are explanatory illustrations that serve to explain and clarify the underlying principles and contextual information referred to in the detailed description of the disclosure.

FIG. 1 is a reference illustration showing a typical reproduced and perceived sound source located within a spherical volume surrounding a listener. The acoustic virtual sound sources, referred to as "virtual sound sources", can be positioned at locations within the full sphere space surrounding a listener where no acoustic transducers or loudspeakers are actually physically present.

Throughout this disclosure the three-dimensional space or volume surrounding a listener or origin point may be described or referred to as "spherical"; however, this is not meant to be limiting. Any 3D space or volume, for example a cubic space, would be equally valid for the present system and/or method. Other forms of space or volume can always be fit within or defined within a larger spherical volume. Moreover, the standard for describing or defining a surrounding space or volume in acoustics and the audio industry is in spherical terms. Thus, this disclosure adheres to the standardized terminology when referring to or describing surrounding 3D space or volume, but the teachings of this disclosure are applicable to any 3D space or volume.

Figure 2:
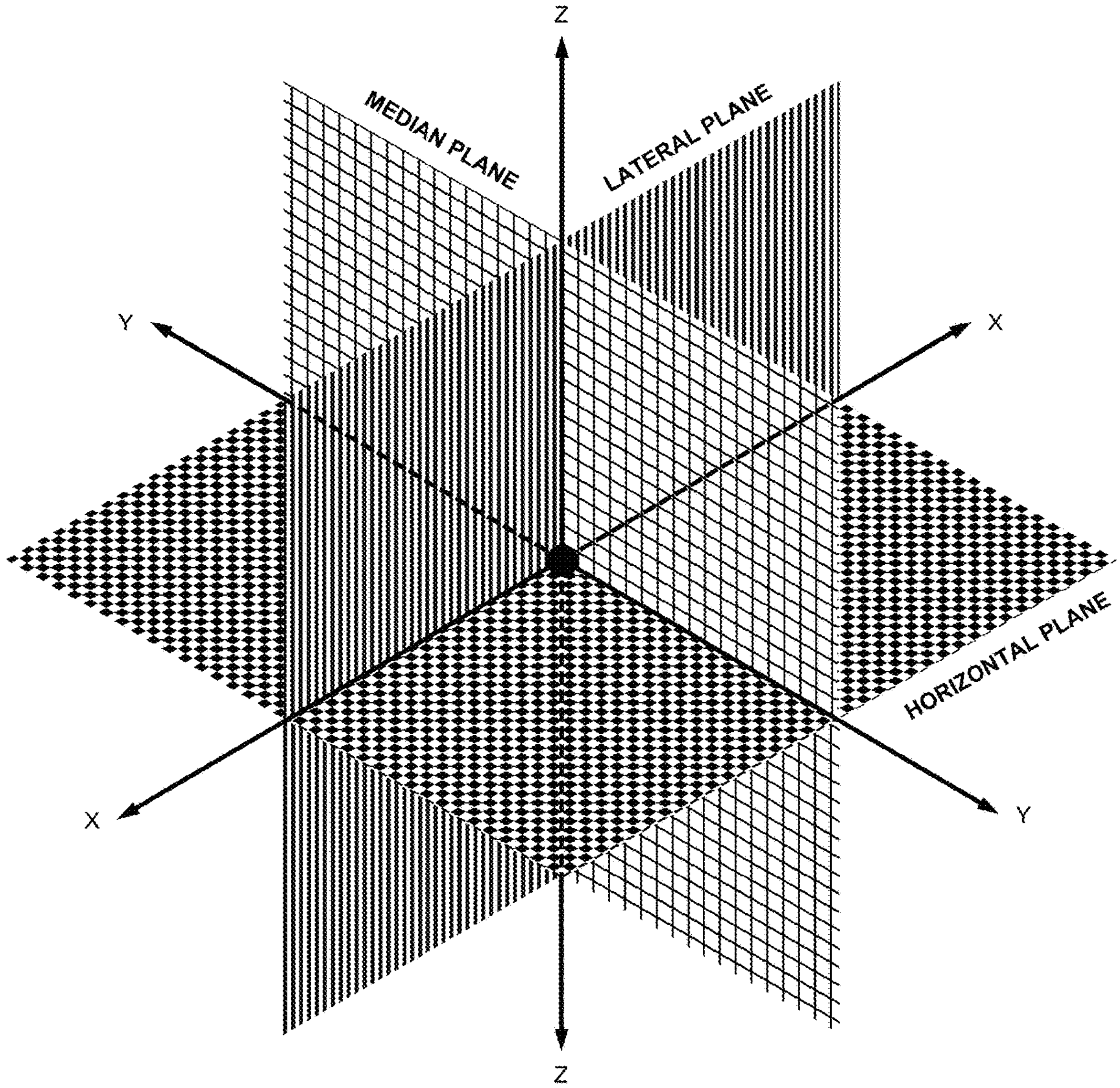

The physical location of sound sources in three-dimensional space can be represented in 3D Euclidean space with cartesian (X, Y, Z) coordinates as shown in FIG. 2, with an origin located at the center of the listener's head and the three reference planes defining the space. The Median plane is defined by the intersection of the Y-axis and the Z-axis. The Lateral plane is defined by the intersection of the X-axis and the Z-axis. The Horizontal plane is defined by the intersection of the X-axis and the Y-axis.

Figure 3:
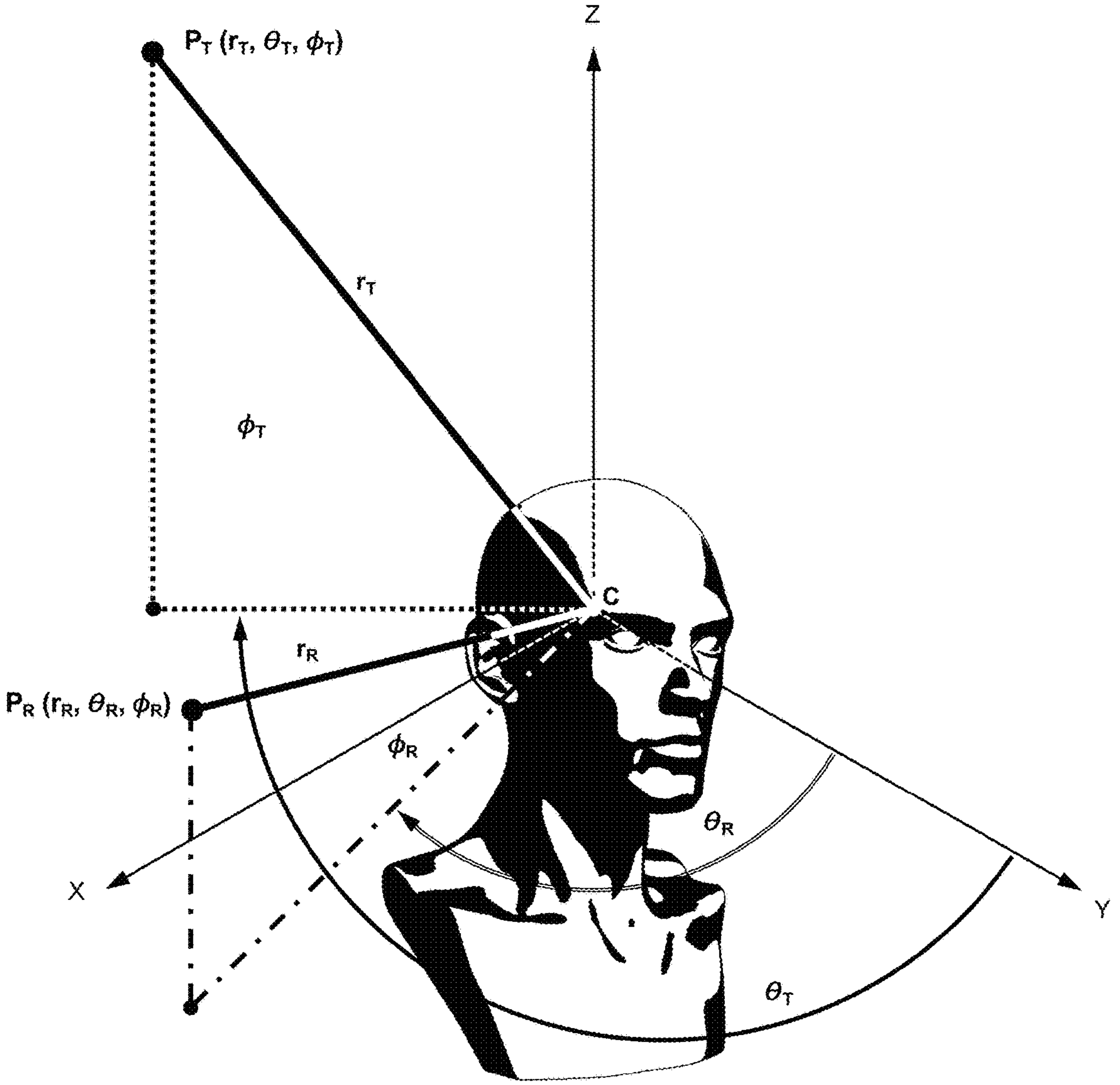

The physical location of sound sources in three-dimensional space also can be defined in a vertical-polar, spherical coordinate system as shown in FIG. 3, with the center of the listener's head being coincident with the origin of a full-sphere space surrounding the listener, at (0, 0°, 0°) in the coordinate system. In FIG. 3 two sound sources, $P_R$ and $P_T$, are located in the spherical space surrounding the listener. The position of these sound sources is described using spherical coordinates, r, θ, ϕ; the coordinate axes (X, Y, Z) are shown for reference, as well as the origin (C), located at the center of the listener's head. "r" refers to the radial distance from the center of user's head (C) to the sound source P. θ refers to the azimuthal (rotation) angle subtended from the Y-axis (facing forward) to the orthogonal projection of a ray from the center of the listener's head, C, to the sound source P onto the Horizontal (X-Y) plane. ϕ refers to the elevation angle subtended from the Horizontal plane (at Z=0) to a ray from the center of the listener's head, C, to the sound source P.

The human perception of sound sources in 3D space is dependent on the Head Related Transfer Function or HRTF. The HRTF is a transfer function response that characterizes how an ear receives a sound from a point in space. As sound strikes the listener, the size and shape of the head, ears (pinnae), ear canal and torso together transform the incoming sound into modified sound, primarily through acoustical reflection and diffraction, and that affects how the incoming sound is perceived. If a sound source, for example, an external loudspeaker in a typical sound playback system, is located 0.25 meter or more from the listener, the resulting HRTF is acoustic, intrinsic and uniquely individualized for each listener. As such, the HRTF will vary significantly for different listeners and is dependent on the position of every sound source. Individualized HRTFs preserve three critical cues (spatial information) required by our brains to accurately localize sound in three dimensions: 1) Interaural Level or Intensity Difference (ILD or IID), 2) Interaural Spectral Difference (ISD) and 3) Interaural Time or Phase Difference (ITD or IPD). These informational cues will vary significantly from person to person. Moreover, HRTFs for a given sound source usually differ for the right and left ears of a listener.

HRTFs have four independent variables related to the frequency (excitation) and physical location of a sound source. The frequency of excitation, f, is usually broadband and equivalent to the bandwidth of human hearing, defined as 20 Hz to 20 kHz, even if the HRTF is relatively nonvariant at frequencies below 100 Hz and frequencies above 12 kHz. Typically, HRTFs specify the same frequencies (bandwidth or spectrum) for different sound source positions.

Figure 4:
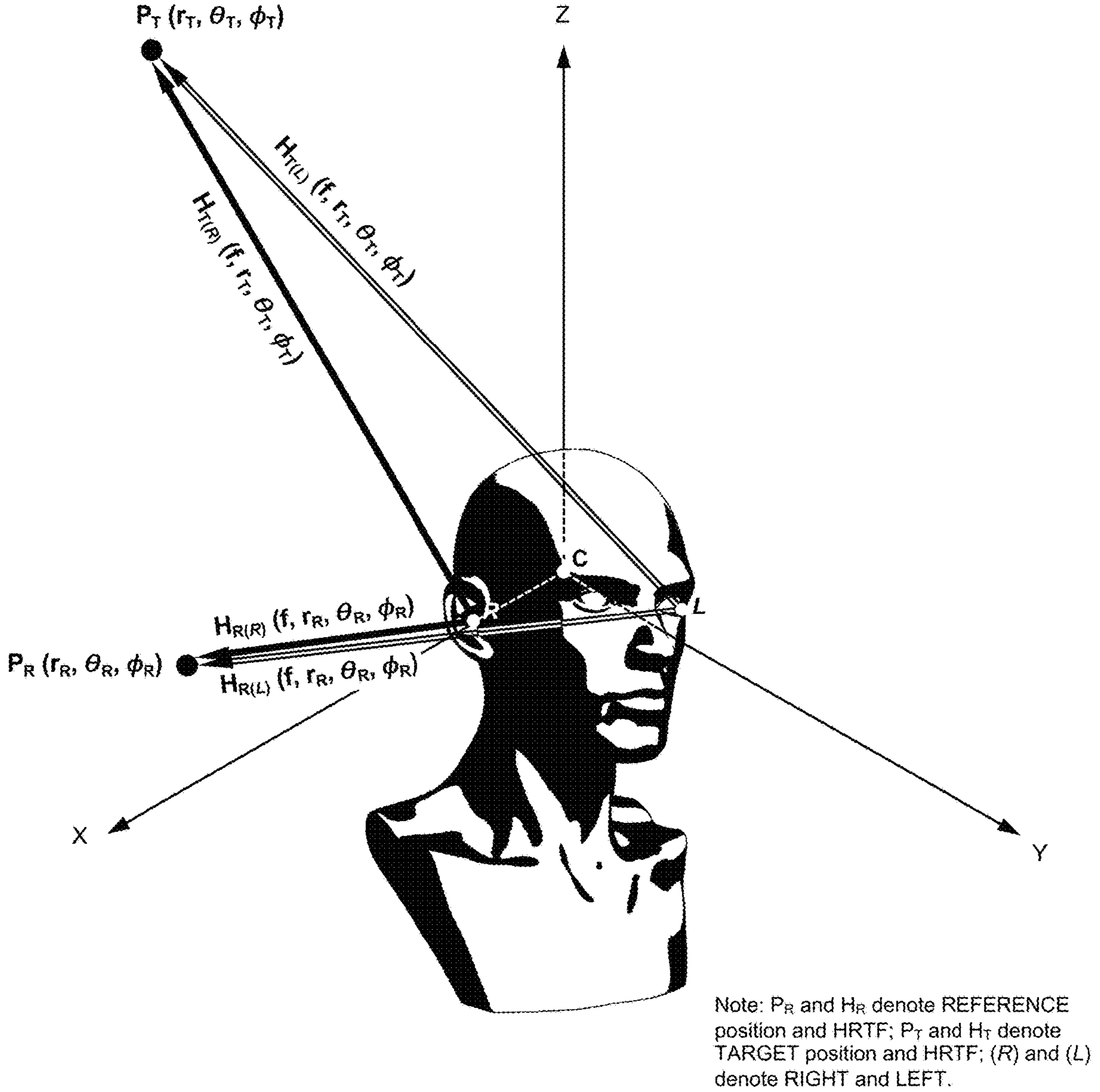
Figure 5:
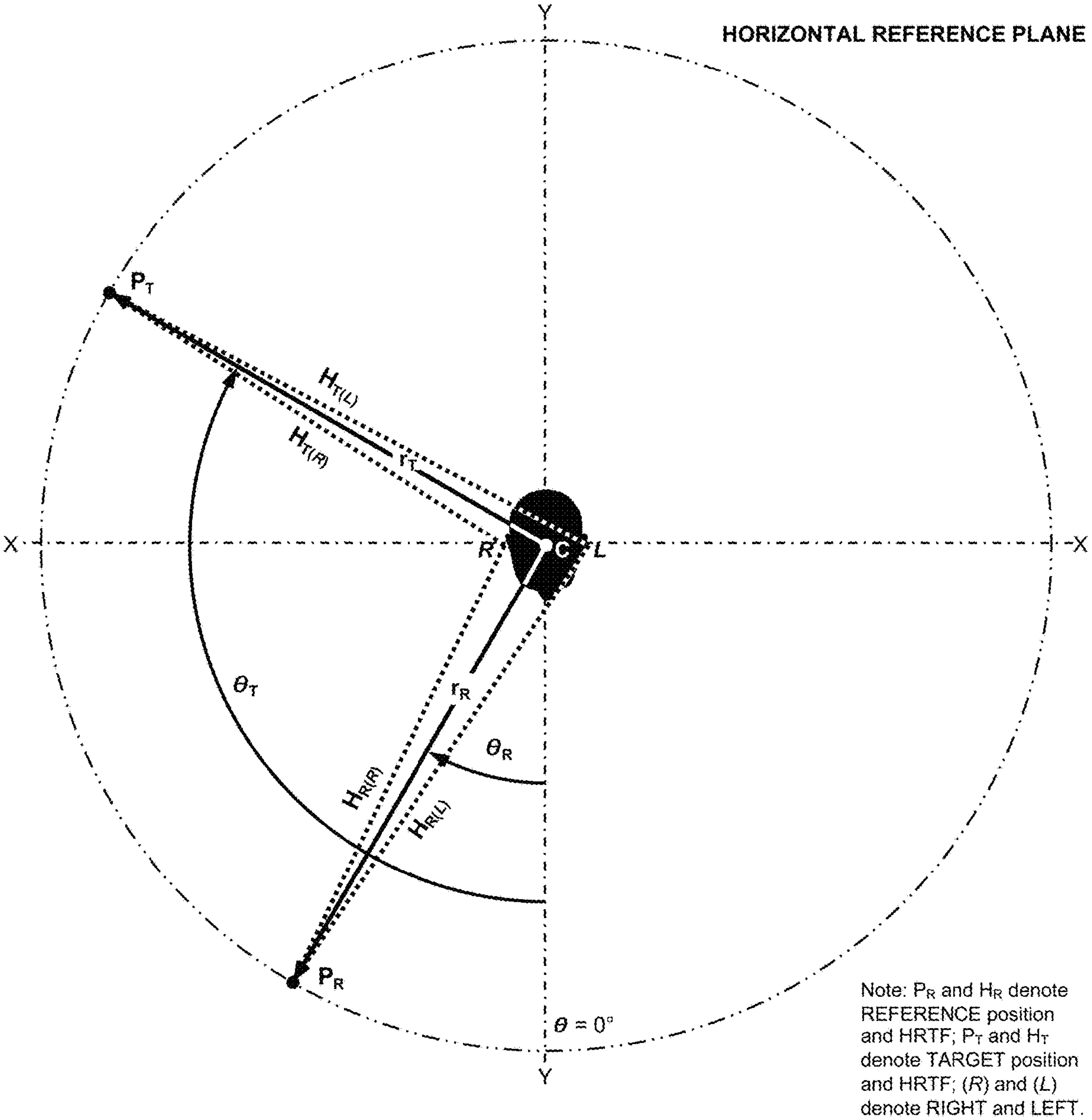
Figure 6:
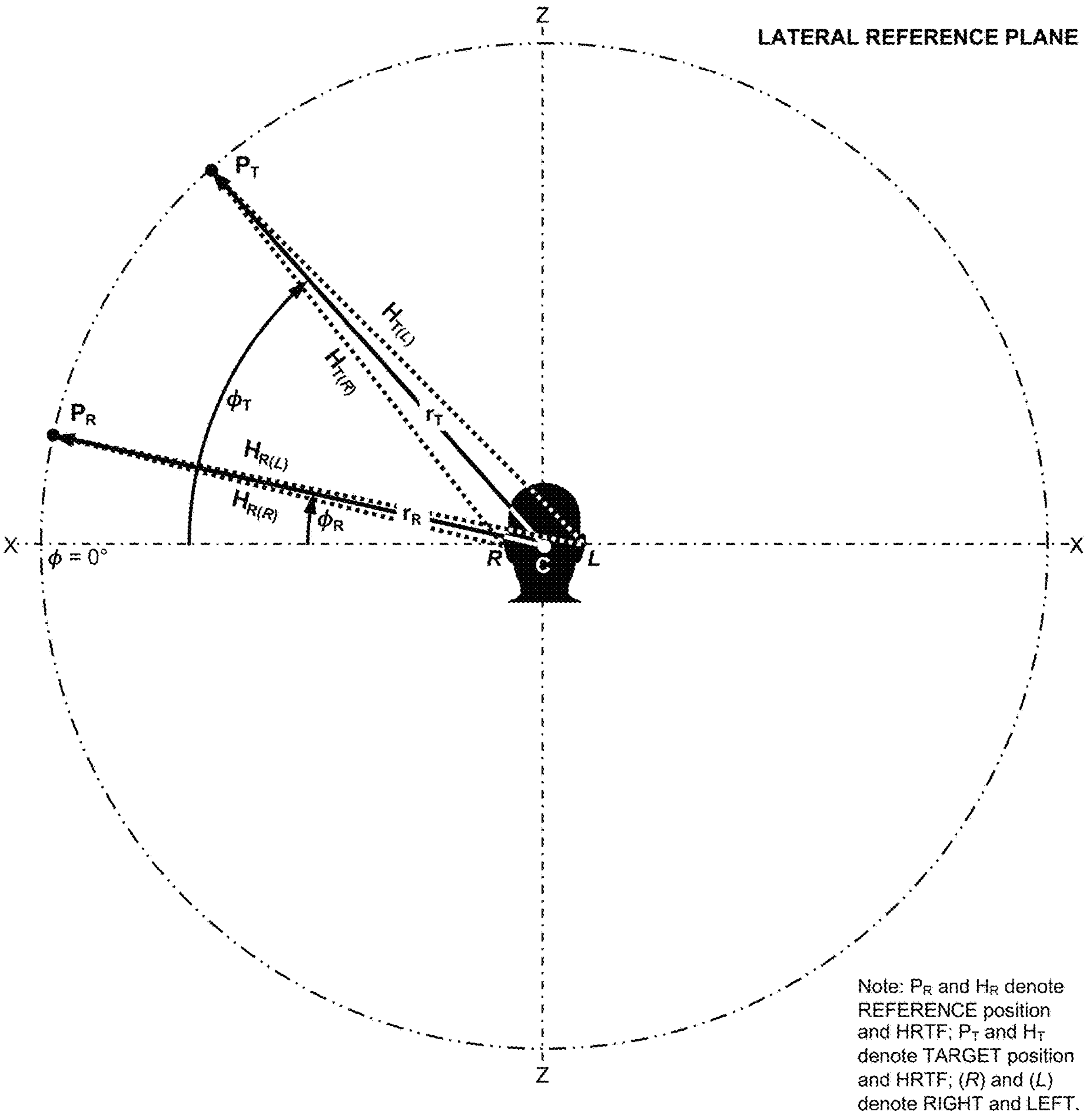
Figure 7:
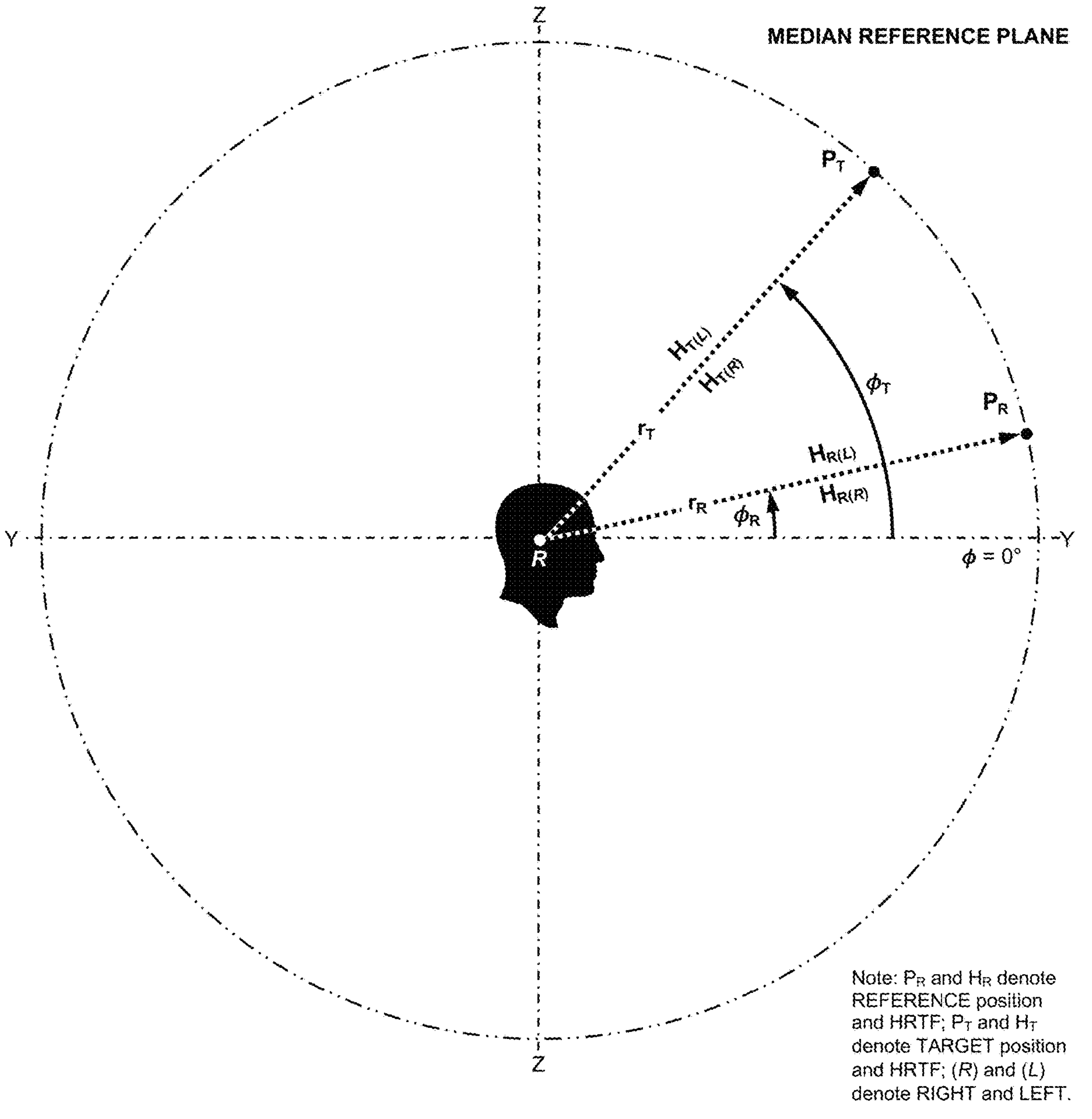

In most cases, HRTFs utilize vertical-polar spherical coordinates to define the location of sound sources relative to the listener, as shown in FIG. 4. Thus, HRTFs are conventionally characterized as HRTF (f, r, θ, ϕ). FIG. 4 shows two sound sources, $P_R$ and $P_T$, located in the spherical space surrounding the listener and their corresponding acoustic transfer functions, $H_R$, $H_T$, for the right and left ears of the listener. Together, $H_{R(R)}$, $H_{R(L)}$ and $H_{T(R)}$, $H_{T(L)}$ describe the location of sound sources $P_R$ and $P_T$ respectively, from the perspective of the listener. H represents the aforementioned Head Related Transfer Function, HRTF, that varies with frequency (f) and is unique for each sound source and listener. For clarity FIGS. 5-7 show the sound sources and HRTFs in the three discrete reference planes of the spherical space surrounding the listener. FIG. 5 shows a top view of the Horizontal (X-Y) reference plane with two sound sources, $P_R$ and $P_T$, and acoustic transfer functions, $H_R$, $H_T$, for the right and left ears of the listener. FIG. 6 shows a front view of the Lateral (X-Z) reference plane; and FIG. 7 shows a side view of the Median (Y-Z) reference plane.

HRTFs have two dependent variables (dependent on the four independent variables above): magnitude (or amplitude) which is typically defined as Sound Pressure Level in decibels (dB SPL) or simply decibels (dB), and phase (or delay), defined in degrees. As such, HRTFs can be expressed electrically or acoustically in the frequency domain (Fourier space), with both amplitude (or magnitude) and phase (or delay) varying with frequency, sound source position and individual listener. It is standard to acoustically measure or calculate HRTFs for the right and left ears, at the entrance of the ear canal, designated as $HRTF_R$ and $HRTF_L$, even though the sound source position is normally specified relative to the center of the head. Because HRTFs are mathematically described transfer functions, they characterize an input-output relationship, where the output is an acoustic response at the ear canal for differing sound source positions (inputs).

The present disclosure produces acoustic virtual sound sources at target sound source positions, $P_T$ ($r_T$, $\theta_T$, $\phi_T$) by employing Target Head-Related Transfer Functions, $HRTF_T$ (f, $r_T$, $\theta_T$, $\phi_T$). The Target Head-Related Transfer Functions, $HRTF_T$ (f, $r_T$, $\theta_T$, $\phi_T$) are generated by the convolution of reference Head-Related Transfer Functions, $HRTF_R$ (f, $r_R$, $\theta_R$, $\phi_R$) with the spatial Mapping Transfer Functions (referred to as $MTF_{R\Rightarrow T}$). The reference Head-Related Transfer Functions, $HRTF_R$ are correlated to both the reference sound source positions, $P_R$ ($r_R$, $\theta_R$, $\phi_R$) and the spatial Mapping Transfer Functions, $MTF_{R\Rightarrow T}$. The $MTF_{R\Rightarrow T}$ is associated with designated pairs of sound source positions ($P_R$, $P_T$).

Based on the mathematical Convolution Theorem which states, "the product of two functions in real space is the same as the convolution of their Fourier transforms in Fourier space", it follows that:

$$HRTF_T(f, r_T, \theta_T, \phi_T) \equiv HRTF_R(f, r_R, \theta_R, \phi_R) \ast MTF_{R\Rightarrow T}(f, r_{R\Rightarrow T}, \theta_{R\Rightarrow T}, \phi_{R\Rightarrow T}) \quad \text{(Eq. 1)}$$

where (r, θ, ϕ) determine locations within a three-dimensional space, which can be described as a full-sphere dense spatial grid surrounding the designated user or origin point, and are characterized by radial distance (r), horizontal azimuth angle (θ), and vertical elevation angle (ϕ) from the designated user or fixed origin point in a vertical-polar, spherical coordinate system. Because frequency, f, is the same for all functions and sound source positions, it can be ignored in the subsequent analysis and description.

As shown in (Eq. 1) the spatial Mapping Transfer Function ($MTF_{R \Rightarrow T}$) is defined as a mathematical transfer function that models a system's output for each possible input, wherein the input is a $HRTF_R$ for a reference sound source position and the output is a $HRTF_T$ for a target sound source position.

A key characteristic of this relationship is that the target $HRTF_T$ can be individualized for a listener if the reference $HRTF_R$ is individualized for that listener. The spatial Mapping Transfer Function describes how the HRTF may change acoustically when a sound source is moved from a reference sound source position that may have an acoustic transducer or loudspeaker present with a known $HRTF_R$ (which may also be individualized) to a particular target sound source position where there is no acoustic transducer or loudspeaker present, with an unknown HRTF. Thus, $MTF_{R \Rightarrow T}$ is a mathematic transfer function characterizing an input-output relationship, where the output is the target $HRTF_T$, and the input is the known (and possibly individualized) reference $HRTF_R$.

Though both are mathematical transfer functions, the spatial Mapping Transfer Function, MTF, is not equivalent to a HRTF. MTFs and HRTFs differ in their defined function and are not interchangeable. As a particular target sound source approaches the position of the reference sound source, the corresponding MTF converges to a function of unity. Moreover, if a particular target sound source is axially aligned with the position of the reference sound source (i.e., $\theta_T = \theta_R$ and $\phi_T = \phi_R$) where both positions are located in the far-field space, approximately 3 meters or more from the listener (C), with $r_T > r_R$, the corresponding MTF converges to a function of pure attenuation and delay.

The present disclosure may generate the spatial Mapping Transfer Function, $MTF_{R \Rightarrow T}$, by evaluating and characterizing relationships, patterns and dependencies of HRTFs for the same pair of reference and target acoustic sound source positions ($P_R$, $P_T$) in one or more data sets of HRTFs. The data sets of the HRTFs may be comprised of measurement-based data, modeling based data, or a combination thereof. The data sets of the HRTFs may be based on or come from large, accessible (open or closed or authorization-based) scientific or research data sets of HRTFs.

The measurement-based data sets of HRTFs may be produced from human subjects (using acoustical or optical measurements) or produced from generalized head and torso dummies that typically include universal pinnae, i.e., standard Head and Torso Simulation dummies, also known as "HATS" dummies. HRTF data sets may also be produced using mathematical geometric modeling or physics-based simulation of the head, torso, pinnae, and other relevant human physiologies.

These HRTF data sets may include, but are not limited to, hundreds to thousands of discrete HRTFs (usually for right and left ears) corresponding to sound source positions located in a 3D spherical space surrounding a listener or origin point. The HRTF data sets may be non-individualized for a particular listener, even with data sets comprised of acoustic measurements of human subjects. Nonetheless, MTFs derived from non-individualized HRTFs can be used to generate individualized target HRTFs, when the MTFs are convolved with individualized reference HRTFs in a system.

HRTF data sets may be produced and published by various academic institutions, industry consortiums, research organizations, government agencies and corporations worldwide. A partial listing of HRTF data sets includes but is not limited to: IRCAM (Listen Project, AKG and Institute for Research and Coordination in Acoustics/Music, France), CIPIC (University of California at Davis, USA), RIEC (Tohoku University, Japan), SYMARE (University of Sydney, Australia), ITA (Aachen University, Germany), ARI (Austrian Academy of Sciences, Austria), FIU (Florida International University, USA), MIT-KEMAR (Massachusetts Institute of Technology, USA), SONICOM (Imperial College London, UK), CIT (Chiba Institute of Technology, Japan), VIKING (University of Iceland, Iceland), 3D3A Lab (Princeton University, USA), KAIST (Korea Advanced Institute of Science and Technology, Korea), SADIE I/II (University of York, UK). Most HRTF data sets use the SOFA format for their data, which is a spatially oriented format for acoustics. SOFACONVENTIONS.org provides a more complete list of HRTF data sets and additional information on the SOFA format.

For the present disclosure, HRTF data sets may be analyzed and evaluated to eliminate any data set(s) and data that may be invalid, faulty or in some manner unsuitable or inapplicable for determination of the spatial Mapping Transfer Function, MTF. For example, HRTF data sets that have measurement points that are not located at the ear canal entrance, or HRTF data sets for hearing aid devices may be excluded. Once valid and suitable HRTF data sets are established, data from within these data sets that corresponds to the selected (desired) reference sound source position ($P_R$) and target sound source position ($P_T$) can be collated and algorithmically analyzed. Prerequisites for an accurate analysis can be a collective process referred to as data optimization and comprise:

1. Filtering of data to eliminate invalid, irrelevant and inappropriate data sets.
2. Translation or conversion of data to a common standard, or equivalent format.
3. Normalization of data such that the HRTFs across different data sets can be combined and analyzed correctly; for example, 0 dB reference frequencies of HRTF amplitude (or magnitude) response may be established and consistent; data may be scaled equally; data range and units may be equivalent.
4. Optional weighting of data to prioritize data sets.

Additional considerations for data analysis related to data filtering may include:

5. Separation of right and left HRTF data, even if they relate to the same reference or target sound source position.
6. Reference sound source position ($P_R$) data and target sound source position ($P_T$) data both may be present within the specific HRTF data sets being analyzed, or positions may be within prescribed limits (spatial windows) to be considered acoustically equivalent.

A 1:1 positional correlation (location matching) between sound source positions selected for the spatial Mapping Transfer Function, MTF (i.e., reference and target sound source positions) and the sound source positions within each prospective HRTF data set is optimal, but not an absolute prerequisite. Some variances of position that are considered acoustically "equivalent" may be tolerable depending on the level of error desired. Suggested positional matching limits or recommended spatial windows for azimuth, θ, and elevation, ϕ, are within ±1.5°. HRTFs vary significantly when sound sources are located in the near-field space, <0.5 meter from the center of the listener's head (C) and have moderate variance when sound sources are located in the mid-field space, ≥0.5 meter and <1 meter from the center of the listener's head. HRTFs are less sensitive to distance when sound sources are located in the far-field space, ≥1 meter and <3 meters from the center of the listener's head and are relatively insensitive to distance when sound sources are located in the far-field space, >3 meters from the center of the listener's head. As such, examples for positional matching limits or spatial windows for the radial distance, r, may be as follows:

r=±5 mm for sound sources in the near-field space (0-0.5 meter)

r=±10 mm for sound sources in the mid-field space (0.5-<1 meter)

r=±50 mm for sound sources in the far-field space (≥1-<3 meters)

No limits for r in the far-field space at distances ≥3 meters

The desired spatial Mapping Transfer Function, MTF, also can be comprised of two or more related spatial MTFs. A series of multiple (constituent) spatial MTFs can be convolved to produce a net (overall) spatial $MTF_{R \Rightarrow T}$ if the data sets used for generating one of the constituent spatial MTFs (first in the series) includes the reference sound source position, $P_R$, and the data sets used for generating another of the constituent spatial MTFs (last in the series) includes the target sound source position, $P_T$. Additionally, all pairs of intermediate spatial MTFs may be linked together by at least one common sound source position between them. Thus, $MTF_{R \Rightarrow T}$ can be defined as: $MTF_{R \Rightarrow Pn} * \ldots * MTF_{Pm \Rightarrow T}$, where Pn is a related intermediate sound source position, from 1 to m, with m being the number of selected intermediate sound source positions located between the reference and target sound sources. This methodology may be utilized to generate a spatial Mapping Transfer Function, $MTF_{R \Rightarrow T}$, when correlation between the reference sound source position ($P_R$) and the target sound source position ($P_T$) within data sets is limited or poor (e.g., not enough data points) and there exists good correlation of a common sound source position located between the reference sound source position and target sound source position within data sets. As an example, if the desired reference sound source position, $P_R$ (1m, 0°, 15°), and the desired target sound source position, $P_T$ (3m, 0°, 30°), are not included in the same correlated data sets, but a common sound source position, P1 (3m, 0°, 15°), is present in data sets that include the reference sound source position and data sets that include the target sound source position, the net, overall spatial Mapping Transfer Function can be determined as: $MTF_{R \Rightarrow T} = MTF_{R \Rightarrow P1} * MTF_{P1 \Rightarrow T}$. The number of intermediate sound source positions utilized may be kept to a minimum to improve accuracy of the generated spatial $MTF_{R \Rightarrow T}$. All constituent MTFs may be generated separately using the present system and/or method, with compiled, correlated data sets as described herein.

For generation of the spatial Mapping Transfer Function, MTF, several types of algorithmic data analyses from the field of data science can be performed, separately or in combination, including but not limited to linear regression, multivariate regression, nonlinear regression, artificial neural network (ANN), data mining, K-nearest neighbors (KNN) or principal component analysis.

The spatial Mapping Transfer Function, MTF, can have various forms or iterations that address different mapping scenarios. Some variants of MTF may depend on which independent variables of the HRTFs are being mapped. Some variants of MTF may depend on whether the MTF applies to sound source positions that are a discrete, correlated pair ($P_R$, $P_T$), e.g., each MTF is unique and valid for one designated pair of sound source positions. Some variants of MTF may depend on whether the MTF applies to continuously variable sound source positions, such as a single MTF that applies to multiple pairs of sound source positions, including sound source positions that have no corresponding data points within HRTF data sets, e.g., interpolated or extrapolated sound source positions. Identified variants (types) of the MTF include:

1. MTF varies with independent variables, r, θ, and ϕ; discrete, correlated, single pair of sound source positions ($P_R$, $P_T$)
2. MTF varies with independent variables, r and ϕ only; discrete, correlated, single pair of pair sound source positions ($P_R$, $P_T$)
3. MTF varies with independent variables, r, and ϕ only; discrete, correlated, single pair of pair sound source positions ($P_R$, $P_T$)
4. MTF varies with independent variables, θ, and ϕ only; discrete, correlated, single pair of pair sound source positions ($P_R$, $P_T$)
5. MTF varies with independent variable, r, only; discrete, correlated, single pair of pair sound source positions ($P_R$, $P_T$)
6. MTF varies with independent variable, θ, only; discrete, correlated, single pair of pair sound source positions ($P_R$, $P_T$)
7. MTF varies with independent variable, ϕ, only; discrete, correlated, single pair of pair sound source positions ($P_R$, $P_T$)
8. MTF varies with independent variables, r, θ, and ϕ; interpolated/extrapolated, multiple pairs of sound source positions ($P_R$, $P_T$)
9. MTF varies with independent variables, r and θ only; interpolated/extrapolated, multiple pairs of sound source positions ($P_R$, $P_T$)
10. MTF varies with independent variables, r, and ϕ only; interpolated/extrapolated, multiple pairs of sound source positions ($P_R$, $P_T$)
11. MTF varies with independent variables, θ, and ϕ only; interpolated/extrapolated, multiple pairs of sound source positions ($P_R$, $P_T$)
12. MTF varies with independent variable, r, only; interpolated/extrapolated, multiple pairs of sound source positions ($P_R$, $P_T$)
13. MTF varies with independent variable, θ, only; interpolated/extrapolated, multiple pairs of sound source positions ($P_R$, $P_T$)
14. MTF varies with independent variable, ϕ, only; interpolated/extrapolated, multiple pairs of sound source positions ($P_R$, $P_T$)

It is expected that the resultant error in HRTFs synthesized from the MTF may vary depending on which of the versions is utilized. The first type listed, "MTF varies with independent variables, r, θ, and ϕ; discrete, correlated, single pair of sound source positions ($P_R$, $P_T$)", may be the most accurate version, with the lowest error in resultant HRTFs. This is the MTF type described and utilized for some embodiments of the present disclosure. MTF types 2-14 can be utilized for other applications or embodiments of the present disclosure.

While all versions of the spatial Mapping Transfer Function, MTF, may be generated with or without AI techniques, using conventional data analytics algorithms as described, the data analysis and derivation of MTFs can be very complex and time-consuming. For these reasons the present disclosure further comprises system and/or method teachings of machine learning (artificial intelligence) for generating MTFs.

Figure 9:
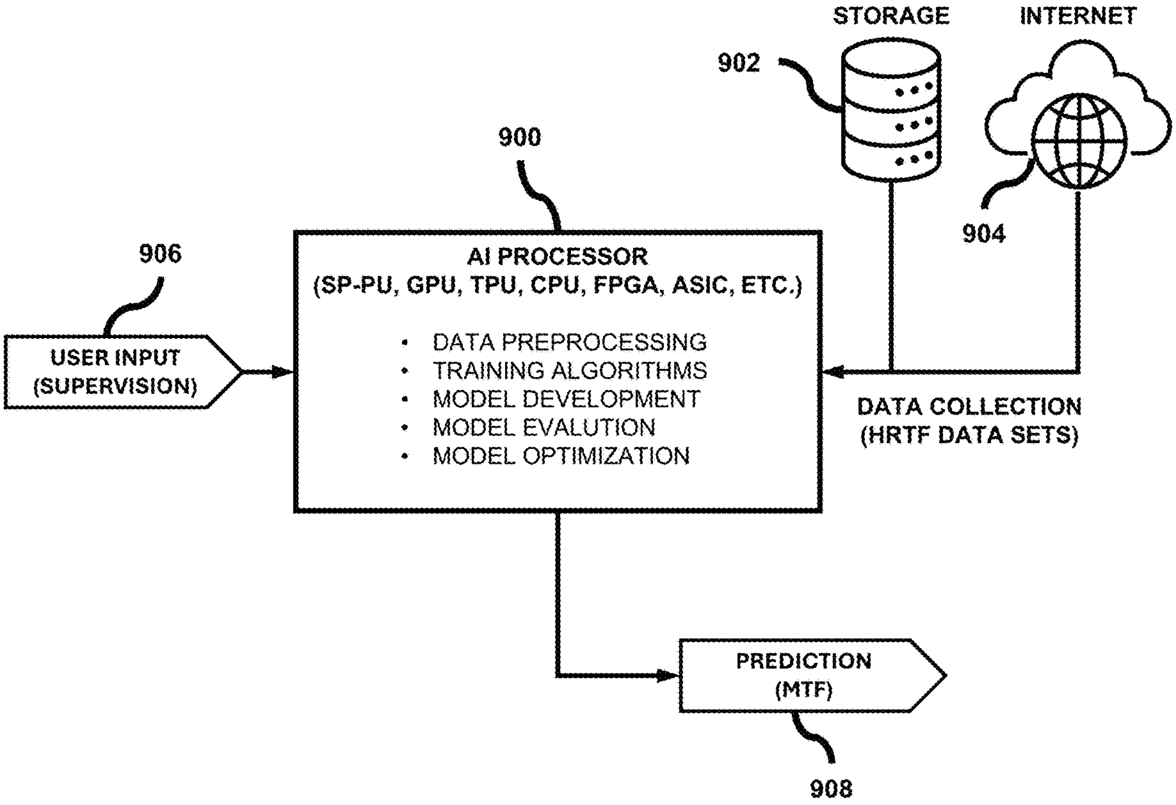

The present disclosure's artificial intelligence (AI) machine learning system, method, structure and/or function (tasks and techniques) can be implemented or executed within a hardware architecture, such as the machine learning (AI) engine shown in FIG. 9. The AI processor 900 can be a special purpose processing unit (SP-PU), graphical processing unit (GPU), tensor processing unit (TPU), central processing unit (CPU), FPGA, ASIC or other types of processing hardware, including combinations of any of such processing hardware. The AI processor 900 may be responsible for data preprocessing, training algorithms, model development, model evaluation, model optimization and other AI functions. Data collection (such as HRTF data sets) from sources including attached storage 902 (e.g., hard disk drives, solid state drives, etc.) and the internet 904 (other servers, computers, other online-connected storage and the "cloud") may be input to AI processor 900. User input 906, such as machine learning supervision (e.g., data selection, input parameters and definitions, etc.), may be applied to 900. Prediction 908 as spatial Mapping Transfer Functions (MTFs) may be the output of the AI processor 900.

The present disclosure includes artificial intelligence (AI) machine learning techniques that may be supervised type, employing linear, multivariate or nonlinear regression learning algorithms, artificial neural network (ANN) learning algorithms, or other learning algorithms such as data mining, K-nearest neighbors (KNN) or principal component analysis, or combinations thereof, to find generalizable predictive patterns and relationships between independent variables (r, θ, and ϕ) in HRTF data sets. The machine learning algorithms may be trained using the same large data sets of HRTFs previously described, to generate any of the versions (types of) the spatial Mapping Transfer Function, MTF.

The basic machine learning tasks may comprise: 1) gathering HRTF data sets, 2) filtering and optimizing training data from the gathered HRTF data sets, 3) training the learning algorithms, 4) generating (deriving) the spatial Mapping Transfer Function, MTF, 5) evaluating (assessing) and adjusting (tuning) accuracy of the learning algorithms and MTFs with one or more of validation data sets or test data sets, 6) propagating a database of accurate (low error), applicable MTFs. Tasks 3-5 may be cyclical and repeated until the generated MTF has acceptably low error rates with validation or test data sets (or both). Moreover, tasks 3-5 may be repeated for each unique MTF (and associated sound source pair).

Figure 10:
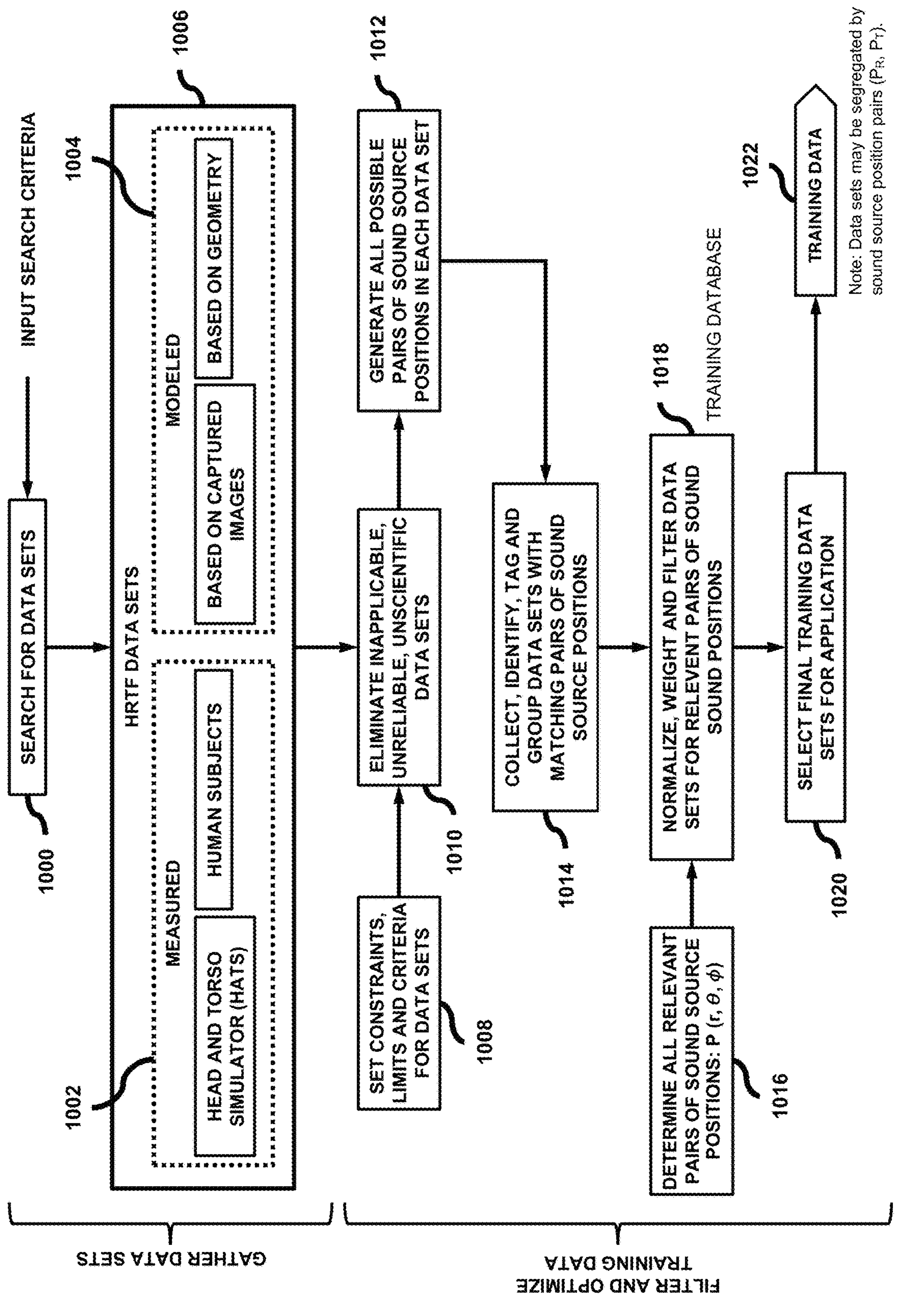

FIG. 10 is a flow chart illustrating the first two machine learning tasks, resulting in training data that may be an excellent "source of truth" for subsequent machine learning algorithms. Source of truth refers to the aggregation, integration, synchronization, and management of disparate data across various HRTF data sets. The architecture of FIG. 9 may perform the flow chart of FIG. 10.

Once input search criteria are established, accessible (open or closed or authorization-based) scientific or research data sets of HRTFs, or a combination thereof, can be searched for (1000). Input search criteria may focus the searching process on relevant and desired types of data, known sets of data, etc. to ensure that large bodies of appropriate data are gathered. The gathered HRTF data sets (1006) may comprise measured HRTF data (1002), from human subjects or head and torso simulators (HATS), or modeled HRTF data (1004), based on captured images of human subjects or HATS, or human physiological geometry, or a combination thereof. System developers may order a search for HRTFs to employ in a system.

The raw HRTF data sets gathered may subsequently be processed to optimize machine learning training data by one or more of data filtering, data format conversion, data scaling, data normalization or data weighting, as described previously. The first step, data filtering may be critical. Specific constraints, limits and criteria for HRTF data (1008) can be set to eliminate unreliable, unscientific or inapplicable data (1010). For example, HRTF data pertaining to near-field sound source positions may be excluded from training data used for far-field sound source analysis and learning. Likewise, HRTF data sets where the HRTFs are not measured at the ear canal entrance may be filtered out.

Pairs of sound source positions ($P_n$, $P_m$) may then be generated (1012) from the individual sound source positions ($P_1$, $P_2$, $P_3$, $P_4$, $P_5$, . . . . $P_x$) within each HRTF data set, where $P_n$ and $P_m$ designate a sound source position from 1 to x. For x sound source positions, there may be [x*(x−1)]/2 pairs of sound source positions. As mentioned earlier, criteria may be set for establishing how close two sound sources are to be in terms of radial distance (r), azimuth (θ), and elevation (ϕ), to be considered acoustically equivalent positions.

Next, HRTF data may be tagged, sorted and grouped (1014) based on matching pairs of sound source positions, e.g., HRTFs for specific pairs of sound source positions may be collected within and across all HRTF data sets, tagged and grouped together (with separate sets for right and left ears). HRTFs may be grouped based on pairs of sound source positions ($P_n$, $P_m$) within a given HRTF data set and across separate HRTF data sets. As previously noted, right and left HRTF data usually is not intermixed, even if they both relate to the same set of sound sources. Instead, differing right and left HRTF data sets may be tagged as having the same pair of sound source positions ($P_n$, $P_m$) and subsequently grouped together; for example, $(P_1, P_2)_{(R)}$, $(P_1, P_2)_{(L)}$; $(P_3, P_5)_{(R)}$, $(P_3, P_5)_{(L)}$, et al. This may be a crucial step since the machine learning algorithms later attempt to quantify how HRTFs change from one sound source position to another across all relevant (and equivalently tagged) right and left HRTF data sets. In this way the resultant training data (1022) can be optimized for a specific pair of sound source positions for each ear.

Not all of the pairs of sound source positions are needed or relevant. The next step in the generation of optimized training data is determining relevant pairs of sound source positions (1016). Relevant and applicable pairs of sound source positions (r, θ, ϕ) may be identified and preserved in the training data sets (database). Some pairs of sound source positions may be discarded; for example, sound source pairs with positions too close together or too far apart within the space surrounding a listener. Some combinations of sound sources may be inapplicable or impractical for normal sound reproduction systems to replicate; for example, a sound source corresponding to a front, right channel external loudspeaker located at (3m, 30°, 0°) and sound source located to the rear, left of a listener, below the listening axis (3m, −75°, −30°). The first sound source position in a pair may be assigned as a reference sound source position ($P_R$), with an associated acoustic transducer or loudspeaker for the reproduction of sound, and the second sound source position in a pair ($P_T$) may be assigned as a (virtual) target sound source position, with no associated acoustic transducer or loudspeaker for the reproduction of sound.

The HRTF data may benefit from optimization processing steps (1018) such as translation to a common standard data format (e.g. SOFA), modification of range and units, scaling and normalization of data, etc. This is essentially the process of developing "clean data" to eliminate redundant and unstructured data and assure that data appears similar across all records and fields, thereby assisting the data analysis that follows.

The optimization of training data (1018) also may include additional filtering to eliminate outlier HRTFs, e.g., sound source positions in a particular data set with HRTFs that are appreciably incongruous or inconsistent with HRTFs for the same sound source positions in the majority of other data sets. Weighting of data sets may also be employed for optimization. For example, data sets associated with acoustic measurements of human subjects may be given greater weighting than data sets associated with geometric modeling. Duplicating a particular data set within training data may be equivalent to doubling its weighting or value.

Final training data sets selected from the training database for an application (1020) can comprise all right and left HRTFs from both sound source positions of a selected pair of sound sources across all right and left HRTF data sets that have been filtered, processed and optimized, and which originally (initially) contain the selected pair of sound source positions. HRTF data sets that only include one of the sound source positions may be excluded. In most cases there may be multiple pairs of sound source positions selected, resulting in multiple sets of corresponding training data. The final training data sets utilized for training learning algorithms that generate a specific MTF may contain the same sound source positions as the MTF itself. As such, the data sets used for training data (1022) can be segregated by sound source position pairs ($P_R$, $P_T$). Exceptions may include training data and machine learning for determining other variants of MTFs discussed earlier, e.g., types 8-14, which relate to multiple pairs of sound sources that may have interpolated or extrapolated positions.

Figure 11:
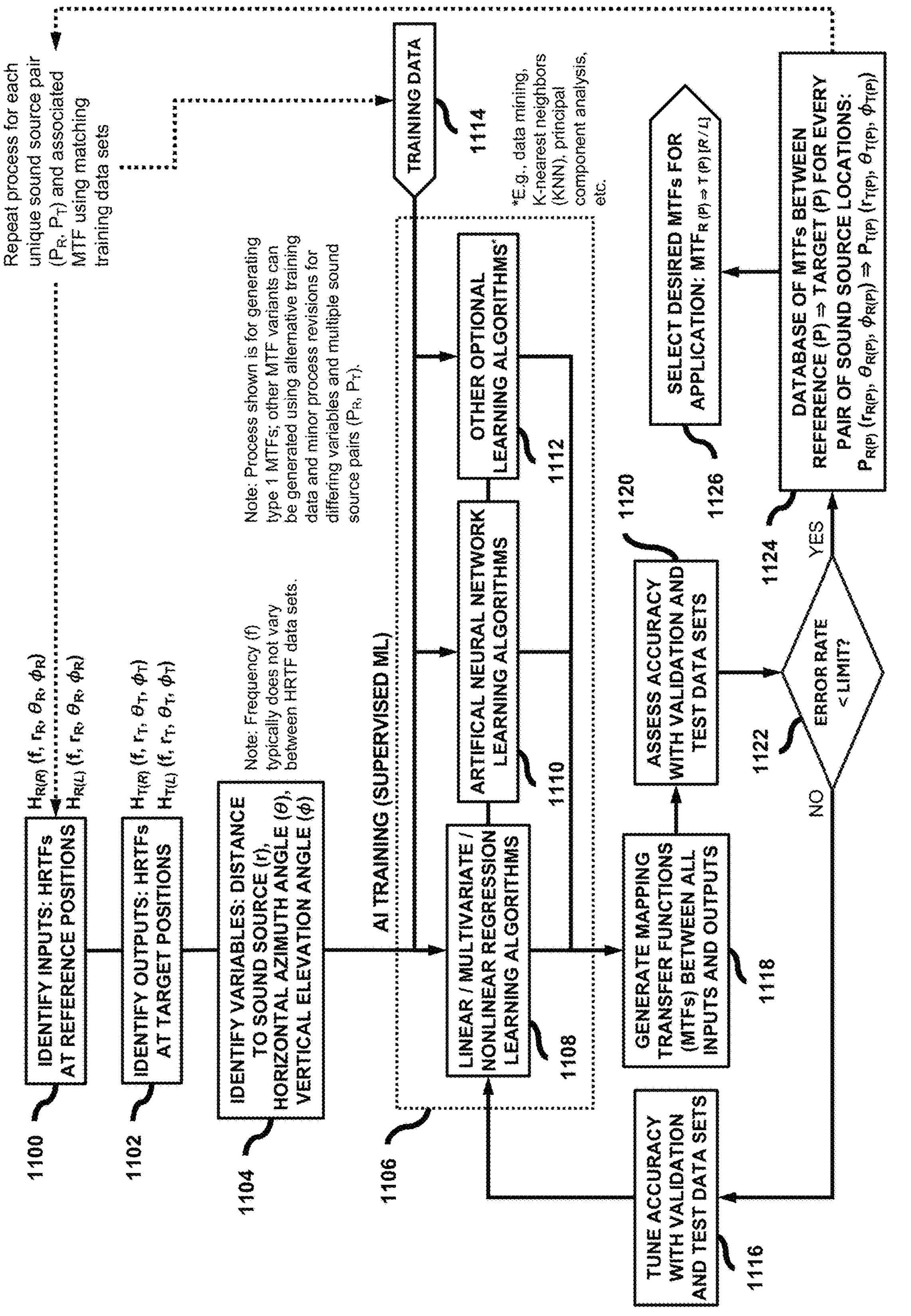

FIG. 11 is a flow chart that illustrates the last four machine learning tasks, comprising the essential AI training (1106), generation (1118) and fine-tuning or alteration (1116) of the spatial Mapping Transfer Function, MTF, and propagating a database of applicable MTFs (1124). Because the training data (1114) is labeled (sound source positions and HRTFs), the machining learning that follows may be considered supervised rather than unsupervised. The architecture of FIG. 9 may perform the flow chart of FIG. 11.

Optimized training data sets (1114) described earlier can be utilized for training one or more machine learning algorithms (1106). Linear, multivariate or nonlinear regression learning algorithms (1108) or artificial neural network (ANN) learning algorithms (1110) may be utilized alone or in combination with other machine learning algorithms (1112) such as data mining, K-nearest neighbors (KNN), principal component analysis, etc. Besides training data, these learning algorithms may entail identification of inputs (1100), outputs (1102) and variables (1104). Inputs (1100) may be specified as the right and left HRTFs corresponding to the reference sound source positions, for example the first sound source position of a selected pair ($P_R$): $H_{R(R)}$ (f, $r_R$, $\theta_R$, $\phi_R$) and $H_{R(L)}$ (f, $r_R$, $\theta_R$, $\phi_R$). Outputs (1102) may be specified as the right and left HRTFs corresponding to the target sound source positions, for example the second sound source position of a selected pair ($P_T$): $H_{T(R)}$ (f, $r_T$, $\theta_T$, $\phi_T$) and $H_{T(L)}$ (f, $r_T$, $\theta_T$, $\phi_T$). Variables (1104) may be specified as radial distance to sound source (r), horizontal azimuth angle (θ) and vertical elevation angle (ϕ) for each of the sound source positions. As mentioned previously, frequency (f) usually will not vary between HRTF data sets and can be dropped from analysis.

The machine learning algorithms' tasks may be to find generalizable predictive patterns and relationships between independent variables (r, θ, and ϕ) across all relevant (equivalently tagged) HRTF data sets within the supplied training data. Multiple passes (cycles) may be utilized to achieve a target (low) error rate, reflecting a degree of convergence, to generate accurate (low error rate) right and left spatial Mapping Transfer Functions, MTFs, for selected pairs of sound source positions ($P_R$, $P_T$). Machine learning feedback is utilized to measure or assess (1120) and fine-tune or adjust (1116) accuracy of the generated MTFs using validation data sets or test data sets, or both, until the error rate is less than a set limit (1122). Validation data can be utilized from the training data; these may be known HRTFs for the pairs of sound source positions ($P_R$, $P_T$). The generated MTF, when convolved with the reference HRTF from the validation data, may result in an accurate target HRTF very close to the target HRTF from the same validation data. Any differences may be considered error. The machine learning algorithms (1106) may fine-tune or adjust MTFs to minimize this error. Similarly, the same process can be followed with test data sets, which comprise a pair of the same (sound source position) reference and target HRTFs from a HRTF data set that was not used for the training data, i.e., a separate, additional set of known or measured HRTFs for the reference and target sound source positions. If the measured or known reference sound source HRTF from the test data convolved with the generated MTF is equal to the measured or known target sound source HRTF from the same test data, the MTF error would be zero. Once error rates for MTFs are considered acceptable, a database of right and left MTFs can be propagated (1124) for every pair of sound source positions ($P_R$, $P_T$) corresponding to selected pairs of sound source positions ($P_n$, $P_m$) in the training data. The entire process shown in FIG. 11 may be repeated in a cyclical manner using new training data sets for each unique pair of sound source positions ($P_R$, $P_T$) to generate corresponding (type 1) MTFs in the database. Other MTF variants can be generated using alternative training data and minor process revisions to accommodate differing variables and multiple sound source pairs ($P_R$, $P_T$). A final step may be to select MTFs for a specific application (1126) from the generated database of spatial MTFs (1124), e.g., MTFs for all pairs of sound source positions ($P_R$, $P_T$) necessary to generate the desired virtual sound source positions.

Figure 8:
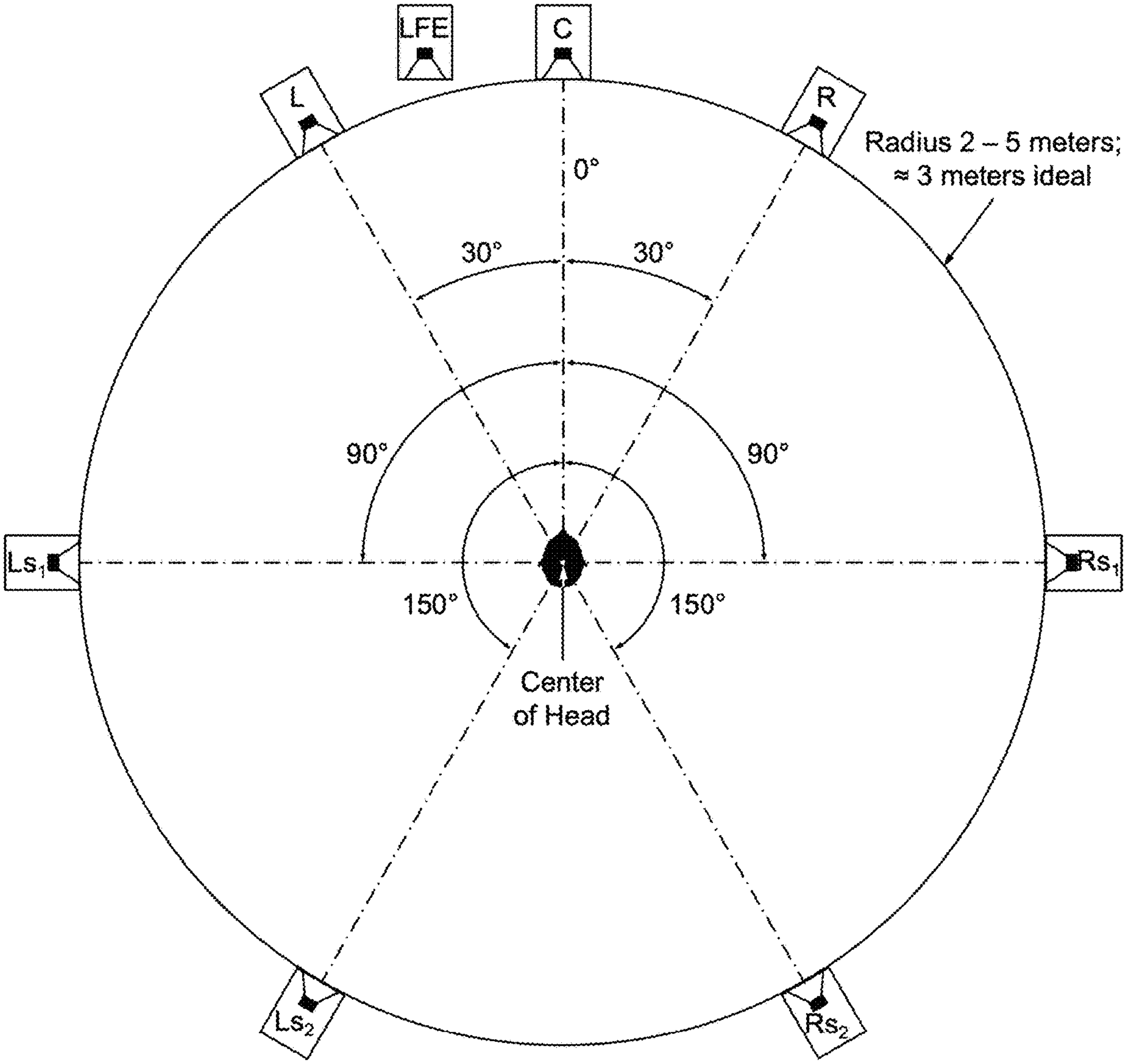

FIG. 12 shows an excerpt from an example database of generated spatial Mapping Transfer Functions, MTFs, produced by the system or method teachings of the present disclosure shown in FIG. 11 (1124). The example database includes generated MTFs for a 7.1 channel loudspeaker layout per the ITU-R BS.775-1 recommendation shown in FIG. 8. The database shown includes four reference sound source positions (L, R, $Ls_2$, and $Rs_2$ "real" loudspeakers), with three target sound source positions (C, $Ls_1$ and $Rs_1$ "virtual" loudspeakers).

The overview and description presented thus far, pertaining to generation of the spatial Mapping Transfer function (MTF) and machine learning (AI), relate to operations that could be performed separately and remotely from end user devices, equipment, products or systems, such as in a research and development or laboratory environment, using powerful processors optimized for AI machine learning (typically, AI often requires significant processing time and power that may be problematic for some end use devices and systems). The resulting MTFs could be programmed into end user devices, products and systems or downloaded via Internet connections through a server or similar means.

Periodic updates of MTFs and other algorithms could also be implemented using the standard methodology of firmware and software updates commonly employed for many consumer electronic products. This present disclosure also encompasses including the generation of MTFs and machine learning in some types of end user devices, equipment, products and systems, especially as AI capabilities further progress in the future.

The effectiveness and accuracy of the present system and/or method to generate virtual target sound sources may depend on the spatial MTFs and the reference sound sources selected. Guidelines for optimizing virtualization performance can be summarized as follows.

While one MTF may be sufficient for the present disclosure, two or more MTFs can be utilized, with each MTF corresponding to a separate reference sound source (acoustic transducer or loudspeaker in a system). Each of these MTFs can map to the same target sound source, improving virtualization performance. A simple example may be to utilize right and left loudspeakers in a playback system as reference sound sources, each with its own MTF to map a common virtual target sound source such as a center channel loudspeaker, located between the right and left loudspeakers.

When multiple MTFs and reference sound sources are being employed to generate a common virtual target sound source, virtualization performance may be enhanced by utilizing separate right and left HRTFs in accordance with the present system and/or method. In such cases there can be right and left MTFs generated, for each ear of the listener, that are processed with corresponding right and left HRTFs. The MTFs and HRTFs can be correlated to a common (single) reference sound source located in the surrounding 3D space (a single acoustic transducer or loudspeaker) or to multiple reference sound sources located in the 3D space surrounding the listener. For the latter case, it may be beneficial to select reference sound sources in the right Medial hemisphere in the general vicinity of the listener's right ear, and reference sound sources in the left Medial hemisphere in the general vicinity of the listener's left ear (i.e., to the right and left of the Median reference plane), with their respective right and left MTFs, to enhance virtualization performance. Some examples may be right and left loudspeakers in a playback system, whereby a right MTF and HRTF are correlated to the right reference sound source (loudspeaker) and a left MTF and HRTF are correlated to the left reference sound source (loudspeaker), both of which are used to generate a single, common target sound source (e.g., another virtual loudspeaker location).

In general, when reference sound sources are located closer to the intended target sound source, the resulting MTFs can have reduced error and may generate virtual target sound sources that are more precise, accurate and believable to a human listener.

The present system and/or method can modify and correct HRTFs associated with reference sound sources that are incorrect, distorted or corrupt. By generating MTFs that map from an actual (real) reference source position in a playback system to a desired (virtual) reference source position in the playback system (in essence the new desired reference sound source becomes the target sound source of the MTF), the resulting reference sound source then becomes "virtual". An example of this application would be shifting the perceived positions of closely spaced right and left transducers of a home theater soundbar loudspeaker system to new virtual positions that are spaced much further apart. For external acoustic transducer or loudspeaker applications, where the reference sound source position is being shifted or remapped, all MTFs, including those for other virtual sound source positions or audio channels, may still map from the actual (real or original) reference sound source position rather than from desired (virtual or "new") reference sound source position.

Similar to the previous point, reference sound sources in playback systems can be virtual rather than real if HRTFs for the reference sound sources are generated or implemented elsewhere in a playback system. Examples include headset type devices with electronically implemented HRTFs for the right and left transducers, which are typically positioned too close to the ear canal to manifest correct HRTFs that emulate external loudspeakers or sound sources located in the mid or far-field space surrounding the listener. For these cases, the native HRTFs are missing, incorrect or corrupt. HRTFs can also be implemented acoustically in the device itself (for example, as shown in U.S. Pat. No. 11,653,163,B2). As such, the sonic images (spatial characteristics) generated for these reference sound sources can be virtual rather than "real" because their perceived spatial position is different from the actual location of the acoustic transducers or loudspeakers in the playback system.

The present system and/or method are compatible with various interaural crosstalk cancellation arrangements (electrical or acoustical) for audio playback. Virtualization performance of the present system and method can be enhanced if MTFs and HRTFs designated for the listener's right and left ears are kept separate (with minimum acoustic crosstalk) during audio playback. Interaural crosstalk is only relevant for external acoustic transducers and loudspeakers; headset type devices have no interaural crosstalk since the right and left transducers are typically isolated from the opposite ear of the listener. Interaural crosstalk cancellation may be beneficial for some external acoustic transducer and loudspeaker applications where multiple reference sound sources to the right and left of the Median reference plane in the surrounding 3D space, and their associated MTFs, are being used to map to a common target sound source; and, the reference sound sources are located relatively close to both ears, with similar acoustic path lengths and without significant physical obstructions.

Once spatial Mapping Transfer Functions (MTFs) are generated, they may be convolved with HRTFs for reference sound source positions and with audio data designated for the target sound source positions (i.e., the virtual sound source positions) and then mixed with the audio data designated for the reference sound source positions and sent to the reference sound source positions' audio reproduction channels and acoustic transducers or loudspeakers.

Eq. 2 summarizes the operations once MTFs have been generated:

$$D_T * HRTF_R * MTF_{R \Rightarrow T} + D_R * HRTF_R = D_{(R+T)} \quad \text{(Eq. 2)}$$

where D signifies audio data and R and T signify reference and target respectively. In other words, target sound source position audio data convolved with the reference sound source position HRTF, which is convolved with the spatial Mapping Transfer Function (MTF) from the reference to target sound source positions and then added to the convolution of the reference sound source position audio data with the reference sound source position HRTF will equal new audio data that comprises both the reference and target sound source positions.

In accordance with the present system and/or method, these operations may be performed in one or more end user devices, equipment, products or systems, including but not limited to devices for audio playback (streaming, transferring and storing files), audio processing and reproduction, and sound reproduction. These devices may include, but are not limited to, mobile phones, tablets, laptops, desktop computers, servers, specialized audio components such as processors, preamplifiers and amplifiers, TV/video monitors, gaming consoles and devices, soundbars, powered or active loudspeakers, automotive, marine and aerospace sound and communication systems, and headset type products (headphones, earphones, headsets, helmets and wearable audio devices such as AR glasses), Virtual/Augmented/Extended Reality (VR/AR/XR) devices and simulators for aerospace and military applications.

Figure 13:
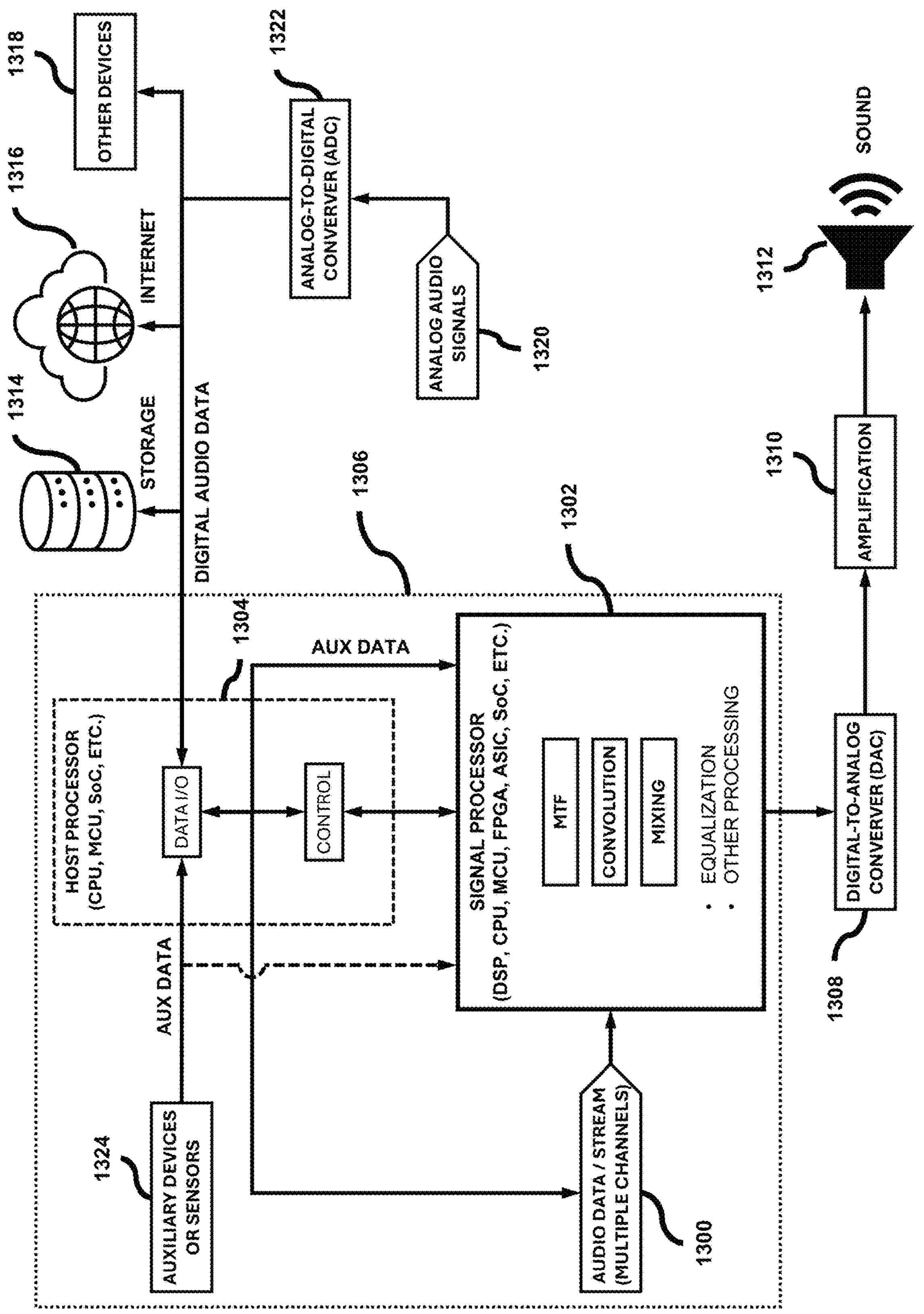

A hardware architecture that may be utilized for electronic implementation of the exemplary structure, function and embodiments of the disclosure within end user devices, in accordance with the present system and/or method, is shown in FIG. 13. This hardware architecture is based on digital signal processing (DSP); other architectures such those utilizing analog signal processing or alternate topologies can also be employed. In FIG. 13, multiple channels of audio data 1300 are input to the signal processing block 1302, where the spatial Mapping Transfer Function (MTF) is subsequently convolved and mixed with audio data. Other processing functions such as equalization may also be implemented in 1302. The signal processor 1302 can be comprised of DSP program code running within a dedicated DSP IC, or portions of a CPU, MCU, FPGA, ASIC or SoC device. A host processor 1304 may handle data input/output and control of the signal processor 1302. The host processor 1304 may be a separate CPU, MCU, SoC, etc.; or it may be fully integrated with the signal processor 1302. The embodiments shown in this disclosure may vary processing functionality and topologies within the digital system 1306. Digital audio data entering host processor 1304 and signal processor 1302 may originate from multiple sources. These data sources can include storage 1314, which may be a hard disk drive (HDD), solid state drive (SSD) or other memory devices; the internet 1316, as downloaded files or data streams from a remote server or the "cloud"; other devices 1318, as downloaded files or data streams from a connected phone, tablet, computer, etc.; or a connected analog-to-digital converter (ADC) 1322 if analog audio signals 1320 are the intended input. Additional auxiliary devices or sensors 1324, such as inertial measurement unit (IMU) or optical sensors, may output auxiliary (AUX) data (e.g., head orientation or position data) to the host processor 1304, which subsequently passes auxiliary (AUX) data to the signal processor 1302; or, 1324 may output auxiliary (AUX) data directly to the signal processor 1302. Auxiliary (AUX) data may be processed in either or both 1304 or 1302 and subsequently used for other audio data processing functions in 1302. Although 1324 is shown within 1306 in FIG. 13, it may be located elsewhere in the overall system, or even remotely (e.g., an outboard device tracking head position). The data connections shown in FIG. 13 may be wired or wireless (e.g., Wi-Fi, Bluetooth, cellular telecommunication protocols, Zigbee, etc.). Output of 1302 may be converted to an analog signal by a digital-to-analog converter 1308, and then may enter amplification 1310, which may then drive an acoustic transducer 1312 to produce sound. Signal processor 1302, digital-to-analog converter 1308, amplification 1310, and/or acoustic transducer 1312 in FIG. 13 may represent one or more instantiation of each element. Elements 1302, 1308, 1310, and 1312 may operate on one or more channels. Some embodiments handling multiple audio channels may comprise one of each element 1308, 1310, and 1312 per audio channel. Some embodiments handling multiple audio channels may comprise one signal processor 1302 per audio channel, or a single signal processor 1302 for one or more of the multiple audio channels.

Figure 14:
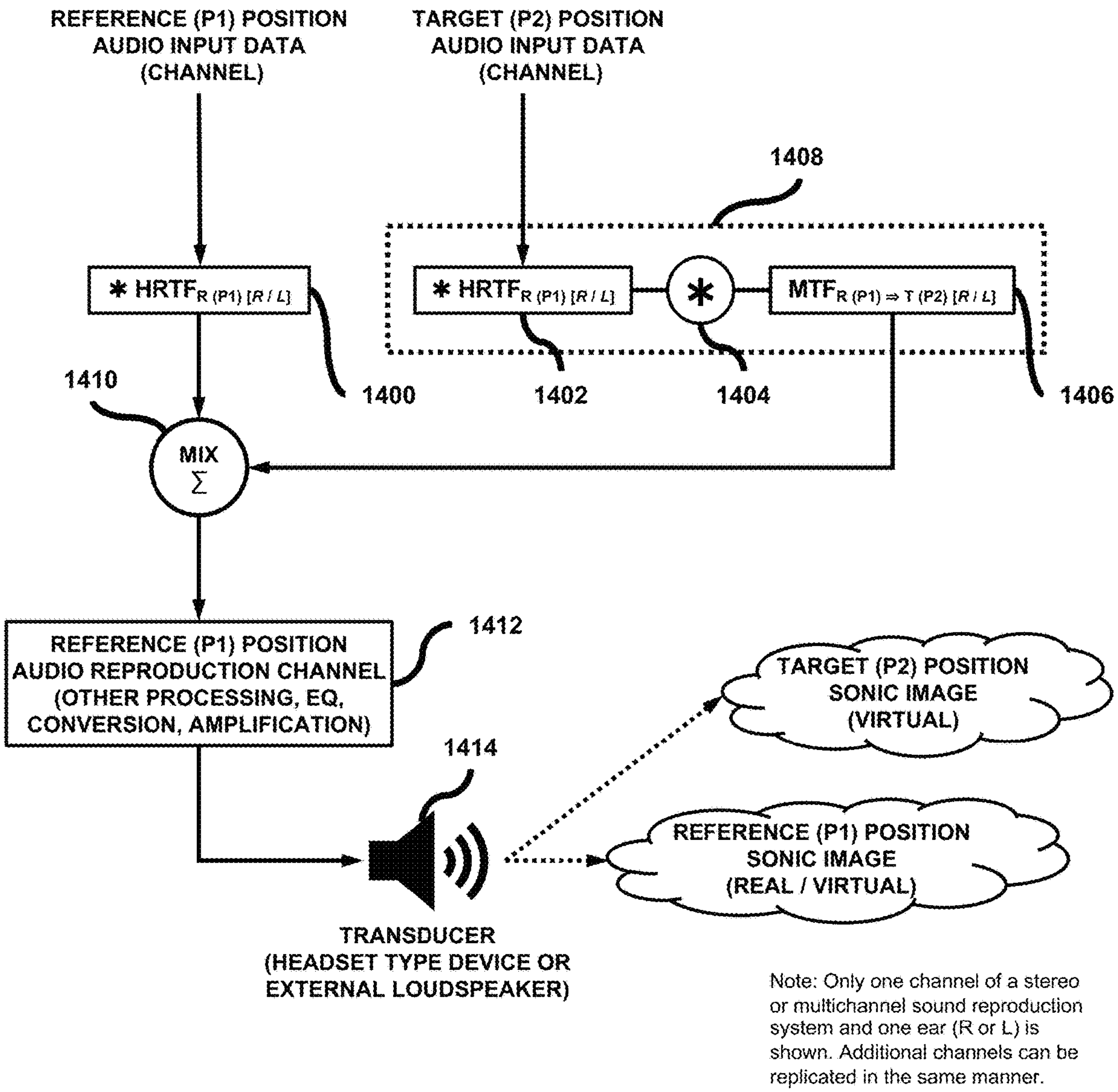

FIG. 14 is a schematic block diagram illustrating an example case (exemplary embodiment) for reproduction of virtual sound sources, in accordance with the present system and/or method (and Eq. 2). A reference sound source HRTF 1402 is convolved with audio data designated for the target (virtual) sound source and then convolved 1404 with the spatial Mapping Transfer Function (MTF) 1406 for the reference to target sound source pair. The result of audio processing 1408 is then mixed 1410 with the convolution of the audio data designated for the reference sound source and its HRTF 1400. The reference sound source HRTF 1400, 1402 may be a complete HRTF or a partial HRTF such as the portion (remainder) of the HRTF related to only the head and torso effects (i.e., excluding the pinna related or PRTF (pinna related transfer function) effects), depending on the application. The resulting audio data stream (or file) is then sent to the reference sound source audio reproduction channel 1412, which may include additional processing, equalization, digital-to-analog conversion and amplification, and then to an acoustic transducer 1414 for final conversion to sound, which comprises the real or virtual sonic image for the reference sound source position and the sonic image for the virtual target sound source position. For this example case, the reference system's acoustic HRTF may be either incorrect (e.g., transducer 1414 is not located at the intended reference sound source position) or missing (e.g., a conventional headphone or earphone). For simplicity, HRTFs and MTFs in FIG. 14 are shown for one ear (right or left). For applications where both right and left HRTFs and MTFs are desired for a single (common) reference position, that reference position's HRTF 1400 and audio processing 1408 can be replicated and combined with the opposite ear's HRTF 1400 and audio processing 1408 outputs at mixer 1410 for a common (shared) audio reproduction channel 1412 and transducer 1414. The system design shown in FIG. 14 may be implemented by the architecture of FIG. 13.

Eq. 2 summarizing the operations necessary once MTFs have been generated can be simplified as follows into Eq. 3:

$$(D_T * MTF_{R \Rightarrow T} + D_R) * HRTF_R = D_{(R+T)} \qquad \text{(Eq. 3)}$$

where D signifies audio data and R and T signify reference and target respectively. In other words, the sum of the target sound source position audio data convolved with the spatial Mapping Transfer Function (MTF) from the reference to target sound source positions and the reference sound source position audio data, when convolved with the reference sound source position HRTF will equal new audio data that comprises both the reference and target sound source positions.

Furthermore, Eq. 3 can be scaled to include multiple target position data as follows into Eq. 4:

$$\left[D_R + \sum_{n=1}^{x} (D_{Tn} * MTF_{R\Rightarrow Tn})\right] * HRTF_R = D_{(R+T1+T2+T3+ \ldots +Tx)} \quad \text{(Eq. 4)}$$

where n signifies target data positions for 1-x positions. In other words, the summation of the target sound source position audio data, from positions 1-x, convolved with the spatial Mapping Transfer Function (MTF) from the reference sound source position to target sound source positions 1-x, added to the reference sound source position audio data, and then convolved with the reference sound source position HRTF will equal new audio data that comprises both the reference sound source position and the target sound source positions 1-x.

Figure 15:
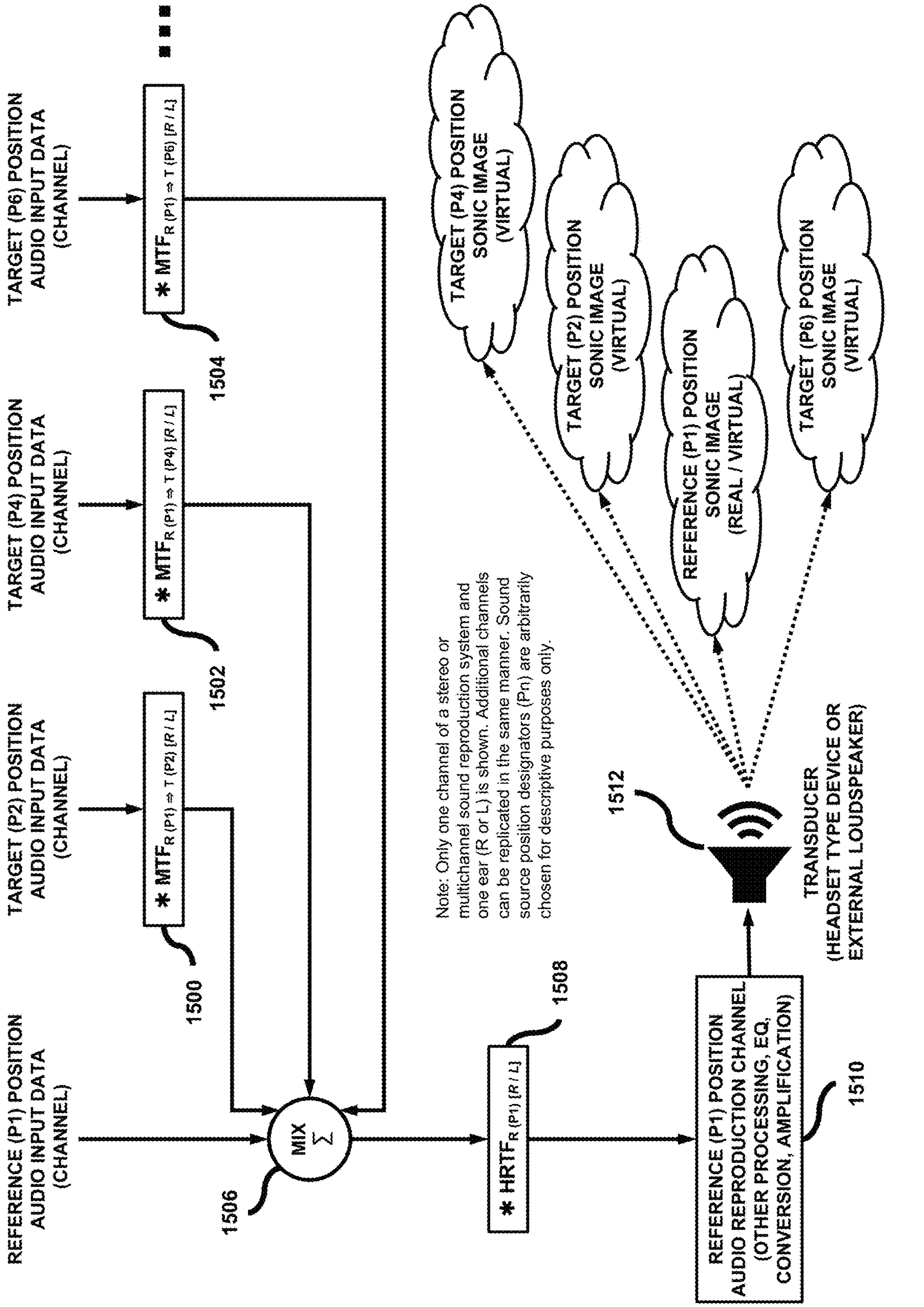

FIG. 15 is a schematic block diagram illustrating another exemplary embodiment of the present disclosure for sound reproduction, in accordance with the present system and/or method (and Eq. 4). Audio data for designated target sound source positions P2, P4 and P6 are convolved with their respective spatial Mapping Transfer Functions (MTFs) 1500, 1502, 1504 and then mixed 1506 with audio data for a reference sound source position (P1). The result is then convolved with the reference sound source position (P1) HRTF 1508. The reference sound source position HRTF 1508 may be a complete HRTF or a partial HRTF such as the portion (remainder) of the HRTF related to only the head and torso effects (i.e., excluding the pinna related or PRTF effects), depending on the application. The resulting audio data stream (or file) is then sent to the reference sound source position (P1) audio reproduction channel 1510, which may include additional processing, equalization, digital-to-analog conversion and amplification, and then to an acoustic transducer 1512 for final conversion to sound, which comprises the real or virtual sonic image for the reference sound source position P1 and the virtual sonic images for the target sound source positions P2, P4 and P6. This is an example case for sound reproduction where the transducer 1512 is not located correctly at a designated reference sound source position, or where the corresponding reference sound source's acoustical HRTF is incorrect, corrupt or missing (for example, a conventional headphone or earphone, or a small soundbar with transducers located too close together). For simplicity, HRTFs and MTFs in FIG. 15 are shown for one ear (right or left). For applications where right and left HRTFs and MTFs are desired for a single (common) reference position, all of the processing prior to 1510 can be replicated for the additional ear. Output from each ear's HRTF 1508 may then be combined using an added mixer (not shown) to feed a common (shared) audio reproduction channel 1510 and transducer 1512. Four sound sources, one reference position and three target positions, are shown for a single channel of a stereo or multichannel sound reproduction system. Additional channels may be replicated in the same manner. Sound source position designators (Pn) are arbitrarily chosen for exemplary purposes. The system design shown in FIG. 15 may be implemented by the architecture of FIG. 13.

Moreover, Eq. 4 can be simplified for specific applications where the reference sound source's acoustical HRTF is intrinsically present or implemented elsewhere in the system electronically and is correct (accurate), as follows into Eq. 5:

$$\left[D_R + \sum_{n=1}^{x} (D_{Tn} * MTF_{R\Rightarrow Tn})\right] = D_{(R+T1+T2+T3+ \ldots +Tx)} \quad \text{(Eq. 5)}$$

where n signifies target data positions for 1-x positions. In other words, the summation of the target sound source position audio data, from positions 1-x, convolved with the spatial Mapping Transfer Function (MTF) from the reference sound source position to target sound source positions 1-x, added to the reference sound source position audio data, will equal new audio data that comprises both the reference sound source position and the target sound source positions 1-x.

Figure 16:
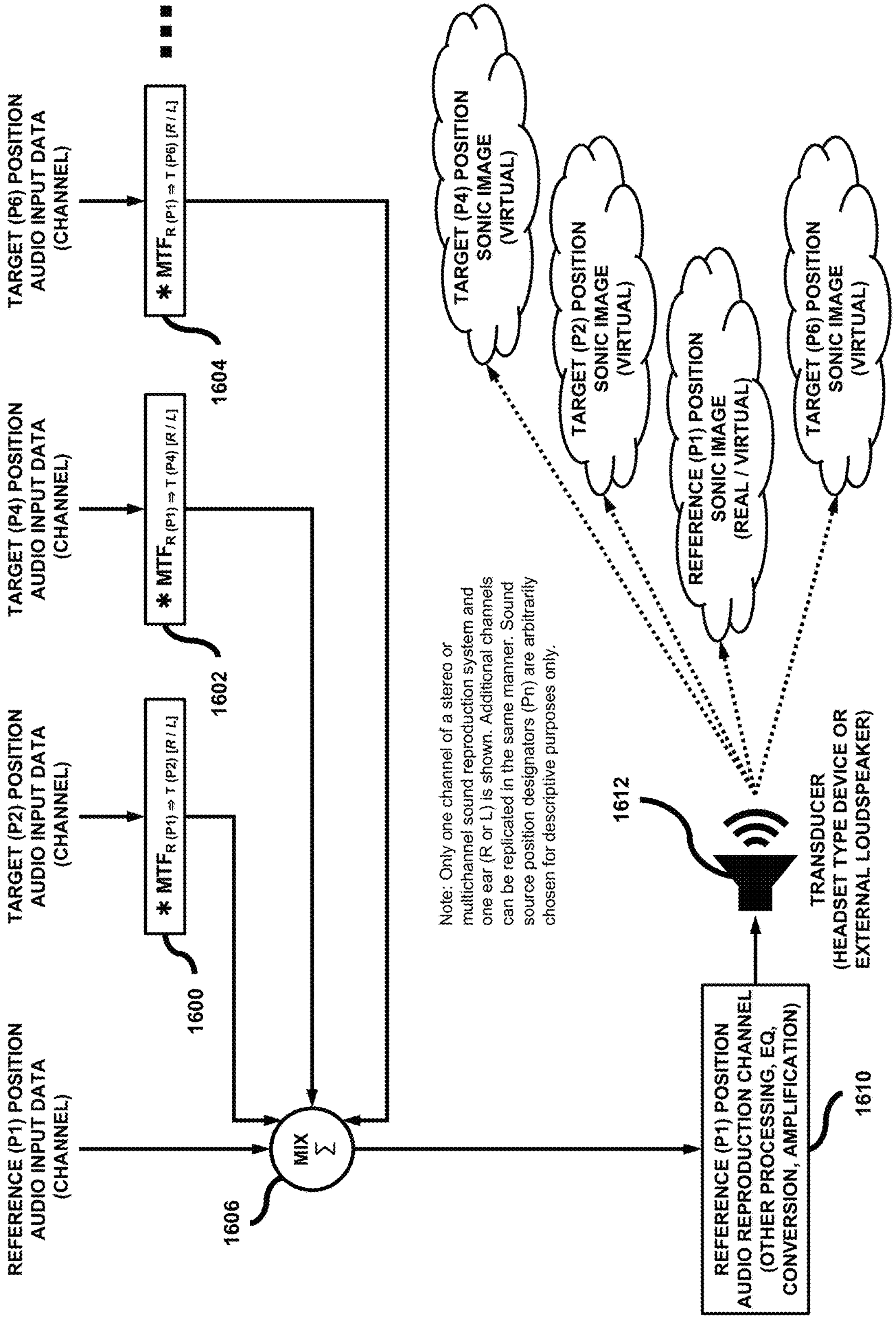

FIG. 16 is a schematic block diagram illustrating another exemplary embodiment of the present disclosure for sound reproduction, in accordance with the present system and/or method (and Eq. 5). Audio data for designated target sound source positions P2, P4 and P6 are convolved with their respective spatial Mapping Transfer Functions (MTFs) 1600, 1602, 1604 and then mixed 1606 with audio data for a reference sound source position (P1). The resulting audio data stream (or file) is then sent to the reference sound source position (P1) audio reproduction channel 1610, which may include additional processing, equalization, digital-to-analog conversion and amplification, and then to an acoustic transducer 1612 for final conversion to sound, which comprises a real or virtual sonic image for the reference sound source position P1 and the virtual sonic images for the target sound source positions P2, P4 and P6. This is an example case for sound reproduction where the transducer 1612 is located correctly at a designated reference sound source position or where the corresponding reference sound source's acoustical HRTF is correct (accurate). Examples for this case include stereo or home theater loudspeakers located optimally, and specialized headset devices that have reference sound source HRTFs implemented electronically elsewhere in processing (e.g., DSP in the reference source audio reproduction channel 1610) and/or acoustically in the device itself (for example, as shown in U.S. Pat. No. 11,653,163 B2). For simplicity, HRTFs and MTFs in FIG. 16 are shown for one ear (right or left). For applications where right and left HRTFs and MTFs are desired for a single (common) reference position, all of the MTF processing (1600, 1602, 1604, etc.) can be replicated for the additional ear, with the outputs from both ears' MTF processing combined at mixer 1606 to feed a common (shared) audio reproduction channel 1610 and transducer 1612. Four sound sources, one reference position and three target positions, are shown for a single channel of a stereo or multichannel sound reproduction system. Additional channels may be replicated in the same manner. Sound source position designators (Pn) are arbitrarily chosen for exemplary purposes. The system design shown in FIG. 16 may be implemented by the architecture of FIG. 13.

Embodiments shown in FIGS. 14-16 when applied to headset type devices may implement either right or left HRTFs and MTFs for a designated reference sound source, usually acoustic transducers designated for either the right or left ear of the listener. Applications where both right and left HRTFs and MTFs relate to a single reference sound source may be directed to specialized cases of external acoustic transducers and loudspeakers, for example, particular automotive sound systems, integrated TV/video monitors, mobile phones, small mobile loudspeakers and home theater soundbar systems. However, for many, if not most, external acoustic transducer and loudspeaker applications, separated right and left HRTFs and MTFs that relate to different reference sound sources (different reference sound sources which are distributed spatially to the right and left hemispheres, i.e., to the right and left of the Median reference plane, of the 3D space surrounding a listener) may be more beneficial for generating virtual target sound sources. For many of these cases of multiple reference sound sources, the right and left MTFs may map to a common target sound source, but do so from different reference sound sources, one or more associated with each ear of the listener. As such, HRTFs and MTFs may both relate to the same (right or left) ear if they are processed together (e.g., generation of the MTF, convolution with HRTFs, and mixing) in accordance with the present system and/or method.

Technology of the present system and/or method is flexible and scalable in the sense that, in addition to embodiments for sound reproduction, multiple embodiments are for audio recording and for content creation. For these applications, multiple sound objects may be mixed into different spatial locations within multiple channels of audio content and packaged as a single data file for streaming or media. Examples include audio for video and film (various multichannel audio formats for theatrical release and home theater), audio for gaming (consoles, PC, mobile), audio for VR/AR/XR, and audio for aerospace and military simulators. For these applications, virtual sound objects may be intended to be reproduced at positions where no acoustic transducer or loudspeaker is present. In accordance with the present system and/or method, if technology of the present disclosure is utilized for audio recording and content creation, sound reproduction devices can be used without change or modification in some embodiments (e.g., the technology of the present disclosure may be practiced for audio recording and content creation, without specialized decoding or processing for audio content being reproduced or played back). Additionally, the system and/or method of the present disclosure are compatible with most multichannel and spatial audio encoding/decoding formats common in the audio world (e.g., Dolby, DTX, Sony, etc.).

Figure 17:
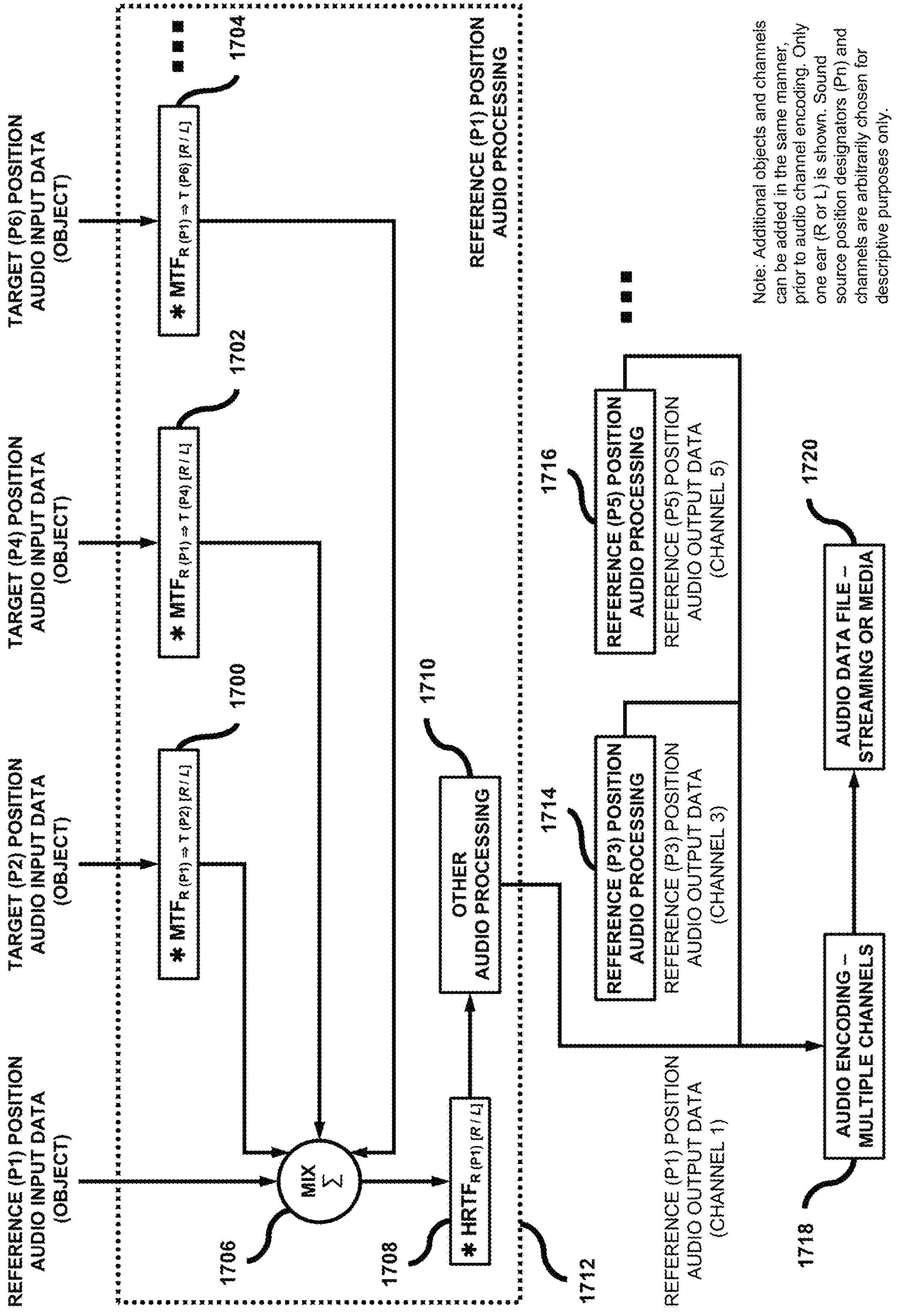

FIG. 17 is a schematic block diagram illustrating one exemplary embodiment of the present disclosure, for audio recording and content creation. Audio data (objects) for designated target sound source positions P2, P4 and P6 are convolved with their respective spatial Mapping Transfer Functions (MTFs) 1700, 1702, 1704 and then mixed 1706 with audio data (objects) for a reference sound source position (P1). The result is then convolved with the reference sound source position (P1) HRTF 1708 (either a complete or partial HRTF) and sent to other audio processing 1710, such as equalization, compression, effects, etc. Reference (P1) position audio processing 1712 comprises the totality of audio processing for the reference sound source position (P1) and produces the audio output data for one designated channel (channel 1). Reference (P3) position audio processing 1714 and reference (P5) position audio processing 1716 comprise the totality of audio processing for reference sound source positions P3 and P5 respectively and can be replicated in the same manner as reference (P1) position audio processing 1712. Audio output data for channels 1, 3 and 5 are encoded by step 1718 and packaged by step 1720 as an audio data file for streaming or physical media (e.g., a disk or memory device). As shown in FIG. 17, the system architecture is scalable; additional audio input data (objects) can be added to any of the audio output channels, and additional audio output channels can be added as desired. For simplicity, HRTFs and MTFs are shown for one ear (right or left). If both right and left HRTFs and MTFs are desired for a single reference position, then that reference position's respective audio processing (1712, 1714, 1716, etc.) can be replicated and assigned to different channels or mixed together for a common (shared) channel. Sound source position designators (Pn) are arbitrarily chosen for exemplary purposes. This embodiment may be useful when an audio channel lacks a corresponding reference position acoustic transducer or loudspeaker that is located at the correct position envisioned for the designated reference sound sources; or when HRTFs for one or more of these reference sound sources may be incorrect, corrupt or missing in sound reproduction systems used for audio playback. The system design shown in FIG. 17 may be implemented by the architecture of FIG. 13.

Figure 18:
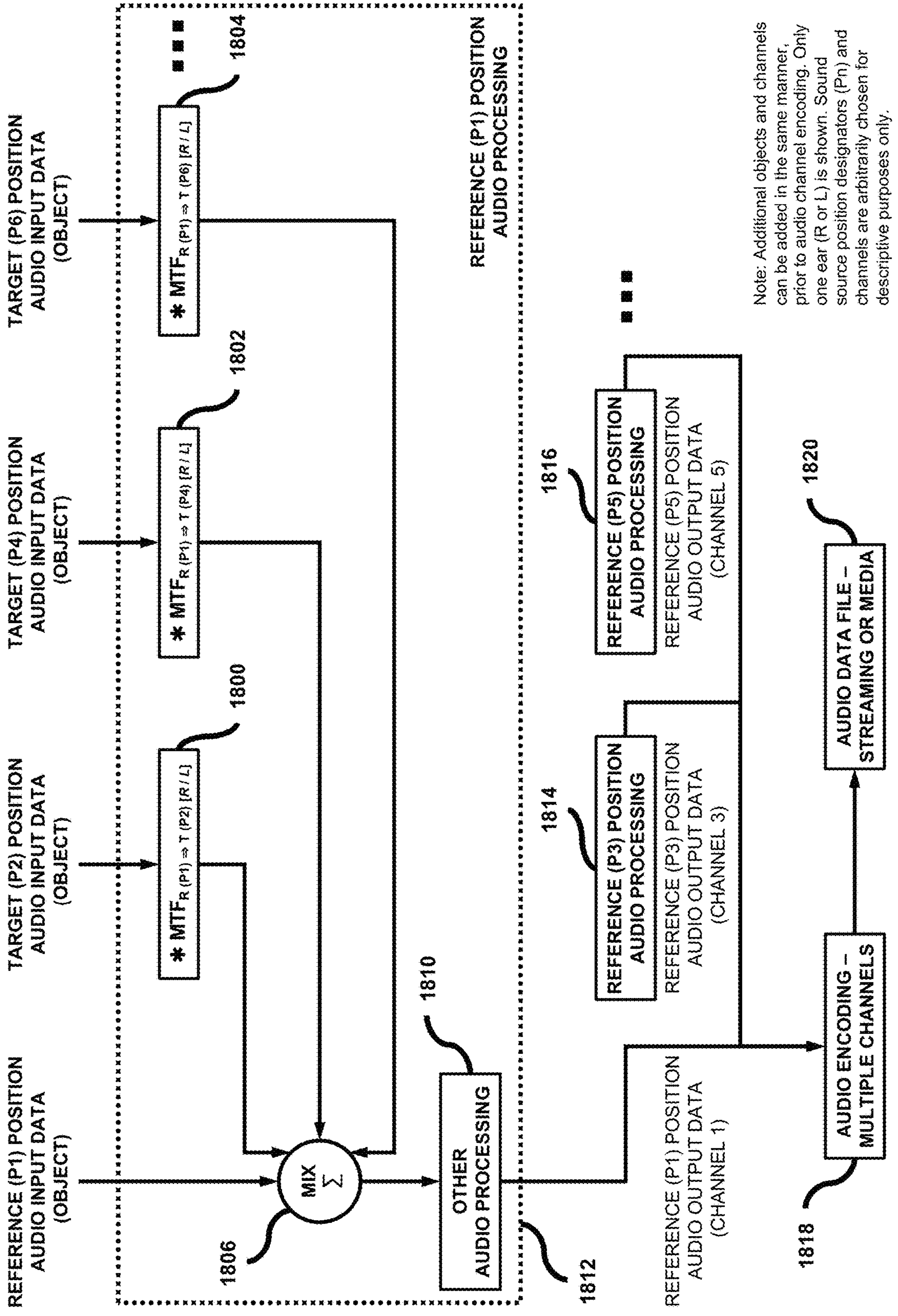

FIG. 18 is a schematic block diagram illustrating another exemplary embodiment of the present disclosure, for audio recording and content creation. Audio data (objects) for designated target sound source positions P2, P4 and P6 are convolved with their respective spatial Mapping Transfer Functions (MTFs) 1800, 1802, 1804 and then mixed 1806 with audio data (objects) for a reference sound source position (P1). The result is then sent to other audio processing 1810, such as equalization, compression, effects, etc. Reference (P1) position audio processing 1812 comprises the totality of audio processing for the reference sound source position (P1) and produces the audio output data for one designated channel (channel 1). Reference (P3) position audio processing 1814 and reference (P5) position audio processing 1816 comprise the totality of audio processing for reference sound source positions P3 and P5 respectively and can be replicated in the same manner as reference (P1) position audio processing 1812. Audio output data for channels 1, 3 and 5 are encoded by step 1818 and packaged by step 1820 as an audio data file for streaming or physical media (e.g., a disk or memory device). As shown in FIG. 18, the system architecture is scalable; additional audio input data (objects) can be added to any of the audio output channels, and additional audio output channels can be added as desired. For simplicity, HRTFs and MTFs are shown for one ear (right or left). If both right and left HRTFs and MTFs are desired for a single reference position, then that reference position's respective audio processing (1812, 1814, 1816, etc.) can be replicated and assigned to different channels or mixed together for a common (shared) channel. Sound source position designators (Pn) are arbitrarily chosen for exemplary purposes. This embodiment may be useful when each audio channel has a corresponding reference position acoustic transducer or loudspeaker that is located at the correct position envisioned for the designated reference sound sources; or when HRTFs for these reference sound sources are valid and correct, whether implemented acoustically or electronically, in sound reproduction systems used for audio playback. The system design shown in FIG. 18 may be implemented by the architecture of FIG. 13.

For all of the exemplary embodiments of the present disclosure shown, the software and hardware functions, referred to as functional audio signal processing, can be implemented in the digital domain, the analog domain, or a combination of digital and analog domains. Implementation in the digital domain may comprise digital signal processing (DSP) that is executed in specialized processors (dedicated DSP devices), general purpose processors (CPUs or MCUs), segments of FPGA, ASIC or System on Chip (SoC) devices, ICs or IC chipsets, with associated firmware/software, as shown earlier in FIG. 13. Implementation in the analog domain may utilize analog circuitry (hardware) composed of one or more specialized or general-purpose ICs, or transistors, and passive components. Implementation in both digital and analog domains, referred to as "hybrid implementation", may comprise both DSP and analog hardware circuitry.

Figure 19:
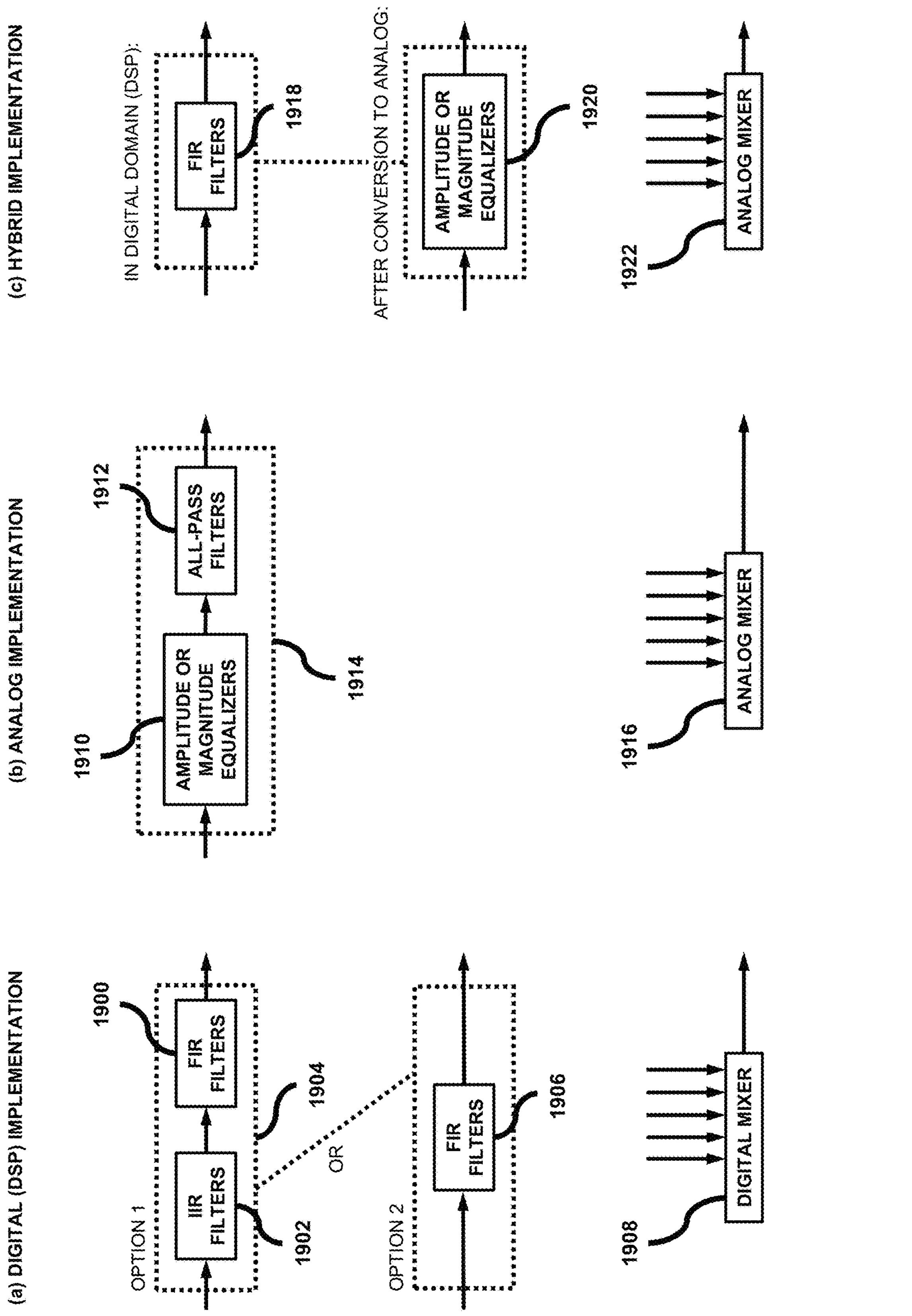

FIG. 19 is a schematic block diagram illustrating an exemplary system's functional audio signal processing implementation of software and hardware for digital, analog and combination domains in accordance with the present system and/or method.

Throughout this disclosure the "convolution" function (to "convolve", "convolving" or "convolved") involving a MTF or HRTF may be implemented by "filtering" audio data with a specified transfer function of the MTF or HRTF in either the digital or analog domain. In the context of this disclosure, for example, convolution of audio data with a MTF or HRTF may be implemented by passing the audio data through a filter which has a transfer function that matches the specified MTF or HRTF. For the purposes of this disclosure a "filter" may include any type of digital or analog signal processing that alters the amplitude (or magnitude) or phase (or delay) aspects of audio data, including for example, various types of equalizers.

FIG. 19(*a*) shows two digital signal processing (DSP) software and/or hardware realizations of functional audio signal processing implemented in the digital domain (within block 1302 of FIG. 13). Block 1904 may comprise either a cascade of IIR filters 1902 and FIR digital filters 1900 (shown as Option 1) or FIR digital filters 1906 with no IIR filters (shown as Option 2) to implement and convolve HRTFs and spatial Mapping Transfer Functions (MTFs). These transfer functions are linear and time-invariant in the continuous-time domain and are converted to linear, shift-invariant filters in the discrete-time domain. For both options, using FIR filters without IIR filters or IIR filters with FIR filters, the amplitude (or magnitude) and phase (or delay) versus frequency characteristics (response) of the transfer functions can be fully or partially replicated or emulated using one of more of bilinear transform techniques or amplitude (or magnitude) equalization (e.g., finely tuned banks of multiband parametric or other types of equalization) with phase (or delay) alteration. In cascade (Option 1) arrangements of IIR and FIR filters (where either filter segment can be positioned first and other processing may separate the two) the FIR filters can be utilized for alteration of phase (or delay), in this case for modifying the phase shift of the IIR filters to match target transfer functions. If FIR filters 1906 are used without IIR filters (Option 2), for example with bilinear transformation, both amplitude (or magnitude) and phase aspects of transfer functions can be replicated together. Each transfer function and convolution may be implemented separately using applications of either Option 1 or 2, or a net combination of multiple transfer functions (and convolutions) could be implemented by a single application of Option 1 or 2. In the digital domain, a DSP-based digital mixer 1908 may be used to implement all mixing functions. A major advantage of digital domain implementation may be that the number of audio reproduction channels (including digital to analog conversion) and acoustic transducers or loudspeakers can be reduced to the number of reference position audio input data channels (e.g., two for stereo, six or eight for 5.1 and 7.1 audio formats). A second advantage of the digital domain implementation may be that the audio processing can be distributed throughout the audio reproduction chain, in devices upstream from the final sound reproduction device. Audio processing hardware and software (including apps) can reside in devices such as mobile phones, tablets, desktop and laptop computers, servers, dedicated processors, audio/video receivers (AVRs), amplifiers, etc.

FIG. 19(*b*) shows an analog hardware realization of functional audio signal processing implemented in the analog domain, which may essentially replace the digital signal processor block 1302 in FIG. 13 (other functional and topological changes may also be implemented in FIG. 13 to operate with an analog implementation of FIG. 19(*b*)). Circuitry 1914 comprises a cascade of amplitude (or magnitude) equalizers 1910 and all-pass filters 1912 to fully or partially replicate (emulate) and combine HRTFs and spatial Mapping Transfer Functions (MTFs). The amplitude (or magnitude) equalizers 1910 may be utilized for amplitude or magnitude adjustment and modification and may be comprised of one or more equalizer types, including but not limited to single or multiband parametric, resonant, shelving, or other custom equalization topologies. The all-pass filters 1912 may be utilized for modifying the phase shift of the amplitude (or magnitude) equalizers 1910 to match the target transfer functions. Each transfer function may be implemented separately using this cascade circuit combination, or a net combination of transfer functions may be implemented by a single cascade circuit, depending on complexity of the resulting function and the practicality of the hardware circuit design. In the analog domain, an analog mixer 1916, for example a summing amplifier circuit topology, may be used to implement all mixing functions. An additional aspect for analog domain implementation is that all audio data designated for both target and reference sound source positions may be converted to (rendered available as) analog signals prior to entering circuitry 1914.

FIG. 19(*c*) shows a hybrid or combined digital/analog software/hardware realization of functional audio signal processing implemented in both the digital and analog domains. In this arrangement, FIR filters 1918 in the digital domain alter and modify phase shift accordingly to match (HRTF and Mapping) transfer functions and pre-compensate for the inherent phase shift of the amplitude (or magnitude) equalizers 1920. Once audio data is converted to analog in a system, amplitude (or magnitude) equalizers 1920 are utilized for amplitude or magnitude adjustment and modification to match or emulate (HRTF and Mapping) transfer functions. Because phase has already been compensated for and altered in the digital domain, the output of 1920 can accurately replicate a complete target transfer function, and the need for all-pass filters (such as all-pass filters 1912 in FIG. 19(*b*)) may be obviated. In such systems, where digital to analog conversion may be implemented on an output channel basis (e.g., one conversion channel per reference position acoustic transducer or loudspeaker), the FIR filters 1918 may be used for phase adjustment of a net combination of transfer functions even when several amplitude (or magnitude) equalizers 1920 are utilized for replicating the amplitude or magnitude response of transfer functions. Several different combinations of digital and analog components may be used in hybrid implementations; FIG. 19(*c*) illustrates one realization for some embodiments. For example, Option 1 or 2 of the digital domain implementation, 1904 or 1906, may be combined with the analog mixer 1922 after conversion of digital audio data to analog audio signals. Alternatively, IIR filters 1902 may be utilized for amplitude or magnitude adjustment in the digital domain, while all-pass filters 1912 may be utilized for phase adjustment in the analog domain, followed by analog mixer 1922. The functional audio signal processing implemented in hybrid implementations using both the digital and analog domains (e.g., FIG. 19(*c*)) of a system or user devices may comprise combinations of some or all of the following: one or more digital signal processing topologies (e.g., FIG. 19(*a*)) of FIR filters with or without IIR filters or digital mixers combined with one or more analog circuit topologies (e.g., FIG. 19(*b*)) of amplitude (or magnitude) equalizers, all-pass filters or analog mixers (e.g., summing amplifiers).

The present system and/or method can be applied to a wide range of sound reproduction and audio recording/content creation applications. In addition to the embodiments shown previously in FIGS. 14-18, additional exemplary embodiments of the present disclosure are shown in FIGS. 20-24. These embodiments illustrate implementations of the present disclosure in system designs related to the reproduction of sound in headset devices and external loudspeaker systems. Technology of the present system and/or method is flexible and scalable in the sense that these embodiments may be implemented throughout an audio reproduction system and can be adapted and distributed in audio source components, dedicated processing components and other devices (hardware, apps and other software in mobile phones, tablets, computers, servers, etc.) besides headset devices and external powered or active loudspeakers.

Figure 20:
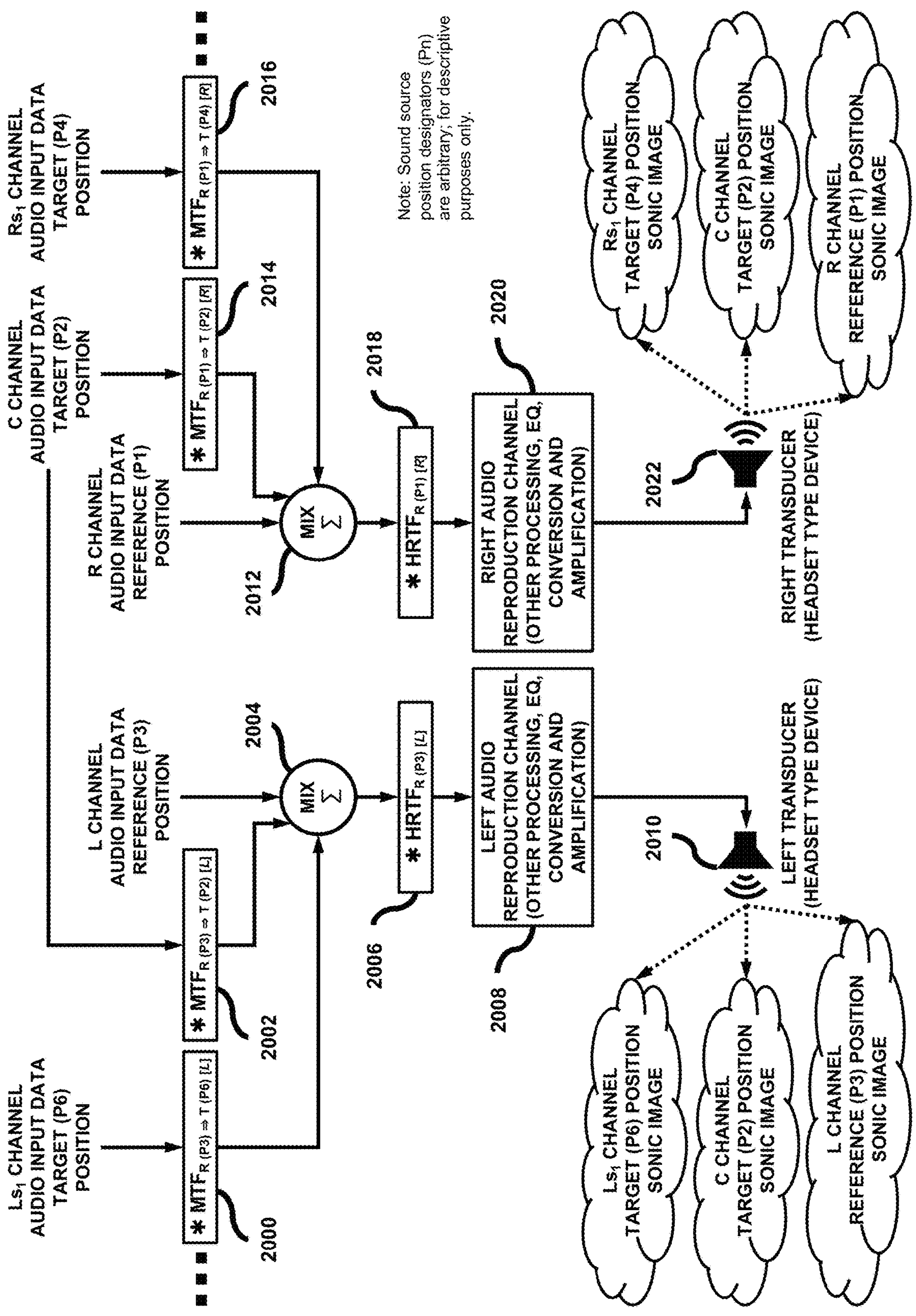

FIG. 20 illustrates an exemplary embodiment of the present system and method for headset devices, including headphones, earphones, VR/AR/XR headsets, helmets and other wearable devices (such as AR glasses) that have a right and left transducer in close proximity to the listener's ears, usually with some degree of acoustic isolation between ears (this should not be construed to be a requirement). The embodiment shown in FIG. 20 utilizes the present system and/or method to generate virtual sound sources for right and left (side) surround sound channels ($Rs_1$, $Ls_1$) and a center channel (C) from only the right and left headset transducers, 2010 and 2022. The system design shown in FIG. 20 may be implemented by the architecture of FIG. 13.

Audio input data for these virtual sound sources is convolved with the appropriate right and left MTFs (2014, 2016, 2002, 2000) and mixed (2012, 2004) with right and left channel audio input data. The resulting right and left audio data streams are then convolved with HRTFs for right and left channel sound sources at 2018 and 2006. Steps 2018 and 2006 may comprise partial (remainder) HRTFs as described in U.S. Pat. No. 11,653,163 B2 or complete HRTFs for conventional headset devices, necessary for generating external, virtual sonic images for the right and left channel sound sources at desired positions in the surrounding space (P1 and P3). The audio data streams are then passed through right and left audio reproduction channels (2020, 2008) that may include other processing, equalization, digital-to-analog conversion and amplification, before being sent to the right and left acoustic transducers (2022, 2010). The right transducer produces virtual, external sonic images (e.g., virtual reference and target sound sources P1, P2 and P4) for the right channel, center channel and right (side) surround channel audio data. The left transducer produces virtual, external sonic images (e.g., virtual reference and target sound sources P3, P2 and P6) for the left channel, center channel and left (side) surround channel audio data.

Additional audio data sound sources (e.g., added rear surround and height sound sources) can be added in the same manner as the C, $Rs_1$ and $Ls_1$ sound sources when incorporating the appropriate MTFs. Moreover, additional transducers and audio reproduction channels (e.g., $Rs_2$, $Ls_2$ rear surround channels as described in U.S. Pat. No. 11,653,163 B2) can be added by replicating the system and/or method employed for the right and left audio data channels. The virtual sound sources can be generated using a single reference sound source (right or left) or using both reference sound sources, as shown for the center channel (C). The embodiment shown in FIG. 20 can be implemented in the audio electronics of headset devices or in audio source components, dedicated processing components, preamplifiers, amplifiers and other devices (e.g., electronic hardware, apps or other software in mobile phones, tablets and computers, etc.) located upstream in the audio reproduction chain. This embodiment may enhance the effectiveness of reproducing 3D sound in a compatible headphone invention, U.S. Pat. No. 11,653,163 B2, when combined.

Figure 21:
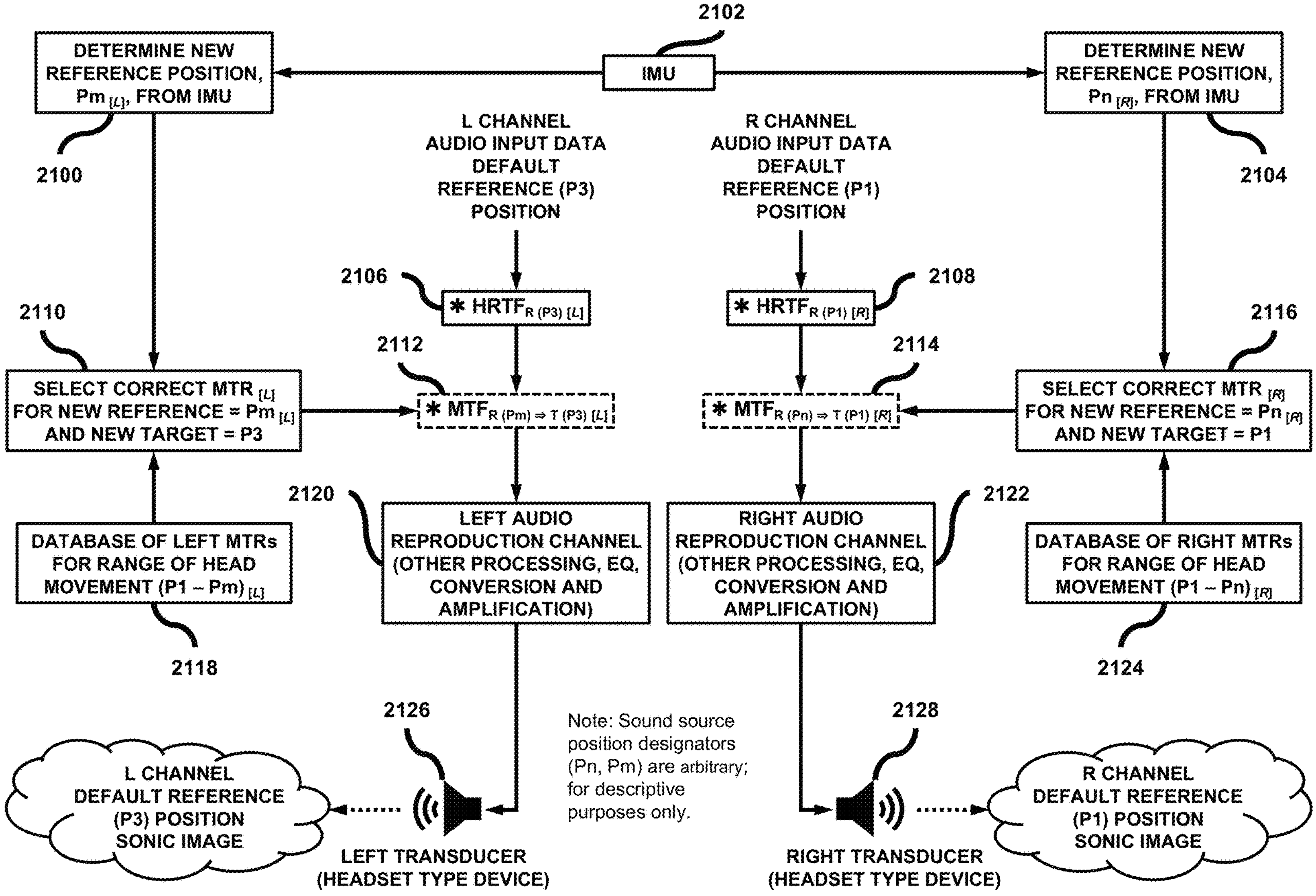

FIG. 21 illustrates an exemplary embodiment of the present system and/or method for head-tracking applications in headset devices, including headphones, earphones, VR/AR/XR headsets, helmets and other wearable devices (including AR glasses) that typically have a right and left transducer in close proximity to the listener's ears, usually with some degree of acoustic isolation between ears (this should not be construed to be a requirement). For clarity, FIG. 21 shows a stereo application with right and left audio input data. The system design shown in FIG. 21 may be implemented by the architecture of FIG. 13.

In FIG. 21, an inertial measurement unit (IMU) function block, 2102, (this may be an IMU IC in the headset device or some other component or method for detecting movement and orientation) detects movement of the user's head in three-dimensional space and sends data to 2104, 2100 for determining new (revised) reference sound source positions for the right and left audio data; these can be the respective sound source positions after the listener's head has moved, designated as Pn and Pm. Afterwards, steps 2116 and 2110 can select the correct right and left MTFs from databases 2124 and 2118 for mapping from the new reference sound source positions (Pn and Pm) to the original, default reference (or newly designated target) sound source positions (P1 and P3) for the right and left audio data. MTFs for the full expected range of head movement may be stored in separate databases for right and left sound source positions, in 2124 and 2118 respectively. Once selected, the appropriate MTFs can be convolved with the right and left audio data streams at steps 2114 and 2112 respectively, between the HRTF blocks (2108, 2106) and the audio reproduction channels (2122, 2120). Steps 2122 and 2120 then drive right and left acoustic transducers 2128 and 2126.

Additional audio data sound sources can be added in the same manner as the right and left audio sound sources when incorporating the appropriate MTFs. Moreover, additional acoustic transducers and audio reproduction channels (e.g., $Rs_2$, $Ls_2$ rear surround channels as described in U.S. Pat. No. 11,653,163 B2) can be added by replicating the system and method employed for the right and left audio data channels. The embodiment shown in FIG. 21 can be implemented in the audio electronics of headset devices or in audio source components, dedicated processing components, preamplifiers, amplifiers and other devices (e.g., hardware, apps or other software in mobile phones, tablets and computers, etc.) located upstream in the audio reproduction chain, depending on how the IMU (2102) function is implemented.

Teachings of the FIG. 21 embodiment may enhance the effectiveness of a compatible head-tracking invention, U.S. Pat. No. 11,140,509 B2, when combined. Furthermore, this FIG. 21 embodiment can be combined (alone or in conjunction with U.S. Pat. No. 11,140,509 B2) with other embodiments such as shown in FIG. 20 to add head-tracking functionality, whereby the system may compensate for movement of the listener's head to maintain stable sound source positions (right, left and other audio data channels) that do not move or shift with movement of the headset device. This functionality may prevent unintentional movement of virtual sound sources and sonic images when the listener moves their head. For example, when adding such teachings of FIG. 21 to the embodiment of FIG. 20, FIG. 21 elements 2100, 2102, 2104, 2110, 2112, 2114, 2116, 2118, and 2124 may be added to the system design of FIG. 20. Step 2112 may be inserted in between steps 2006 and 2008, and step 2114 may be inserted in between steps 2018 and 2020.

Figure 22:
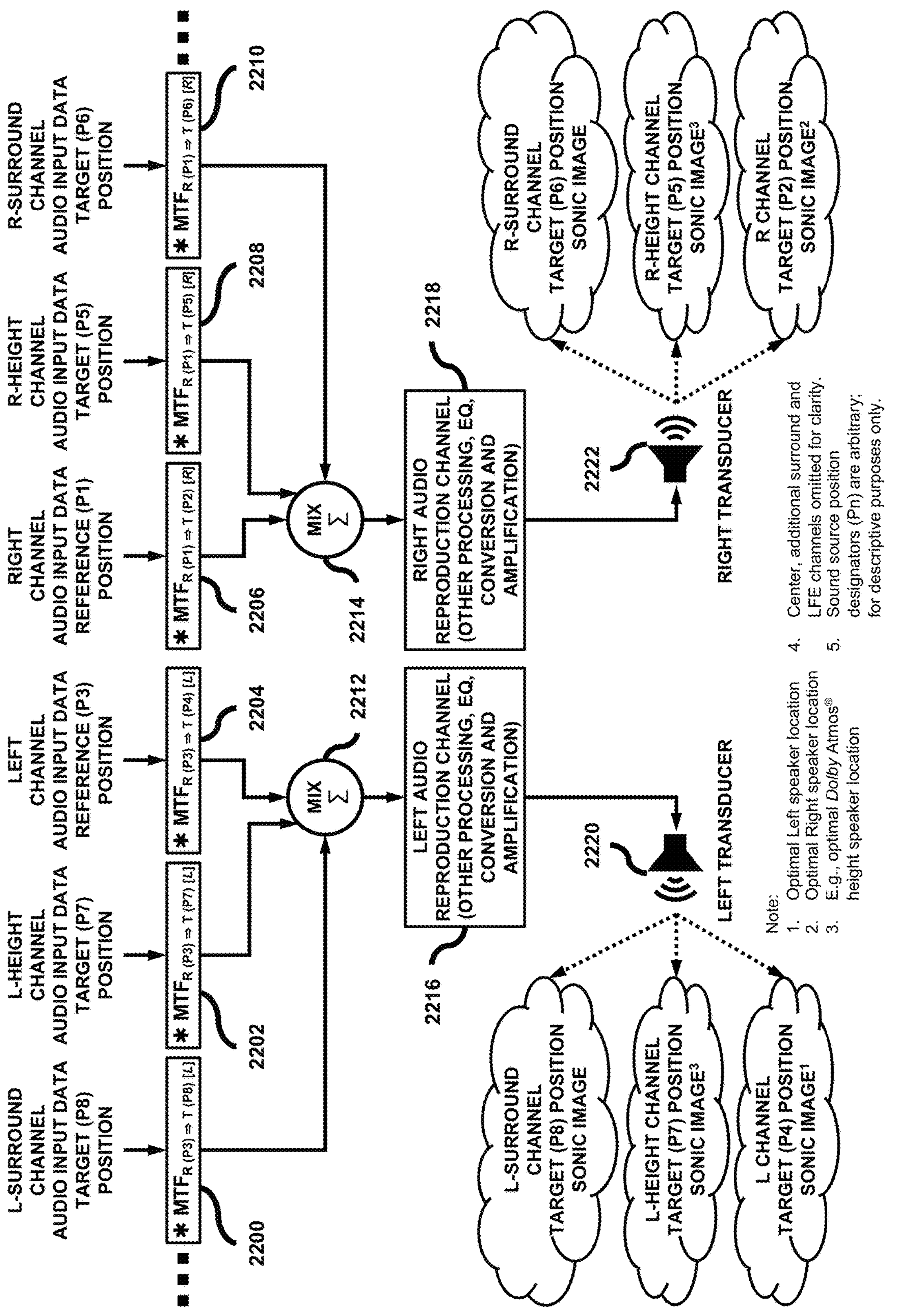

Moving on to examples of external loudspeaker applications, FIG. 22 illustrates an exemplary embodiment of the present system and/or method for soundbars (compact, multichannel home theater loudspeaker systems with multiple acoustic transducers) and TV/video monitors with integrated acoustic transducers. Apart from FIG. 22, such systems typically comprise multiple audio data channels with electronic hardware, firmware and multiple acoustic transducers, integrated within a single device, and are located in the mid to far-field space forward of the listener (typically >0.5 meter distance from the listener). Many such systems lack provisions for dedicated side or rear surround channels and height channels or are ineffective at virtualizing them in a convincing manner. The system design shown in FIG. 22 may be implemented by the architecture of FIG. 13

The embodiment shown in FIG. 22 utilizes the present system and/or method to generate virtual sound sources for right and left surround channels and right and left height channels (e.g., Dolby Atmos®) from only the right and left transducers, 2222 and 2220. Moreover, virtual sound sources for the right and left audio data channels may be shifted outward to new positions (P2 and P4) relative to the real reference sound source positions (P1 and P3), which may be too closely spaced in most soundbars and TV/video monitors for correct spatial sound reproduction.

Audio input data for all of these sound sources, including the right and left audio channels, is convolved with the appropriate right and left MTFs (2206, 2208, 2210, 2204, 2202, 2200) and mixed at 2214 and 2212. Because the transducers (2222, 2220) may be located in the mid-far field relative to listener's ears, the reference position HRTFs can be acoustic and intrinsically present; thus, there may be no need for the HRTF blocks employed with headset type devices. The resulting right and left audio data streams are then passed through right and left audio reproduction channels (2218, 2216) that may include other processing, equalization, digital-to-analog conversion and amplification, before being sent to the right and left transducers (2222, 2220). The right transducer produces virtual, sonic images (e.g., target sound sources P2, P5, P6) for the right channel, right height channel and right surround channel audio data at the desired locations in the listening space. The left transducer produces virtual, sonic images (e.g., target sound sources P4, P7, P8) for the left channel, left height channel and left surround channel audio data at the desired locations in the listening space.

Additional audio data sound sources (e.g., added surround channels and center channel sound sources) can be added in the same manner as the right/left, surround and height sound sources when incorporating the appropriate MTFs. Moreover, additional acoustic transducers and audio reproduction channels (e.g., center channel or height channels) can be added by replicating the system and method employed for the right and left audio data channels. The virtual sound sources can be generated using a single reference sound source (right or left) or using multiple reference sound sources (e.g., right, left and center channels of a soundbar). This embodiment may be implemented within the audio electronics of soundbar products (active or powered loudspeaker system) or TV/video monitors, but may also be implemented in audio source components, dedicated processing components and other devices (hardware, apps and other software in mobile phones, tablets, computers, etc.) located upstream in the audio reproduction chain.

Figure 23:
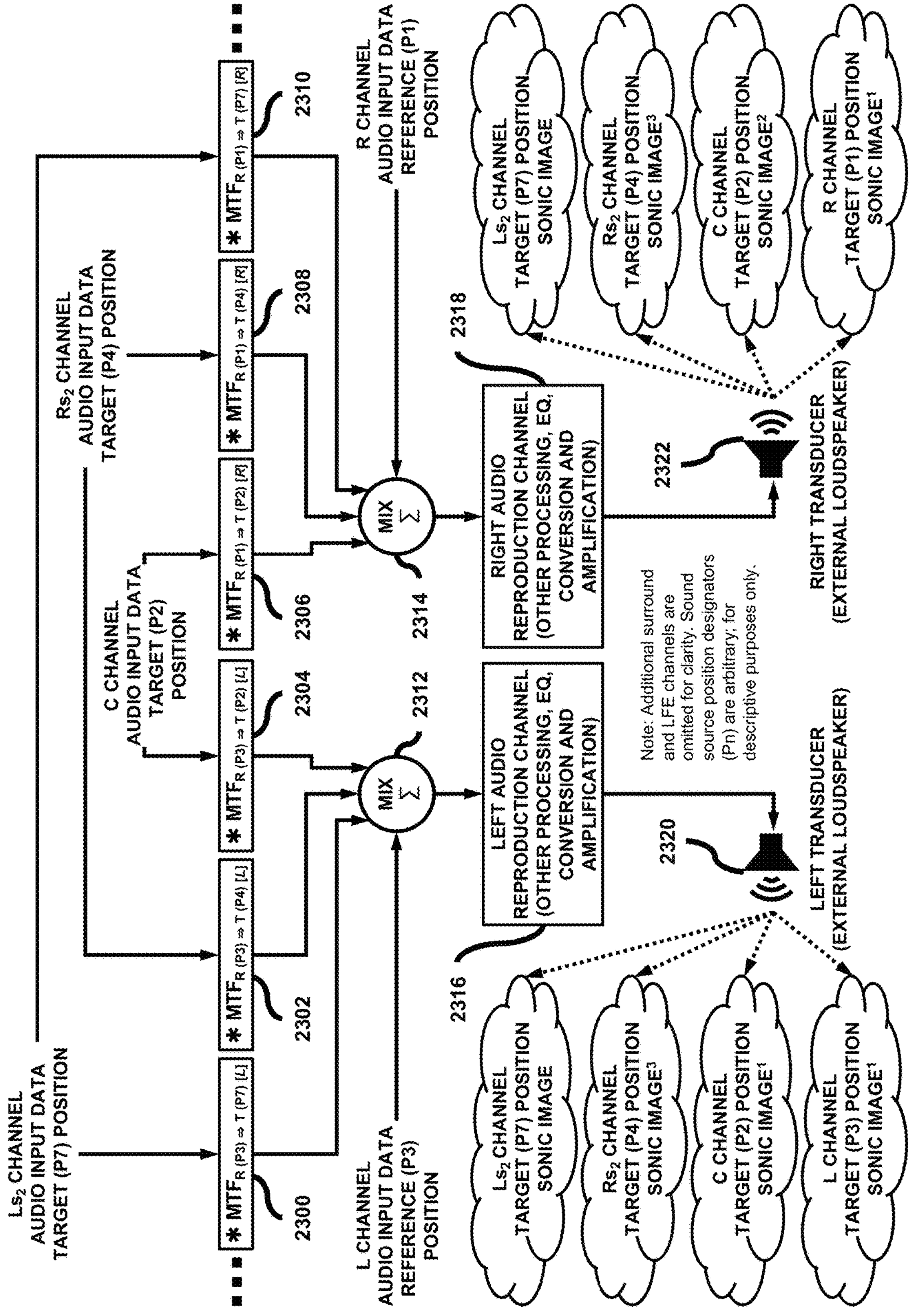

FIG. 23 illustrates an exemplary embodiment of the present system and/or method for external stereo or multichannel (e.g., home theater) loudspeaker applications. Apart from FIG. 23, such systems typically comprise multiple audio data channels and two or more loudspeakers (each having one or more acoustic transducers), located in the far-field space surrounding the listener (typically ≥1 meter distance from the listener). Many such systems are not set up with dedicated surround or center channel loudspeakers and most have no effective method of virtualizing sound sources. The system design shown in FIG. 23 may be implemented by the architecture of FIG. 13.

The embodiment shown in FIG. 23 utilizes the present system and/or method to generate virtual sources for right and left rear surround sound channels ($Rs_2$, $Ls_2$) and a center channel (C) from only the right and left transducers, 2322 and 2320. Audio input data for these virtual sound sources is convolved with the appropriate right and left MTFs (2306, 2308, 2310, 2304, 2302, 2300) and mixed (2314, 2312) with right and left channel audio input data. The audio data streams are then passed through conventional right and left audio reproduction channels (2318, 2316) that may include other processing, equalization, digital-to-analog conversion and amplification, before being sent to the right and left transducers (2322, 2320). The right transducer produces real sonic images for the right channel audio data (reference sound source P1) and virtual, sonic images (e.g., target sound sources P2, P4 and P7) for the center channel, right (rear) surround channel and left (rear) surround channel audio data. The left transducer produces real sonic images for the left channel audio data (reference sound source P3) and virtual, sonic images (e.g., target sound sources P2, P4 and P7) for the center channel, right (rear) surround channel and left (rear) surround channel audio data.

Additional audio data sound sources (e.g., added side surround and height sound sources) can be added in the same manner as the C, $Rs_2$ and $Ls_2$ sound sources when incorporating the appropriate MTFs. Moreover, additional acoustic transducers and audio reproduction channels (e.g., a center channel) can be added by replicating the system and/or method employed for the right and left audio data channels. In this embodiment the virtual sound sources are generated using both reference sound sources, i.e., the right and left transducers (loudspeakers); however, virtual sound sources could be generated using only one reference sound source or using three or more sound sources depending on the application. This embodiment can be implemented within active (powered) loudspeakers as well as audio source components, dedicated processing components, preamplifiers, amplifiers, audio/video receivers (AVRs) and other devices (hardware, apps and other software in mobile phones, tablets, computers, etc.) located upstream from the loudspeakers in the audio reproduction chain, to add required but missing sound sources (loudspeakers) in a multichannel home theater or music system or to emulate any type of multichannel sound system from a single (stereo) pair of loudspeakers.

Figure 24:
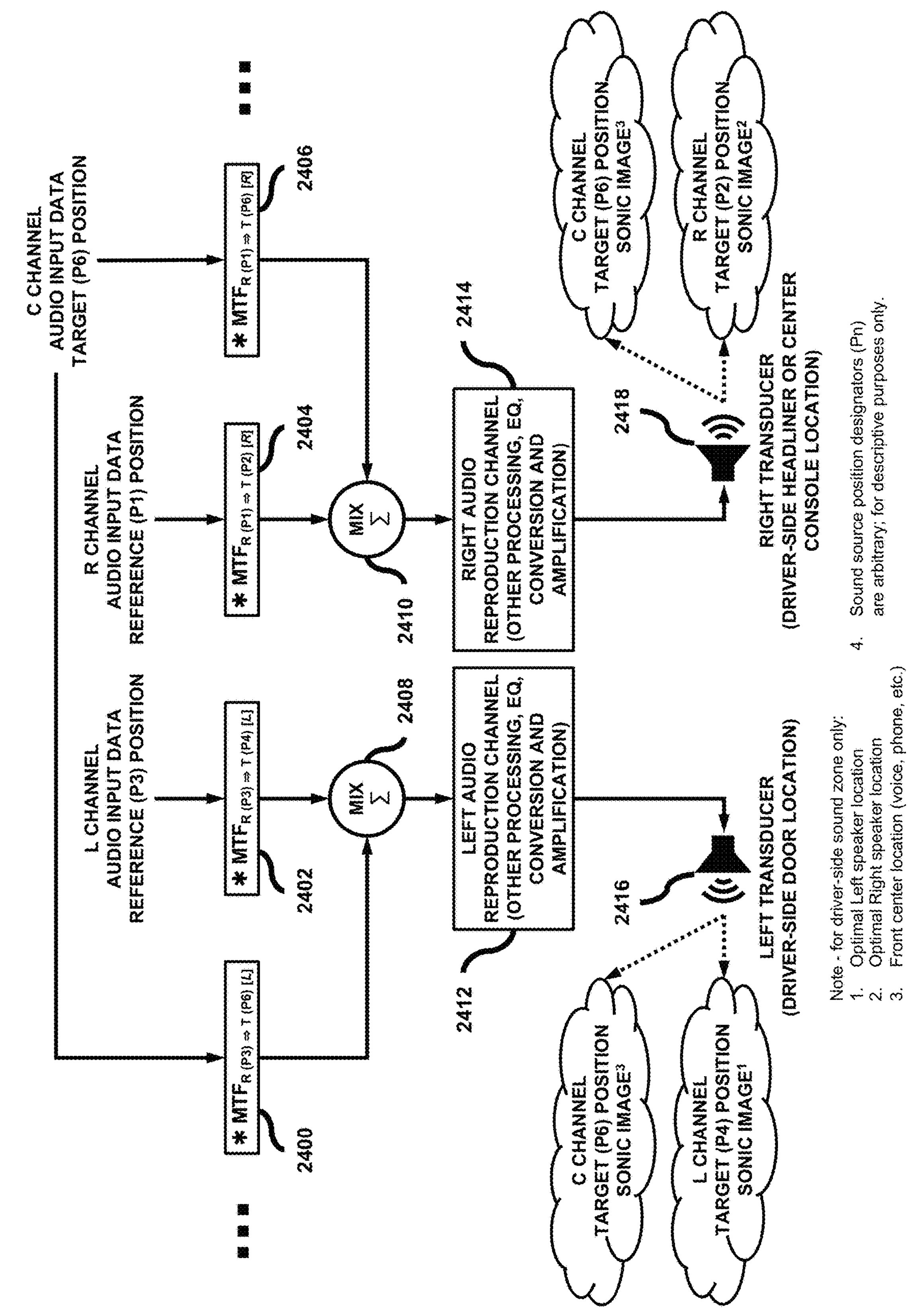

FIG. 24 illustrates an exemplary embodiment of the present system and/or method for vehicle sound systems (automotive, marine, aerospace and other mobile loudspeaker systems). Apart from FIG. 24, such systems typically comprise multiple audio data channels with acoustic transducers distributed within the interior (cabin) and located in the mid to far-field space surrounding the listener (typically >0.25 meter distance from the listener). Many such systems have transducers located in suboptimal (undesirable, from the perspective of sound reproduction) positions and suffer from skewed and degraded spatial imaging performance for more than one listener. Designers of such systems often attempt to create individual "sonic zones" for each listener in the vehicle to mitigate these performance limitations. The embodiment shown in FIG. 24 is simplified for clarity and represents a three channel "sonic zone" for a vehicle driver or passenger (listener) that utilizes the present system and method to generate virtual sound sources for right and left channels (e.g. stereo music content) and a center channel (for voice, phone calls, indicator sounds, etc.) from only the right and left transducers, 2418 and 2416. The virtual sound sources for the right and left audio data are shifted to optimal target positions (P2 and P4) relative to the real reference sound source positions (P1 and P3), which may be located in poor or highly compromised positions such as a door, dashboard, headliner or center console. The system design shown in FIG. 24 may be implemented by the architecture of FIG. 13.

Audio input data for these sound sources, including the right and left audio channels, is convolved with the appropriate right and left MTFs (2404, 2406, 2402, 2400) and mixed at 2410 and 2408. Because the transducers (2418, 2416) may be located in the mid-far field space relative to listeners' ears, the reference position HRTFs can be acoustic and intrinsically present; thus, there may be no need for the HRTF blocks employed with headset type devices. (Alternatively, in some embodiments, systems with headrest-mounted loudspeakers or transducers may utilize corrective HRTF blocks similar to those shown in FIG. 20). The resulting right and left audio data streams are then passed through right and left audio reproduction channels (2414, 2412) that may include other processing, equalization, digital-to-analog conversion and amplification, before being sent to the right and left transducers (2418, 2416). The right transducer produces virtual, sonic images (e.g., target sound sources P2 and P6) for the right channel and center channel audio data at the desired (optimal) locations in the listening space. The left transducer produces virtual, sonic images (e.g., target sound sources P4, and P6) for the left channel and center channel audio data at the desired locations in the listening space.

Additional audio data sound sources (e.g., added surround channel sound sources) can be added in the same manner as the right/left and center sound sources when incorporating the appropriate MTFs. Moreover, additional acoustic transducers and audio reproduction channels (e.g., center channel or surround channels) can be added by replicating the system and/or method employed for the right and left audio data channels. The virtual sound sources can be generated using a single reference sound source (right or left) or using multiple reference sound sources (e.g., right, left and center channels of a "sound zone"). This embodiment may be implemented anywhere within the audio electronics of the vehicle sound system, including audio source components, dedicated audio processing components, amplification and active (powered) loudspeakers. Audio zones similar to FIG. 24 may be added to the overall vehicle sound system for multiple listeners located elsewhere in the vehicle, for example, front and rear seat passengers.

Figure 25:
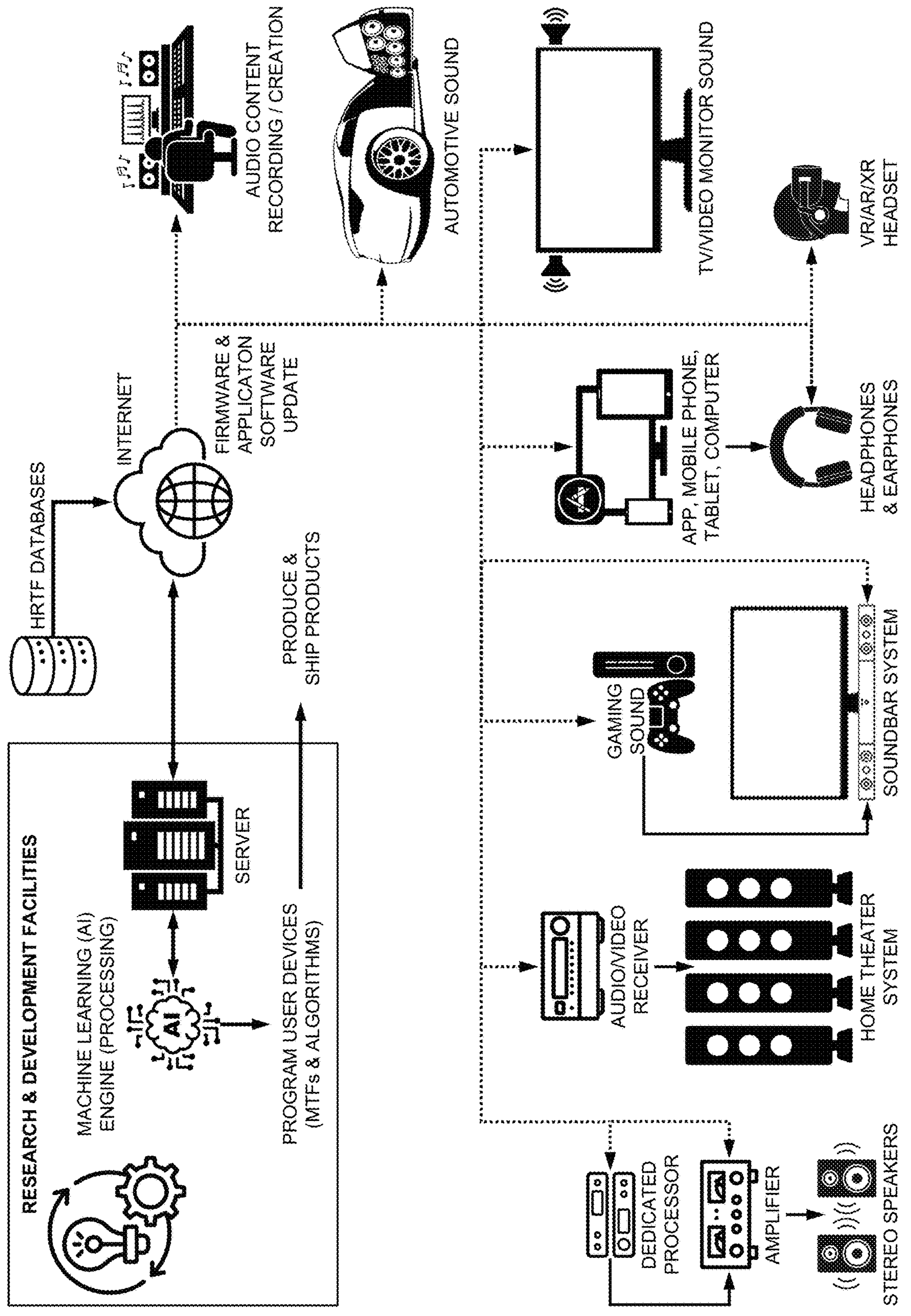

FIG. 25 illustrates a selection of various virtual sound applications and highlights several key attributes of the technology of the present disclosure. As described earlier, the machine learning (AI) processing and algorithm development for the present disclosure can be executed remotely, e.g., at dedicated research and development or laboratory facilities.

A remotely located, artificial intelligence machine learning software/hardware engine, comprising dedicated software programmed to learn to perform tasks using learning algorithms and high-performance computing (HPC) hardware that comprises one or more of special purpose processing units (SP-PUs), graphic processing units (GPUs), central processing units (CPUs), tensor processing units (TPUs), FPGAs, or other ASICs, may generate the spatial Mapping Transfer Functions (MTFs) from optimized training data comprised of compiled, correlated HRTF databases. The HRTF databases utilized for the machine learning production of training data can be accessed over the Internet and queried as new data becomes available.

User devices, equipment, systems and products can be programmed with signal processing algorithms and MTFs prior to being shipped to end users. The end user devices, equipment, systems and products may include, but are not limited to, application software (apps), mobile phones, tablets, laptop and desktop computers, headphones, earphones, VR/AR/XR headsets, wearable audio devices (including AR glasses), audio/video receivers, dedicated audio processors, preamplifiers and amplifiers, powered (active) loudspeakers, gaming devices and sound systems, soundbar speaker systems, TV/video monitors, automotive, marine and aerospace sound and communication systems, military and aerospace simulators and equipment for audio content recording/creation (music, video, film, gaming, VR/AR/XR, etc.). These devices can utilize application software, firmware or operating system updates performed over the Internet through connected servers, or similar means (and generally in the standard manner, using USB, Ethernet, Wi-Fi, etc.), to program, revise or change processing algorithms and MTFs dynamically as AI capabilities further progress and additional HRTF data is compiled.

The advantages of the present system and method over existing, prior art solutions for 3D sound virtualization include some or all of the following aspects:

1. More accurate and believable virtual sound sources can be generated since existing individualized HRTFs for real acoustic transducers and loudspeakers in a system may be utilized to construct individualized HRTFs for virtual sound sources.
2. There is no need for user measurements, either acoustical or optical, to be performed to generate virtual sound sources.
3. There is no requirement for storing or processing large arrays and data sets of HRTFs or complex algorithms in end user devices, e.g., the storage and processing overhead may be reduced significantly.
4. User device audio processing may be minimized, which enables a higher quality of processing to be performed (within given hardware and software constraints), thereby preserving the inherent audio quality of the source material being reproduced.

5. Powerful machine learning (AI), located remotely, can be leveraged to improve spatial performance of the end user device or system without requiring AI processing and power in the end user device or system itself.
6. End user devices and systems can easily be updated for improved performance as additional data sets become available for further AI training and as machine learning algorithms gain further capabilities and increase accuracy.
7. Spatial anomalies caused by user head movements can be significantly reduced or eliminated in headset type devices when input data of the user's head position is provided (by an IMU or similar tracking function device).
8. User devices and systems incorporating the present system and/or method may be compatible with existing encoded immersive sound formats (e.g. Dolby, DTX, Sony, etc.).
9. Object-based recording and production of immersive audio content (gaming sound, cinema sound, VR/AR/XR sound, etc.) may incorporate this system and/or method to enhance the reproduction of immersive sound when using headset type devices and external loudspeakers, with no requirements for specialized decoding or playback processing.
10. The present system and/or method can be implemented and distributed throughout the chain of various user devices employed in the playback of audio content, including electronic hardware, apps and other software in mobile phones, tablets, computers, servers, AVRs, dedicated processors, preamplifiers, amplifiers and other devices located upstream from the final sound reproduction devices.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

Following is a glossary of relevant nomenclature and terminology used in drawings and the description, that is intended to provide a further understanding of the disclosure.

Glossary of Nomenclature and Terminology

| Symbol | Meaning |
|---|---|
| R | Reference |
| T | Target |
| REAL | Physically present; actual, existing (or generated) at a specific location |
| VIRTUAL | Acts, performs (or perceived) as if real, but not physically present at a specific location |
| (R) | Right |
| (L) | Left |
| [R/L] and (R/L) | Right or left |
| C | Center; normally refers to "center" of listener's head; (0, 0°, 0°) location in three-dimensional space; also refers to "center channel speaker" |
| P | Position: a point located in three-dimensional space |
| $P_n$, $P_m$, $P_X$, $P_Y$, P1, P2, P3, . . . | Arbitrary position designator, in three-dimensional space; $P_n$ may also be shown as Pn for all position designators (terminology is equivalent) |
| r | Radial distance (meters) |
| θ | Horizontal, azimuth angle of rotation (degrees) about the median plane |
| ϕ | Vertical, elevation angle (degrees) above or below the horizontal plane |
| X | Euclidean axis, along intersection of lateral and horizontal planes |
| Y | Euclidean axis, along intersection of median and horizontal planes |
| Z | Euclidean axis, along intersection of median and lateral planes |
| D | Audio data |
| H | General form for transfer function |
| HRTF | Head-related transfer function |
| MTF | Mapping transfer function |
| ⇒ | From one state/condition to another state/condition; with transfer functions designates input (initial condition) to output (final condition) |
| * | Convolve function; in the context of this disclosure the "convolve" function involving a MTF or HRTF may be implemented by "filtering" audio data with a specified transfer function of the MTF or HRTF in either the digital or analog domain |
| Σ | Mix or summation function |
| f | Frequency (Hz) |
| dB | Decibel; a measure of magnitude or amplitude of an electrical or acoustical signal |
| SPL | Sound pressure level (dB); a measure of magnitude or amplitude for sound (perceived as "volume") |

What is claimed is:

1. A method comprising the steps of:

determining one or more Head-Related Transfer Function (HRTF) data sets based on one or more other HRTF data sets, wherein the determined one or more HRTF data sets include:

a pair of a first initial sound source position and a second initial sound source position in an initial three-dimensional (3D) space surrounding an initial origin point, wherein the first initial sound source position is at or within a proximity range of an initial reference sound source position which has an associated first real sound source, and wherein the second initial sound source position is at or within a proximity range of an initial target sound source position which has an associated second real sound source; and generating a spatial Mapping Transfer Function (MTF) based on the determined one or more HRTF data sets, wherein the spatial MTF is distinct from an HRTF, wherein performing one or more convolving operations involving the generated spatial MTF and audio data for an output target sound source position provides resulting audio data, the spatial MTF transforming one or more input HRTFs for an output reference sound source position to one or more output HRTFs for the output target sound source position, wherein performing one or more operations including mixing the resulting audio data with mixing-input audio data, based on audio data for the output reference sound source position, provides mixed audio data, wherein passing reproduction-input audio data, based on the mixed audio data, to a reference sound source audio reproduction channel to an output real sound source converts the reproduction-input audio data to an output sound, and wherein the output sound comprises:

a real or virtual sonic image for the output reference sound source position that corresponds to the first initial sound source position, the output reference sound source position located within an output sound 3D space surrounding a 3D space point that corresponds to the initial origin point, and a virtual sonic image for the output target sound source position that corresponds to the second initial sound source position, the output target sound source position located within the output sound 3D space surrounding the 3D space point that corresponds to the initial origin point.

2. The method of claim 1, wherein the determined one or more HRTF data sets includes HRTF and sound source position data optimized by one or more of a group comprising: data filtering, data format conversion, data scaling, data normalization, and data weighting.

3. The method of claim 1, wherein the generation of the spatial MTF involves one or more data analyses performed, separately or in combination, from a group comprising: linear regression, multivariate regression, nonlinear regression, artificial neural network (ANN), data mining, K-nearest neighbors (KNN), and principal component analysis.

4. The method of claim 1, wherein artificial intelligence machine learning is utilized for one or more from a group comprising: searching data for, gathering data for, optimizing data for, and compiling data sets for producing training data or other inputs into algorithms to generate the spatial MTF.

5. The method of claim 1, wherein artificial intelligence machine learning is utilized to generate the spatial MTF based on HRTF data sets or training data in the determined one or more HRTF data sets, wherein the artificial intelligence machine learning uses one or more learning algorithms, separately or in combination, from a group comprising: linear regression, multivariate regression, nonlinear regression, artificial neural network (ANN), data mining, K-nearest neighbors (KNN), and principal component analysis.

6. The method of claim 1, wherein a feedback process and one or more of:

validation data sets that comprise known HRTFs for pairs of sound source positions included in the HRTF data sets or training data in the determined one or more HRTF data sets, and test data sets that comprise known HRTFs for pairs of sound source positions not included in the HRTF data sets or training data in the determined one or more HRTF data sets are utilized to evaluate and adjust accuracy of the generated MTF.

7. A system comprising:

signal processing circuitry configured for:

performing one or more convolving operations involving a spatial Mapping Transfer Function (MTF) and audio data for an output target sound source position to provide resulting audio data, the spatial MTF transforming one or more input Head-Related Transfer Functions (HRTFs) for an output reference sound source position to one or more output HRTFs for the output target sound source position, wherein the spatial MTF is distinct from an HRTF, wherein the spatial MTF is generated based on a determined one or more HRTF data sets, which are determined based on one or more other HRTF data sets, wherein the determined one or more HRTF data sets include:

a pair of a first initial sound source position and a second initial sound source position in an initial three-dimensional (3D) space surrounding an initial origin point, wherein the first initial sound source position is at or within a proximity range of an initial reference sound source position which has an associated first real sound source, and wherein the second initial sound source position is at or within a proximity range of an initial target sound source position which has an associated second real sound source; and performing one or more operations including mixing the resulting audio data with mixing-input audio data, based on audio data for the output reference sound source position, to provide mixed audio data;

wherein passing reproduction-input audio data, based on the mixed audio data, to a reference sound source audio reproduction channel to an output real sound source converts the reproduction-input audio data to an output sound, and wherein the output sound comprises:

a real or virtual sonic image for the output reference sound source position that corresponds to the first initial sound source position, the output reference sound source position located within an output sound 3D space surrounding a 3D space point that corresponds to the initial origin point, and a virtual sonic image for the output target sound source position that corresponds to the second initial sound source position, the output target sound source position located within the output sound 3D space surrounding the 3D space point that corresponds to the initial origin point.

8. The system of claim 7, wherein the mixing-input audio data is based on the audio data for the output reference sound source position convolved with a specified HRTF for the output reference sound source position.

9. The system of claim 7, wherein the reproduction-input audio data is based on the audio data for the output reference sound source position convolved with a specified HRTF for the output reference sound source position.

10. The system of claim 7, wherein the signal processing circuitry comprises:

digital signal processing (DSP), wherein the spatial MTF is fully or partially replicated, emulated or realized in a digital domain via the DSP configured to implement one or more from a group comprising: bilinear transformation, amplitude or magnitude equalization, and phase or delay alteration.

11. The system of claim 7, wherein the signal processing circuitry comprises:

digital signal processing (DSP), wherein the spatial MTF is fully or partially replicated, emulated or realized in a digital domain via the DSP that comprises one or more from a group comprising: FIR filter topologies and IIR filter topologies.

12. The system of claim 7, wherein the signal processing circuitry comprises:

digital signal processing (DSP), wherein the one or more convolving operations or the mixing is realized in a digital domain using the DSP that comprises one or more, separately or in combination, from a group comprising: a FIR filter topology, an IIR filter topology, and a digital mixer topology.

13. The system of claim 7, wherein the signal processing circuitry comprises:

a single or cascade arrangement of circuitry, wherein the one or more convolving operations or the mixing is realized in an analog domain via the single or cascade arrangement of circuitry having a filtering or mixing functionality of one or more from a group comprising; an amplitude or magnitude equalizer, an all-pass filter, and an analog mixer circuit topology.

14. The system of claim 7, wherein the signal processing circuitry is implemented in both digital and analog domains via one or more digital signal processing topologies from a group comprising FIR filters, IIR filters, and digital mixers in combination with one or more analog circuit topologies from a group comprising an amplitude or magnitude equalizer, an all-pass filter, and an analog mixer.

15. The system of claim 7, wherein the signal processing circuitry is distributed amongst multiple user devices or software, including one or more from a group comprising: application software, mobile phones, tablets, laptop computers, desktop computers, servers, dedicated or general audio processing devices, audio/video receivers, preamplifiers, amplifiers, powered or active loudspeakers, soundbars, headphones, earphones, headsets, helmets, wearable audio devices, simulation devices, automotive, marine or aerospace sound or communication systems, digital signal processors (DSPs), system on chip (SoC) devices, IC chipsets, and ICs.

16. The system of claim 7, wherein the spatial MTF is programmed, revised or changed via application software, firmware or operating system updates performed over the Internet through connected servers, computers, or similar means.

17. A method comprising the steps of:

performing one or more convolving operations involving a spatial Mapping Transfer Function (MTF) and audio data for an output target sound source position to provide resulting audio data, the spatial MTF transforming one or more input Head-Related Transfer Functions (HRTFs) for an output reference sound source position to one or more output HRTFs for the output target sound source position, wherein the spatial MTF is distinct from an HRTF, wherein the spatial MTF is generated based on a determined one or more HRTF data sets, which are determined based on one or more other HRTF data sets, wherein the determined one or more HRTF data sets include:

a pair of a first initial sound source position and a second initial sound source position in an initial three-dimensional (3D) space surrounding an initial origin point, wherein the first initial sound source position is at or within a proximity range of an initial reference sound source position which has an associated first real sound source, and wherein the second initial sound source position is at or within a proximity range of an initial target sound source position which has an associated second real sound source; and performing one or more operations including mixing the resulting audio data with mixing-input audio data, based on audio data for the output reference sound source position, to provide mixed audio data;

wherein passing reproduction-input audio data, based on the mixed audio data, to a reference sound source audio reproduction channel to an output real sound source converts the reproduction-input audio data to an output sound, and wherein the output sound comprises:

a real or virtual sonic image for the output reference sound source position that corresponds to the first initial sound source position, the output reference sound source position located within an output sound 3D space surrounding a 3D space point that corresponds to the initial origin point, and a virtual sonic image for the output target sound source position that corresponds to the second initial sound source position, the output target sound source position located within the output sound 3D space surrounding the 3D space point that corresponds to the initial origin point.

18. The method of claim 17, wherein the step of performing the one or more convolving operations and the step of performing the one or more operations including mixing the resulting audio data with the mixing-input audio data are segregated or distributed amongst multiple user devices or software, including one or more from a group comprising: application software, mobile phones, tablets, laptop computers, desktop computers, servers, dedicated or general audio processing devices, audio/video receivers, preamplifiers, amplifiers, powered or active loudspeakers, soundbars, headphones, earphones, headsets, helmets, wearable audio devices, simulation devices, automotive, marine or aerospace sound or communication systems, digital signal processors (DSPs), system on chip (SoC) devices, IC chipsets, and ICs.

19. The method of claim 17, wherein the spatial MTF has an amplitude or magnitude response that is fully or partially replicated, emulated or realized irrespective of a phase or delay response.

20. The method of claim 17, wherein artificial intelligence machine learning is utilized to generate the spatial MTF based on HRTF data sets or training data in the determined one or more HRTF data sets.

* * * * *